US007835858B2

(12) United States Patent
Smyth et al.

(10) Patent No.: US 7,835,858 B2
(45) Date of Patent: Nov. 16, 2010

(54) METHOD OF CREATING A VIRTUAL TRAFFIC NETWORK

(75) Inventors: Brian J. Smyth, Newtown Square, PA (US); Jonathan K. Agree, Newtown, PA (US); Robert M. Soulchin, King of Prussia, PA (US); Michael S. Raber, West Chester, PA (US); Joseph A. Reed, Gwynedd Valley, PA (US); James F. Carroll, Gilbertsville, PA (US); Joseph R. Sawyer, Berwyn, PA (US); Nicholas J. DiPatri, Philadelphia, PA (US); Drew A. Bittenbender, Royersford, PA (US); Robert A. Dengler, Springfield, PA (US)

(73) Assignee: Traffic.com, Inc., Wayne, PA (US)

( * ) Notice: Subject to any disclaimer, the term of this patent is extended or adjusted under 35 U.S.C. 154(b) by 1120 days.

(21) Appl. No.: 10/611,494

(22) Filed: Jun. 30, 2003

(65) Prior Publication Data

US 2004/0143385 A1 Jul. 22, 2004

Related U.S. Application Data

(60) Provisional application No. 60/428,596, filed on Nov. 22, 2002.

(51) Int. Cl.
*G06F 19/00* (2006.01)

(52) U.S. Cl. ....................... 701/208; 701/207; 701/117; 701/206

(58) Field of Classification Search ................. 701/200, 701/201, 213, 202, 206, 207, 208, 209, 211, 701/243, 117, 118, 119; 707/104.1; 455/456.5, 455/414.3; 342/357; 340/905, 988
See application file for complete search history.

(56) References Cited

U.S. PATENT DOCUMENTS

| | | | |
|---|---|---|---|
| 5,402,117 | A | 3/1995 | Zijderhand |
| 5,539,645 | A | 7/1996 | Mandhyan et al. |

(Continued)

OTHER PUBLICATIONS

Quicktime movie file of video presentation at Radio/Television News Directors Association (RTNDA) Conference in Fall 1997.

(Continued)

*Primary Examiner*—Khoi Tran
*Assistant Examiner*—Ronnie Mancho
(74) *Attorney, Agent, or Firm*—Lisa M. Schoedel; Frank J. Kozak; Jon D. Shutter

(57) ABSTRACT

A computer-implemented method of creating a virtual traffic network includes inputting map data representing a road system, inputting flow data related to traffic flow on the road system and integrating the map data and the flow data to produce a virtual traffic network representing traffic conditions on the road system.

33 Claims, 67 Drawing Sheets
(32 of 67 Drawing Sheet(s) Filed in Color)

Example of Traffic Link Definitions

U.S. PATENT DOCUMENTS

| | | | | |
|---|---|---|---|---|
| 5,594,432 | A | 1/1997 | Oliva et al. | |
| 5,673,039 | A | 9/1997 | Pietzsch et al. | |
| 5,774,827 | A | 6/1998 | Smith, Jr. et al. | |
| 5,812,069 | A | 9/1998 | Albrecht et al. | |
| 5,845,227 | A | 12/1998 | Peterson | |
| 5,889,477 | A | 3/1999 | Fastenrath | |
| 5,926,113 | A | 7/1999 | Jones et al. | |
| 5,959,577 | A | 9/1999 | Fan et al. | |
| 5,982,298 | A | 11/1999 | Lappenbusch et al. | |
| 5,987,374 | A | 11/1999 | Akutsu et al. | |
| 5,987,377 | A | 11/1999 | Westerlage et al. | |
| 6,067,499 | A * | 5/2000 | Yagyu et al. | 701/201 |
| 6,091,956 | A * | 7/2000 | Hollenberg | 455/456.5 |
| 6,107,940 | A | 8/2000 | Grimm | |
| 6,150,961 | A | 11/2000 | Alewine et al. | |
| 6,151,550 | A | 11/2000 | Nakatani | |
| 6,154,745 | A * | 11/2000 | Kari et al. | 707/100 |
| 6,161,092 | A | 12/2000 | Latshaw et al. | |
| 6,202,023 | B1 * | 3/2001 | Hancock et al. | 701/201 |
| 6,401,027 | B1 | 6/2002 | Xu et al. | |
| 6,408,307 | B1 * | 6/2002 | Semple et al. | 707/104.1 |
| 6,522,875 | B1 * | 2/2003 | Dowling et al. | 455/414.3 |
| 6,594,576 | B2 | 7/2003 | Fan et al. | |
| 6,728,628 | B2 | 4/2004 | Peterson | |
| 6,785,606 | B2 | 8/2004 | DeKock et al. | |
| 6,845,316 | B2 | 1/2005 | Yates | |
| 6,989,765 | B2 | 1/2006 | Gueziec | |
| 7,010,424 | B2 | 3/2006 | Zhao et al. | |
| 7,116,326 | B2 | 10/2006 | Soulchin et al. | |
| 2001/0029425 | A1 * | 10/2001 | Myr | 701/200 |
| 2002/0158922 | A1 | 10/2002 | Clark et al. | |
| 2003/0171870 | A1 | 9/2003 | Gueziec | |
| 2003/0225516 | A1 | 12/2003 | DeKock et al. | |
| 2004/0243533 | A1 | 12/2004 | Dempster et al. | |
| 2005/0033506 | A1 | 2/2005 | Peterson | |
| 2005/0052462 | A1 | 3/2005 | Sakamoto et al. | |

OTHER PUBLICATIONS

Quicktime movie file of WSOC-TV (Channel 9), Charlotte, NC, traffic report using "Show FX" traffic application, aired on or about Feb. 2000.

Cathy Proctor, My TrafficNews.com seals patent, The Denver Business Journal, Jan. 18, 2005, 2 pages.

TMC Compendium—Safety and Crisis Event List, Document No. 800-C204.F01.1, Feb. 1, 1999, 116 pages.

TMC Compendium—Alert-C Coding Handbook, Document No. 800-C302.F02.1, Jan. 2, 1999, 98 pages.

Video File of WCAU Traffic report, aired prior to Nov. 22, 2001.

Two screen shot printouts from Video File of WCAU Traffic report, aired prior to Nov. 22, 2001, 2 pages.

Video File of WTAE Traffic report, aired prior to Nov. 22, 2001.

Two screen shot printouts from Video File of WTAE Traffic report, aired prior to Nov. 22, 2001, 2 pages.

Award Abstract #0349460 for SBIR Phase II: Animated Real-Time Road Traffic Visualization for Broadcast and the Internet, National Science Foundation, Initial Amendment Date: Jan. 7, 2004, first date of publication: unknown, 2 pages.

Product brochure for "Curious World Maps—Curious Map Presenter." Curious Software, downloaded from web site: http://www.curious-software.com/pdfs/Traffic_Flow.pdf, download date: Mar. 16, 2006, product release date: unknown, 1 page.

Product brochure for "Curious World Maps—Curious Map Presenter." Curious Software, downloaded from web site: http://www.curious-software.com/pdfs/Traffic_Flow.pdf, download date: Mar. 16, 2006, product release date: unknown, 1 page.

News Release: "Curious Software at NAB 2006: Curious Traffic Flow," downloaded from web site: http://www.curious-software.com/news/2006/2006_02.html, download date: Apr. 17, 2006, New release date: Mar. 2006, 2 pages.

News Release: "Curious Software is using the NAB 2006 platform to showcase its revolutionary new Curious Traffic Flow," downloaded from web site: http://www.vizrt.com/perl/print?document=http://www.vizrt.com/db/106/10/33/document1010.ehtml, download date: Mar. 16, 2006, original publication date: unknown, 2 pages.

* cited by examiner

PRIOR ART

PRIOR ART

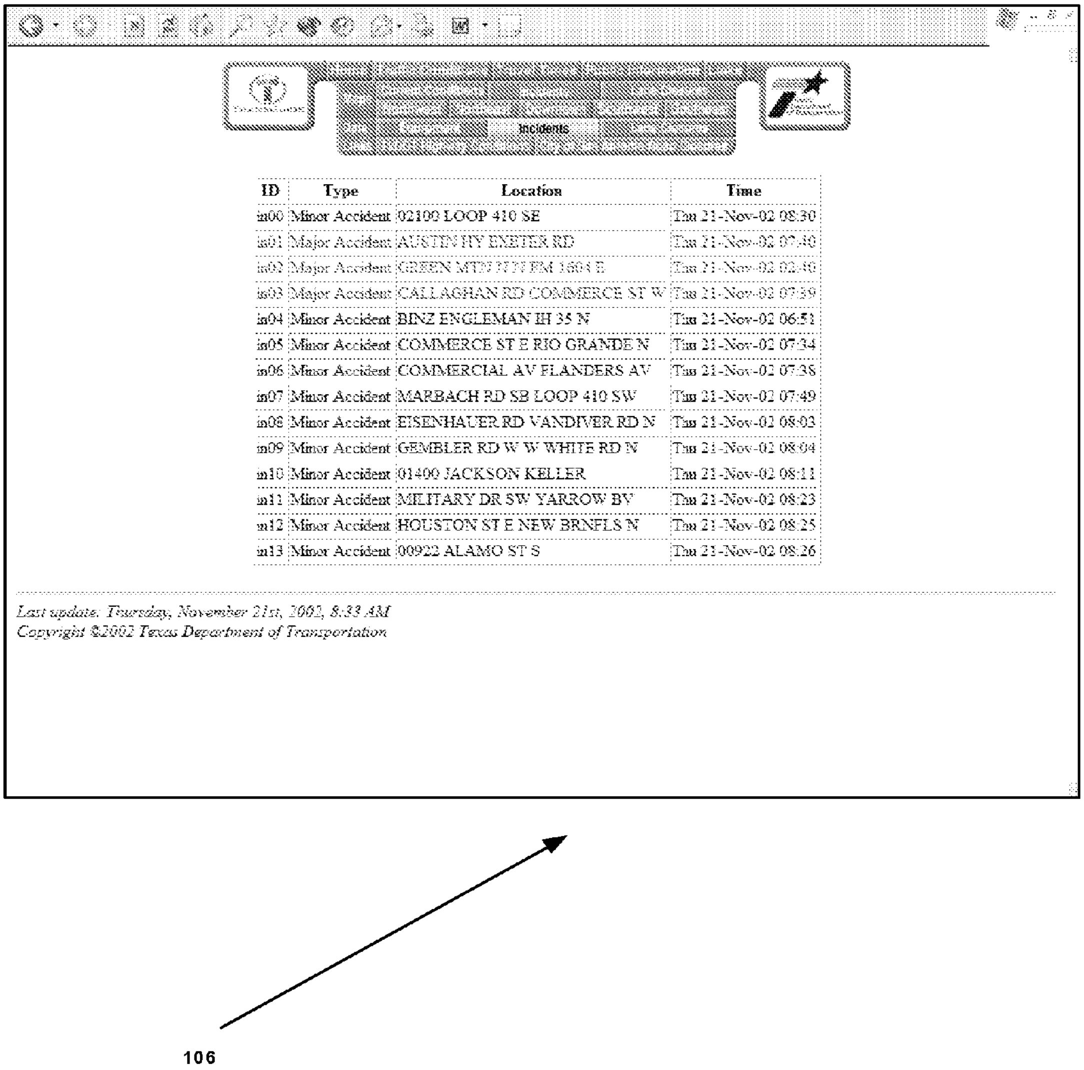

| ID | Type | Location | Time |
|---|---|---|---|
| in00 | Minor Accident | 02100 LOOP 410 SE | Thu 21-Nov-02 08:30 |
| in01 | Major Accident | AUSTIN HY EXETER RD | Thu 21-Nov-02 07:40 |
| in02 | Major Accident | GREEN MTN [illegible] FM 1604 E | Thu 21-Nov-02 02:40 |
| in03 | Major Accident | CALLAGHAN RD COMMERCE ST W | Thu 21-Nov-02 07:39 |
| in04 | Minor Accident | BINZ ENGLEMAN IH 35 N | Thu 21-Nov-02 06:51 |
| in05 | Minor Accident | COMMERCE ST E RIO GRANDE N | Thu 21-Nov-02 07:34 |
| in06 | Minor Accident | COMMERCIAL AV FLANDERS AV | Thu 21-Nov-02 07:38 |
| in07 | Minor Accident | MARBACH RD SB LOOP 410 SW | Thu 21-Nov-02 07:49 |
| in08 | Minor Accident | EISENHAUER RD VANDIVER RD N | Thu 21-Nov-02 08:03 |
| in09 | Minor Accident | GEMBLER RD W W WHITE RD N | Thu 21-Nov-02 08:04 |
| in10 | Minor Accident | 01400 JACKSON KELLER | Thu 21-Nov-02 08:11 |
| in11 | Minor Accident | MILITARY DR SW YARROW BV | Thu 21-Nov-02 08:23 |
| in12 | Minor Accident | HOUSTON ST E NEW BRNFLS N | Thu 21-Nov-02 08:25 |
| in13 | Minor Accident | 00922 ALAMO ST S | Thu 21-Nov-02 08:26 |

*Last update. Thursday, November 21st, 2002, 8:33 AM*
*Copyright ©2002 Texas Department of Transportation*

FIG. 2

PRIOR ART

105

PRIOR ART

107

Table of Stored Procedures for the TURKI

| TURKI Procedure | Purpose or Function |
|---|---|
| | |
| check_roadway_flags | TURKI can not inactivate a roadway that is on the "roadway short" or "report no problem" lists in the TIMS. This procedure is called to determine if a given roadway is part of those lists. |
| insert_roadway | Creates a new roadway. |
| create_road_from_intersections | Creates a new roadway using an array of intersection points. |
| split_roadway | Splits an existing roadway into 2 roadways. |
| insert_roadway_aliases | Reinserts new aliases to the roadway alias table 275 for any type passed other than unchangeable commercial mapping data. |
| insert_road_direction_aliases | Reinserts new aliases to the roadway direction alias table 274 for any type passed other than unchangeable commercial mapping data. |
| insert_point_aliases | Reinserts new aliases to the point alias table 262 for any type passed other than unchangeable commercial mapping data. |
| insert_new_point | Creates a new point with reference to an existing point. |
| insert_point_from_intersection | Creates new point(s) on a roadway from an intersection. |
| insert_point_from_another_road | Creates a new point from another roadway. |
| update_point | Updates the status description and point type description of an existing non-commercial mapping data type point. |
| change_roadway_status | Updates the status description of an existing roadway. |
| change_point_on_road_status | Updates the status description of an existing point on a roadway. |
| delete_point | Deletes a point identification from a given roadway, as long as it is not an original NavTech point, and has not yet been referenced by any application. |
| insert_point_visibility_codes | Returns a list of visibility type codes for a point and roadway. |
| calculate_geoloc | Returns a list of direction values. |
| update_start_end_point_on_road | Updates the start and the end point for a given roadway_id. |
| assign_points_sequence | Assigns a point to a roadway. |
| insert_new_point_calc_geoloc | Creates a new point in reference to an existing point. This procedure calculates a GeoLoc based on the i_distance_percentage value. |

FIG. 11

Example of Basic Link Definitions

Example of Traffic Link Definitions

Example of Proximities for Traffic Link Definitions

Example of Graphical Network Layer Mapping from the Traffic Network

```xml
<?xml version="1.0" encoding="UTF-8"?>
 <definedroadways>
 <road>
  <road_name>RT-202</road_name>
  <road_id>98</road_id>
  <road_ebucountrycode>1</road_ebucountrycode>
  <road_tableid>3</road_tableid>
  <road_locid>00103</road_locid>
  <directions>
   <direction>
    <direction_type>+</direction_type>
    <direction_name>Northbound</direction_name>
   </direction>
   <direction>
    <direction_type>-</direction_type>
    <direction_name>Southbound</direction_name>
   </direction>
  </directions>
  <points>
   <point>
    <point_name>RT-100 Spur</point_name>
    <point_id>396</point_id>
    <point_locid>04466</point_locid>
    <point_sequence>2.0</point_sequence>
    <mids>
     <mid>
      <mid_type>+</mid_type>
      <mid_id>397</mid_id>
      <mid_locid>04467</mid_locid>
      <mid_name>Boot Rd</mid_name>
     </mid>
     <mid>
      <mid_type>-</mid_type>
      <mid_id>395</mid_id>
      <mid_locid>04465</mid_locid>
      <mid_name>RT-322</mid_name>
     </mid>
    </mids>
   </point>
  </points>
 </road>
</definedroadways>
```

FIG. 31

Tables Relating XML Nodes and Corresponding Database Tables and Database Columns

ROADWAY NODES

| XML Node | Database Table | Database Column |
|---|---|---|
| road_name 1 | ROADWAY_ALIAS 275 | ALIAS 275 |
| road_id 1 | ROADWAY 276 | ROADWAY_ID 276 |

DIRECTION NODES

| XML Node | Database Table | Database Column |
|---|---|---|
| direction_name 2 | ROADWAY_DIRECTION_ALIAS 274 | POS_DIR 274<br>NEG_DIR 274 |

POINT NODES

| XML Node | Database Table | Database Column |
|---|---|---|
| point_name 3 | POINT_ALIAS 262 | ALIAS 262 |
| point_id 3 | POINT 266 | POINT_ID 266 |
| point_sequence 3 | ROADWAY_POINT_XREF 269 | POINT_SEQUENCE 269 |

MID NODES

| XML Node | Database Table | Database Column |
|---|---|---|
| mid_type 4 | OFFSET 268 | RDS_DIRECTION 268 |
| mid_id 4 | OFFSET 268 | RELATED_POINT_ID 268 |
| mid_name 4 | POINT_ALIAS 262 | ALIAS 262 |

FIG. 32

```
<TextRenditions>

 <TextRendition name="locname" aliastype="LOCAL" type="text">
  <TextBlockSetGroup key="locname" />
 </TextRendition>

 <TextBlockGroup name="locname">
  <TextBlockSetConditionalEquals key="LOCATION_TYPE" value="defined">
   <TextBlockConstant constant="$[ROAD_NAME," type="text" />
   <TextBlockMapValue key="ROADWAY_ID" type="text" />
   <TextBlockGetRoadName roadidkey="ROADWAY_ID" metroidkey="METRO_ID" type="voice"/>
   <TextBlockConstant constant="]" type="text" />
  </TextBlockSetConditionalEquals>
  <TextBlockSetConditionalEquals key="LOCATION_TYPE" value="undefined">
   <TextBlockSetGroup key="municipality_location" />
  </TextBlockSetConditionalEquals>
  <TextBlockSetConditionalEquals key="LOCATION_TYPE" value="municipality">
   <TextBlockSetGroup key="municipality_location" />
  </TextBlockSetConditionalEquals>
  <TextBlockSetConditionalEquals key="LOCATION_TYPE" value="metro">
   <!-- No location for metro -->
  </TextBlockSetConditionalEquals>
 </TextBlockGroup>

 <TextBlockGroup name="municipality_location">
  <TextBlockSetConditionalNull key="MUNI_ALIAS">
   <TextBlockMapValue key="MUNI_NAME" />
  </TextBlockSetConditionalNull>
  <TextBlockSetConditionalNotNull key="MUNI_ALIAS">
   <TextBlockMapValue key="MUNI_ALIAS" />
  </TextBlockSetConditionalNotNull>
 </TextBlockGroup>

</TextRenditions>
```

FIG. 35

```
<?xml version="1.0" encoding="UTF-8"?>
<GRAPHICAL_NETWORK>
  <TIMESTAMP VALUE="20-Nov-2002 06:11:26 EST"/>
  <ROADWAY ID="212">
    <DESCRIPTION><![CDATA[SR-408]]></DESCRIPTION>
    <DIRECTION VALUE="W">
      <SEGMENTS>
        <SEGMENT ID="GraphicalLink:102N04949|down|VisibleCompoundLink(102-04948-&gt;102N04942)|up">
          <RAW_DESCRIPTION><![CDATA[91|1|2790121<M>91|1|2790091 > GraphicalLink:102N04949|down|VisibleCompoundLink(102-04948-
>102N04942)|up > 91|1|2790091<M>91|1|2784216{versionid=Q42001, tableid=2, rdstmc=[102N04949, 102-04948, 102N04948, 102-04947, 102N04947, 102-
04946, 102N04946, 102-04945, 102N04945, 102-04944, 102N04944, 102-04943, 102N04943, 102-04942, 102N04942], ebucc=1, pid=[1949, 1948, 1947, 1946,
1945, 1944, 1943, 1942], lifeid=[91|1|86418, 91|1|106005, 91|1|86420, 91|1|86422, 91|1|13477, 91|1|13478, 91|1|100271, 91|1|100270, 91|1|86555, 91|1|86556,
91|1|86557, 91|1|13475, 91|1|13473, 91|1|580267, 91|1|580266, 91|1|580268, 91|1|86570, 91|1|13470, 91|1|13469, 91|1|86662, 91|1|580261, 91|1|580265,
91|1|580260], edgeid=[22398135, 22424476, 22398138, 22398140, 17009629, 17009630, 22415974, 22415973, 22398295, 22398296, 22398298, 17009628,
17009627, 23243703, 23243702, 23243704, 22398316, 17009602, 17009601, 22398423, 23243697, 23243701, 23243696], rdsdir=[-, N],
roadwayDirDetails=[212|W|ACTIVE|SR-408], locationid=[04949, 04948, 04947, 04946, 04945, 04944, 04943, 04942], isramp=N, location=[SR-436/EXIT 14,
HOLLAND EAST MAIN TOLL PLAZA, SR-15/S CONWAY RD/EXIT 13, CRYSTAL LK DR/EXIT 12, BUMBY AVE/EXIT 12, MILLS AVE/EXIT 11, ROSALIND AVE/EXIT
11, DELANEY AVE/EXIT 10]}]]></RAW_DESCRIPTION>
          <RDSTMC><![CDATA[102N04949|102-04948|102N04948|102-04947|102N04947|102-04946|102N04946|102-04945|102N04945|102-
04944|102N04944|102-04943|102N04943|102-04942|102N04942]]></RDSTMC>
          <LOCATION><![CDATA[SR-436/EXIT 14|HOLLAND EAST MAIN TOLL PLAZA|SR-15/S CONWAY RD/EXIT 13|CRYSTAL LK DR/EXIT 12|BUMBY AVE/
EXIT 12|MILLS AVE/EXIT 11|ROSALIND AVE/EXIT 11|DELANEY AVE/EXIT 10]]></LOCATION>
          <GEOLOCATION LATITUDE="28.53965" LONGITUDE="-81.31342"/>
          <GEOLOCATION LATITUDE="28.53961" LONGITUDE="-81.31422"/>
          <GEOLOCATION LATITUDE="28.53967" LONGITUDE="-81.3149"/>
          <GEOLOCATION LATITUDE="28.53976" LONGITUDE="-81.3158"/>
          <GEOLOCATION LATITUDE="28.53987" LONGITUDE="-81.31711"/>
          <GEOLOCATION LATITUDE="28.53989" LONGITUDE="-81.31828"/>
          <GEOLOCATION LATITUDE="28.53992" LONGITUDE="-81.31924"/>
          <GEOLOCATION LATITUDE="28.53986" LONGITUDE="-81.32043"/>
          <GEOLOCATION LATITUDE="28.53975" LONGITUDE="-81.32182"/>
          <GEOLOCATION LATITUDE="28.53958" LONGITUDE="-81.32306"/>
          <GEOLOCATION LATITUDE="28.53937" LONGITUDE="-81.32442"/>
          <GEOLOCATION LATITUDE="28.53922" LONGITUDE="-81.32521"/>
          <GEOLOCATION LATITUDE="28.53859" LONGITUDE="-81.3284"/>
          <GEOLOCATION LATITUDE="28.53853" LONGITUDE="-81.32895"/>
          <GEOLOCATION LATITUDE="28.53847" LONGITUDE="-81.32968"/>
          <GEOLOCATION LATITUDE="28.53844" LONGITUDE="-81.33125"/>
          <GEOLOCATION LATITUDE="28.53845" LONGITUDE="-81.33409"/>
          <GEOLOCATION LATITUDE="28.53845" LONGITUDE="-81.33492"/>
          <GEOLOCATION LATITUDE="28.53845" LONGITUDE="-81.33966"/>
          <GEOLOCATION LATITUDE="28.53845" LONGITUDE="-81.34009"/>
          <GEOLOCATION LATITUDE="28.53845" LONGITUDE="-81.34186"/>
          <GEOLOCATION LATITUDE="28.53844" LONGITUDE="-81.34363"/>
          <GEOLOCATION LATITUDE="28.53835" LONGITUDE="-81.34775"/>
        </SEGMENT>
        <SEGMENT ID="GraphicalLinkVisibleCompoundLink(102-04948-&gt;102N04942)|down|102-04941|up">
          <RAW_DESCRIPTION><![CDATA[91|1|2790091<M>91|1|2784216 > GraphicalLinkVisibleCompoundLink(102-04948->102N04942)|down|102-
04941|up > 91|1|2784216<M>91|1|2782836{versionid=Q42001, tableid=2, rdstmc=[102-04948, 102N04948, 102-04947, 102N04947, 102-04946, 102N04946,
102-04945, 102N04945, 102-04944, 102N04944, 102-04943, 102N04943, 102-04942, 102N04942, 102-04941], ebucc=1, pid=[1948, 1947, 1946, 1945, 1944,
1943, 1942, 1941], lifeid=[91|1|86422, 91|1|13477, 91|1|13478, 91|1|100271, 91|1|100270, 91|1|86555, 91|1|86556, 91|1|86557, 91|1|13475, 91|1|13473,
91|1|580267, 91|1|580266, 91|1|580268, 91|1|86570, 91|1|13470, 91|1|13469, 91|1|86662, 91|1|580261, 91|1|580265, 91|1|580260, 91|1|13146], edgeid=[22398140,
17009629, 17009630, 22415974, 22415973, 22398295, 22398296, 22398298, 17009628, 17009627, 23243703, 23243702, 23243704, 22398316, 17009602,
17009601, 22398423, 23243697, 23243701, 23243696, 17008472], rdsdir=[-, N], roadwayDirDetails=[212|W|ACTIVE|SR-408], locationid=[04948, 04947, 04946,
04945, 04944, 04943, 04942, 04941], isramp=N, location=[HOLLAND EAST MAIN TOLL PLAZA, SR-15/S CONWAY RD/EXIT 13, CRYSTAL LK DR/EXIT 12,
BUMBY AVE/EXIT 12, MILLS AVE/EXIT 11, ROSALIND AVE/EXIT 11, DELANEY AVE/EXIT 10, I-4/EXIT 10]}]]></RAW_DESCRIPTION>
          <RDSTMC><![CDATA[102-04948|102N04948|102-04947|102N04947|102-04946|102N04946|102-04945|102N04945|102-04944|102N04944|102-
04943|102N04943|102-04942|102N04942|102-04941]]></RDSTMC>
          <LOCATION><![CDATA[HOLLAND EAST MAIN TOLL PLAZA|SR-15/S CONWAY RD/EXIT 13|CRYSTAL LK DR/EXIT 12|BUMBY AVE/EXIT 12|MILLS
AVE/EXIT 11|ROSALIND AVE/EXIT 11|DELANEY AVE/EXIT 10|I-4/EXIT 10]]></LOCATION>
          <GEOLOCATION LATITUDE="28.53835" LONGITUDE="-81.34775"/>
          <GEOLOCATION LATITUDE="28.53828" LONGITUDE="-81.35187"/>
          <GEOLOCATION LATITUDE="28.53827" LONGITUDE="-81.35597"/>
          <GEOLOCATION LATITUDE="28.53828" LONGITUDE="-81.35851"/>
          <GEOLOCATION LATITUDE="28.53824" LONGITUDE="-81.35924"/>
          <GEOLOCATION LATITUDE="28.53816" LONGITUDE="-81.35985"/>
          <GEOLOCATION LATITUDE="28.53798" LONGITUDE="-81.36075"/>
          <GEOLOCATION LATITUDE="28.53789" LONGITUDE="-81.36125"/>
          <GEOLOCATION LATITUDE="28.53751" LONGITUDE="-81.36296"/>
          <GEOLOCATION LATITUDE="28.5374" LONGITUDE="-81.36363"/>
          <GEOLOCATION LATITUDE="28.53734" LONGITUDE="-81.36421"/>
          <GEOLOCATION LATITUDE="28.53725" LONGITUDE="-81.36832"/>
          <GEOLOCATION LATITUDE="28.53725" LONGITUDE="-81.37151"/>
          <GEOLOCATION LATITUDE="28.53725" LONGITUDE="-81.37288"/>
          <GEOLOCATION LATITUDE="28.53719" LONGITUDE="-81.37354"/>
          <GEOLOCATION LATITUDE="28.53697" LONGITUDE="-81.37465"/>
          <GEOLOCATION LATITUDE="28.53688" LONGITUDE="-81.37502"/>
          <GEOLOCATION LATITUDE="28.53664" LONGITUDE="-81.37578"/>
          <GEOLOCATION LATITUDE="28.53624" LONGITUDE="-81.377"/>
          <GEOLOCATION LATITUDE="28.53613" LONGITUDE="-81.37732"/>
          <GEOLOCATION LATITUDE="28.53603" LONGITUDE="-81.37767"/>
          <GEOLOCATION LATITUDE="28.53587" LONGITUDE="-81.37817"/>
          <GEOLOCATION LATITUDE="28.5356" LONGITUDE="-81.37912"/>
        </SEGMENT>


      </SEGMENTS>
    </DIRECTION>
      </SEGMENTS>
    </DIRECTION>
  </ROADWAY>
</GRAPHICAL_NETWORK>
```

FIG. 46

```
<?xml version="1.0" encoding="UTF-8"?>
<GRAPHICAL_NETWORK_STATUS>
  <TIMESTAMP VALUE="29-Oct-2002 05:35:16 EST"/>
  <ROADWAY ID="212">
    <DESCRIPTION><![CDATA[SR-408]]></DESCRIPTION>
    <DIRECTION VALUE="W">
      <SEGMENTS/>
    </DIRECTION>
    <DESCRIPTION><![CDATA[SR-408]]></DESCRIPTION>
    <DIRECTION VALUE="E">
      <SEGMENTS>
        <SEGMENT ID="GraphicalLink:VisibleCompoundLink:(102P04941|up-->102P04941|down)|down|VisibleCompoundLink:(102+04942--
>102P04948)|up">
          <RAW_DESCRIPTION><![CDATA[212|E|91|1|2782206<M>212|E|91|1|2782246 > GraphicalLink:VisibleCompoundLink:(102P04941|up--
>102P04941|down)|down|VisibleCompoundLink:(102+04942-->102P04948)|up > 212|E|91|1|2782246<M>212|E|91|1|2789011{baseroadwayid=212,
location=Ramp to I-4 West, rdsdir=[P, P], rdstmc=102P04941, direction=E, roadname=SR-408}]]></RAW_DESCRIPTION>
          <RDSTMC><![CDATA[102P04941]]></RDSTMC>
          <LOCATION><![CDATA[Ramp to I-4 West]]></LOCATION>
          <CONGESTION_STATUS><![CDATA[yellow]]></CONGESTION_STATUS>
        </SEGMENT>
      </SEGMENTS>
```

373

```
    </DIRECTION>
  </ROADWAY>
  <ROADWAY ID="211">
    <DESCRIPTION><![CDATA[I-4]]></DESCRIPTION>
    <DIRECTION VALUE="W">
      <SEGMENTS>
        <SEGMENT ID="GraphicalLink:102N04802|down|VisibleCompoundLink:(102-04801-->102N04798)|up">
          <RAW_DESCRIPTION><![CDATA[211|W|91|1|2851691<M>211|W|91|1|2845906 >
GraphicalLink:102N04802|down|VisibleCompoundLink:(102-04801-->102N04798)|up >
211|W|91|1|2845906<M>211|W|91|1|2794906{baseroadwayid=211, location=PRINCETON ST/EXIT 43, rdsdir=N, rdstmc=102N04802, direction=W,
roadname=I-4}]]></RAW_DESCRIPTION>
          <RDSTMC><![CDATA[102N04802]]></RDSTMC>
          <LOCATION><![CDATA[PRINCETON ST/EXIT 43]]></LOCATION>
          <CONGESTION_STATUS><![CDATA[red]]></CONGESTION_STATUS>
        </SEGMENT>
        <SEGMENT ID="GraphicalLink:VisibleCompoundLink:(102-04801-->102N04798)|down|102-04797|up">
          <RAW_DESCRIPTION><![CDATA[211|W|91|1|2845906<M>211|W|91|1|2794906 > GraphicalLink:VisibleCompoundLink:(102-04801--
>102N04798)|down|102-04797|up > 211|W|91|1|2794906<M>211|W|91|1|2793686{baseroadwayid=211, location=US-17/US-92/IVANHOE BLVD/
EXIT 4, rdsdir=[-, N, -, N, -, N, -, N], rdstmc=102-04801, direction=W, roadname=I-4}]]></RAW_DESCRIPTION>
          <RDSTMC><![CDATA[102-04801]]></RDSTMC>
          <LOCATION><![CDATA[US-17/US-92/IVANHOE BLVD/EXIT 4]]></LOCATION>
          <CONGESTION_STATUS><![CDATA[red]]></CONGESTION_STATUS>
        </SEGMENT>
        <SEGMENT ID="GraphicalLink:102-04797|down|102N04797|up">
          <RAW_DESCRIPTION><![CDATA[211|W|91|1|2794906<M>211|W|91|1|2793686 > GraphicalLink:102-04797|down|102N04797|up >
211|W|91|1|2793686<M>211|W|91|1|2785326{baseroadwayid=211, location=SOUTH ST/EXIT 39, rdsdir=-, rdstmc=102-04797, direction=W,
roadname=I-4}]]></RAW_DESCRIPTION>
          <RDSTMC><![CDATA[102-04797]]></RDSTMC>
          <LOCATION><![CDATA[SOUTH ST/EXIT 39]]></LOCATION>
          <CONGESTION_STATUS><![CDATA[red]]></CONGESTION_STATUS>
        </SEGMENT>
        <SEGMENT ID="GraphicalLink:102N04797|down|VisibleCompoundLink:(102-04796-->102N04791)|up">
          <RAW_DESCRIPTION><![CDATA[211|W|91|1|2793686<M>211|W|91|1|2785326 >
GraphicalLink:102N04797|down|VisibleCompoundLink:(102-04796-->102N04791)|up >
211|W|91|1|2785326<M>211|W|91|1|2748181{baseroadwayid=211, location=SOUTH ST/EXIT 39, rdsdir=N, rdstmc=102N04797, direction=W,
roadname=I-4}]]></RAW_DESCRIPTION>
          <RDSTMC><![CDATA[102N04797]]></RDSTMC>
          <LOCATION><![CDATA[SOUTH ST/EXIT 39]]></LOCATION>
          <CONGESTION_STATUS><![CDATA[red]]></CONGESTION_STATUS>
        </SEGMENT>
      </SEGMENTS>
```

376

```
    </DIRECTION>
    <DESCRIPTION><![CDATA[I-4]]></DESCRIPTION>
    <DIRECTION VALUE="E">
      <SEGMENTS>
        <SEGMENT ID="GraphicalLink:102P04790|down|VisibleCompoundLink:(102+04791|up-->102P04796)|up">
          <RAW_DESCRIPTION><![CDATA[211|E|91|1|2743781<M>211|E|91|1|2746826 >
GraphicalLink:102P04790|down|VisibleCompoundLink:(102+04791|up-->102P04796)|up >
211|E|91|1|2746826<M>211|E|91|1|2784896{baseroadwayid=211, location=SR-423/JOHN YOUNG PKY/EXIT 32, rdsdir=P, rdstmc=102P04790,
direction=E, roadname=I-4}]]></RAW_DESCRIPTION>
          <RDSTMC><![CDATA[102P04790]]></RDSTMC>
          <LOCATION><![CDATA[SR-423/JOHN YOUNG PKY/EXIT 32]]></LOCATION>
          <CONGESTION_STATUS><![CDATA[red]]></CONGESTION_STATUS>
        </SEGMENT>
```

379

```
      </SEGMENTS>
    </DIRECTION>
  </ROADWAY>
</GRAPHICAL_NETWORK_STATUS>
```

FIG. 47

TIME = $T_0$

| Roadway 1000 | Sensor 1001 | | | | | |
|---|---|---|---|---|---|---|
| Lane | Direction | Speed | Volume | Long Volume | Density | Smoothed Speed (per Dir) |
| 1 | NorthBound | 57 | 40 | 6 | 13 | |
| 2 | NorthBound | 53 | 35 | 3 | 17 | |
| 3 | NorthBound | 55 | 38 | 7 | 10 | 55 |
| 4 | SouthBound | 60 | 25 | 7 | 9 | |
| 5 | SouthBound | 63 | 36 | 8 | 7 | |
| 6 | SouthBound | 61 | 30 | 4 | 10 | 61 |

| Roadway 1000 | Sensor 1002 | | | | | |
|---|---|---|---|---|---|---|
| Lane | Direction | Speed | Volume | Long Volume | Density | Smoothed Speed (per Dir) |
| 1 | NorthBound | 56 | 38 | 5 | 14 | |
| 2 | NorthBound | 55 | 40 | 4 | 16 | |
| 3 | NorthBound | 52 | 41 | 5 | 11 | 54 |
| 4 | SouthBound | 62 | 27 | 7 | 10 | |
| 5 | SouthBound | 60 | 34 | 8 | 8 | |
| 6 | SouthBound | 59 | 32 | 4 | 12 | 60 |

| Roadway 1000 | Sensor 1003 | | | | | |
|---|---|---|---|---|---|---|
| Lane | Direction | Speed | Volume | Long Volume | Density | Smoothed Speed (per Dir) |
| 1 | NorthBound | 55 | 42 | 7 | 15 | |
| 2 | NorthBound | 50 | 37 | 2 | 12 | |
| 3 | NorthBound | 52 | 35 | 5 | 14 | 52 |
| 4 | SouthBound | 59 | 22 | 3 | 10 | |
| 5 | SouthBound | 61 | 32 | 4 | 6 | |
| 6 | SouthBound | 63 | 34 | 5 | 9 | 61 |

| Roadway 1000 | Sensor 1004 | | | | | |
|---|---|---|---|---|---|---|
| Lane | Direction | Speed | Volume | Long Volume | Density | Smoothed Speed (per Dir) |
| 1 | NorthBound | 51 | 36 | 3 | 16 | |
| 2 | NorthBound | 55 | 40 | 5 | 13 | |
| 3 | NorthBound | 56 | 39 | 4 | 12 | 54 |
| 4 | SouthBound | 62 | 22 | 3 | 8 | |
| 5 | SouthBound | 59 | 30 | 6 | 11 | |
| 6 | SouthBound | 65 | 29 | 5 | 9 | 62 |

| Roadway 1000 | Sensor 1005 | | | | | |
|---|---|---|---|---|---|---|
| Lane | Direction | Speed | Volume | Long Volume | Density | Smoothed Speed (per Dir) |
| 1 | NorthBound | 55 | 37 | 5 | 12 | |
| 2 | NorthBound | 56 | 39 | 3 | 16 | |
| 3 | NorthBound | 51 | 40 | 7 | 10 | 54 |
| 4 | SouthBound | 62 | 25 | 7 | 9 | |
| 5 | SouthBound | 58 | 31 | 8 | 8 | |
| 6 | SouthBound | 59 | 32 | 4 | 10 | 60 |

FIG. 50

TIME = $T_0$

| Roadway 2000 | Sensor 2010 | | | | | |
|---|---|---|---|---|---|---|
| **Lane** | **Direction** | **Speed** | **Volume** | **Long Volume** | **Density** | **Smoothed Speed (per Dir)** |
| 1 | NorthBound | 53 | 35 | 5 | 15 | |
| 2 | NorthBound | 50 | 39 | 3 | 12 | |
| 3 | NorthBound | 56 | 38 | 4 | 16 | 53 |
| 4 | SouthBound | 58 | 21 | 5 | 9 | |
| 5 | SouthBound | 61 | 28 | 6 | 10 | |
| 6 | SouthBound | 62 | 30 | 5 | 7 | 60 |

| Roadway 2000 | Sensor 2011 | | | | | |
|---|---|---|---|---|---|---|
| **Lane** | **Direction** | **Speed** | **Volume** | **Long Volume** | **Density** | **Smoothed Speed (per Dir)** |
| 1 | NorthBound | 55 | 33 | 3 | 14 | |
| 2 | NorthBound | 58 | 36 | 5 | 15 | |
| 3 | NorthBound | 52 | 40 | 6 | 12 | 55 |
| 4 | SouthBound | 59 | 25 | 6 | 10 | |
| 5 | SouthBound | 58 | 29 | 8 | 8 | |
| 6 | SouthBound | 61 | 30 | 5 | 9 | 59 |

FIG. 51

TIME = $T_0$

| Link | Avg Speed (MPH) | Length | Travel Time (min) | Comments |
|---|---|---|---|---|
| 100 | 55.0 | 0.7 | 0.7636 | |
| 101 | 54.3 | 0.34 | 0.3755 | |
| 102 | 53.2 | 0.73 | 0.8238 | assumed equal weighting to each sensor |
| 103 | 54.0 | 0.51 | 0.5667 | |
| 104 | 54.0 | 0.24 | 0.2667 | |
| 105 | 54.0 | 0.14 | 0.1556 | |
| 110 | 55.0 | 0.8 | 0.8727 | |
| 111 | 55.0 | 0.34 | 0.3709 | |
| 112 | 55.0 | 0.73 | 0.7964 | |
| 113 | 55.0 | 0.47 | 0.5127 | |
| 114 | 55.0 | 0.25 | 0.2727 | |
| 115 | 55.0 | 0.16 | 0.1745 | |
| 201 | 53.0 | 2.19 | 2.4792 | |
| 202 | 53.7 | 0.08 | 0.0893 | 0.416 miles to sensor 2011<br>0.237 miles to sensor 2010 |
| 203 | 55.0 | 0.42 | 0.4582 | assume negligible effect from sensor 2010 |
| 204 | 55.0 | 0.81 | 0.8836 | |
| 205 | 55.0 | 0.59 | 0.6436 | |
| 210 | 55.0 | 2.27 | 2.4764 | |
| 211 | 55.0 | 0.08 | 0.0873 | 0.416 miles to sensor 2011<br>0.237 miles to sensor 2010 |
| 212 | 55.0 | 0.34 | 0.3709 | assume negligible effect from sensor 2010 |
| 213 | 55.0 | 0.73 | 0.7964 | |
| 214 | 55.0 | 0.65 | 0.7091 | |

FIG. 52

TIME = $T_1$

| Roadway 1000 | Sensor 1001 | | | | | |
|---|---|---|---|---|---|---|
| Lane | Direction | Speed | Volume | Long Volume | Density | Smoothed Speed (per Dir) |
| 1 | NorthBound | 57 | 40 | 6 | 13 | |
| 2 | NorthBound | 53 | 35 | 3 | 17 | |
| 3 | NorthBound | 55 | 38 | 7 | 10 | 55 |
| 4 | SouthBound | 60 | 25 | 7 | 9 | |
| 5 | SouthBound | 63 | 36 | 8 | 7 | |
| 6 | SouthBound | 61 | 30 | 4 | 10 | 61 |

| Roadway 1000 | Sensor 1002 | | | | | |
|---|---|---|---|---|---|---|
| Lane | Direction | Speed | Volume | Long Volume | Density | Smoothed Speed (per Dir) |
| 1 | NorthBound | 56 | 25 | 5 | 9 | |
| 2 | NorthBound | 55 | 28 | 4 | 10 | |
| 3 | NorthBound | 52 | 29 | 5 | 11 | 54 |
| 4 | SouthBound | 50 | 27 | 7 | 15 | |
| 5 | SouthBound | 49 | 34 | 8 | 16 | |
| 6 | SouthBound | 48 | 32 | 4 | 12 | 49 |

| Roadway 1000 | Sensor 1003 | | | | | |
|---|---|---|---|---|---|---|
| Lane | Direction | Speed | Volume | Long Volume | Density | Smoothed Speed (per Dir) |
| 1 | NorthBound | 19 | 25 | 7 | 28 | |
| 2 | NorthBound | 23 | 29 | 2 | 31 | |
| 3 | NorthBound | 21 | 28 | 5 | 33 | 21 |
| 4 | SouthBound | 59 | 22 | 3 | 10 | |
| 5 | SouthBound | 61 | 32 | 4 | 6 | |
| 6 | SouthBound | 63 | 34 | 5 | 9 | 61 |

| Roadway 1000 | Sensor 1004 | | | | | |
|---|---|---|---|---|---|---|
| Lane | Direction | Speed | Volume | Long Volume | Density | Smoothed Speed (per Dir) |
| 1 | NorthBound | 51 | 36 | 3 | 16 | |
| 2 | NorthBound | 55 | 40 | 5 | 13 | |
| 3 | NorthBound | 56 | 39 | 4 | 12 | 54 |
| 4 | SouthBound | 62 | 22 | 3 | 8 | |
| 5 | SouthBound | 59 | 30 | 6 | 11 | |
| 6 | SouthBound | 65 | 29 | 5 | 9 | 62 |

| Roadway 1000 | Sensor 1005 | | | | | |
|---|---|---|---|---|---|---|
| Lane | Direction | Speed | Volume | Long Volume | Density | Smoothed Speed (per Dir) |
| 1 | NorthBound | 55 | 37 | 5 | 12 | |
| 2 | NorthBound | 56 | 39 | 3 | 16 | |
| 3 | NorthBound | 51 | 40 | 7 | 10 | 54 |
| 4 | SouthBound | 62 | 25 | 7 | 9 | |
| 5 | SouthBound | 58 | 31 | 8 | 8 | |
| 6 | SouthBound | 59 | 32 | 4 | 10 | 60 |

FIG. 56

TIME = $T_1$

| Roadway 2000 | Sensor 2010 | | | | | |
|---|---|---|---|---|---|---|
| Lane | Direction | Speed | Volume | Long Volume | Density | Smoothed Speed (per Dir) |
| 1 | NorthBound | 55 | 37 | 6 | 16 | |
| 2 | NorthBound | 51 | 39 | 2 | 12 | |
| 3 | NorthBound | 54 | 34 | 3 | 13 | 53 |
| 4 | SouthBound | 59 | 21 | 5 | 7 | |
| 5 | SouthBound | 60 | 25 | 4 | 9 | |
| 6 | SouthBound | 63 | 30 | 3 | 11 | 61 |

| Roadway 2000 | Sensor 2011 | | | | | |
|---|---|---|---|---|---|---|
| Lane | Direction | Speed | Volume | Long Volume | Density | Smoothed Speed (per Dir) |
| 1 | NorthBound | 53 | 35 | 6 | 17 | |
| 2 | NorthBound | 56 | 31 | 2 | 15 | |
| 3 | NorthBound | 53 | 39 | 5 | 13 | 54 |
| 4 | SouthBound | 62 | 24 | 2 | 8 | |
| 5 | SouthBound | 59 | 28 | 7 | 7 | |
| 6 | SouthBound | 61 | 31 | 4 | 9 | 61 |

FIG. 57

TIME = $T_1$

| Link | Avg Speed (MPH) | Length | Travel Time (min) | Comments |
|---|---|---|---|---|
| 100 | 55.0 | 0.7 | 0.7636 | |
| 101 | 54.3 | 0.34 | 0.3755 | |
| 102 | 37.5 | 0.73 | 1.1680 | assumed equal weighting to each sensor |
| 103 | 54.0 | 0.51 | 0.5667 | |
| 104 | 54.0 | 0.24 | 0.2667 | |
| 105 | 54.0 | 0.14 | 0.1556 | |
| 110 | 55.0 | 0.8 | 0.8727 | |
| 111 | 49.0 | 0.34 | 0.4163 | |
| 112 | 55.0 | 0.73 | 0.7964 | |
| 113 | 55.0 | 0.47 | 0.5127 | |
| 114 | 55.0 | 0.25 | 0.2727 | |
| 115 | 55.0 | 0.16 | 0.1745 | |
| 201 | 53.3 | 2.19 | 2.4638 | |
| 202 | 53.6 | 0.08 | 0.0896 | 0.416 miles to sensor 2011<br>0.237 miles to sensor 2010 |
| 203 | 54.0 | 0.42 | 0.4667 | assume negligible effect from sensor 2010 |
| 204 | 53.0 | 0.81 | 0.9170 | |
| 205 | 54.5 | 0.59 | 0.6495 | |
| 210 | 55.0 | 2.27 | 2.4764 | |
| 211 | 55.0 | 0.08 | 0.0873 | 0.416 miles to sensor 2011<br>0.237 miles to sensor 2010 |
| 212 | 55.0 | 0.34 | 0.3709 | assume negligible effect from sensor 2010 |
| 213 | 55.0 | 0.73 | 0.7964 | |
| 214 | 55.0 | 0.65 | 0.7091 | |

FIG. 58

TIME = $T_2$

| Roadway 1000 | Sensor 1001 | | | | | |
|---|---|---|---|---|---|---|
| Lane | Direction | Speed | Volume | Long Volume | Density | Smoothed Speed (per Dir) |
| 1 | NorthBound | 65 | 35 | 4 | 8 | |
| 2 | NorthBound | 68 | 30 | 3 | 6 | |
| 3 | NorthBound | 65 | 32 | 5 | 7 | 66 |
| 4 | SouthBound | 48 | 32 | 6 | 14 | |
| 5 | SouthBound | 53 | 35 | 8 | 9 | |
| 6 | SouthBound | 55 | 29 | 5 | 10 | 52 |

| Roadway 1000 | Sensor 1002 | | | | | |
|---|---|---|---|---|---|---|
| Lane | Direction | Speed | Volume | Long Volume | Density | Smoothed Speed (per Dir) |
| 1 | NorthBound | 64 | 25 | 3 | 7 | |
| 2 | NorthBound | 70 | 22 | 2 | 6 | |
| 3 | NorthBound | 68 | 19 | 3 | 4 | 67 |
| 4 | SouthBound | *20* | 40 | 6 | 30 | |
| 5 | SouthBound | *24* | 38 | 5 | 27 | |
| 6 | SouthBound | *23* | 32 | 4 | 26 | *22* |

| Roadway 1000 | Sensor 1003 | | | | | |
|---|---|---|---|---|---|---|
| Lane | Direction | Speed | Volume | Long Volume | Density | Smoothed Speed (per Dir) |
| 1 | NorthBound | *4* | *8* | 1 | 48 | |
| 2 | NorthBound | *6* | *11* | 1 | 40 | |
| 3 | NorthBound | *7* | *10* | 2 | 37 | *6* |
| 4 | SouthBound | 65 | 18 | 4 | 8 | |
| 5 | SouthBound | 71 | 30 | 5 | 5 | |
| 6 | SouthBound | 68 | 29 | 4 | 5 | 68 |

| Roadway 1000 | Sensor 1004 | | | | | |
|---|---|---|---|---|---|---|
| Lane | Direction | Speed | Volume | Long Volume | Density | Smoothed Speed (per Dir) |
| 1 | NorthBound | *10* | *20* | 4 | 40 | |
| 2 | NorthBound | *14* | *24* | 6 | 37 | |
| 3 | NorthBound | *12* | *18* | 4 | 42 | *12* |
| 4 | SouthBound | 63 | 27 | 4 | 7 | |
| 5 | SouthBound | 68 | 30 | 3 | 8 | |
| 6 | SouthBound | 64 | 26 | 7 | 6 | 65 |

| Roadway 1000 | Sensor 1005 | | | | | |
|---|---|---|---|---|---|---|
| Lane | Direction | Speed | Volume | Long Volume | Density | Smoothed Speed (per Dir) |
| 1 | NorthBound | 37 | 30 | 2 | 22 | |
| 2 | NorthBound | 32 | 34 | 3 | 24 | |
| 3 | NorthBound | 40 | 32 | 1 | 16 | 36 |
| 4 | SouthBound | 62 | 25 | 7 | 9 | |
| 5 | SouthBound | 58 | 31 | 8 | 8 | |
| 6 | SouthBound | 59 | 32 | 4 | 10 | 60 |

FIG. 62

TIME = $T_2$

| Roadway 2000 | Sensor 2010 | | | | | |
|---|---|---|---|---|---|---|
| **Lane** | **Direction** | **Speed** | **Volume** | **Long Volume** | **Density** | **Smoothed Speed (per Dir)** |
| 1 | NorthBound | 51 | 35 | 6 | 16 | |
| 2 | NorthBound | 53 | 41 | 4 | 13 | |
| 3 | NorthBound | 54 | 38 | 4 | 18 | 53 |
| 4 | SouthBound | 45 | 22 | 2 | 5 | |
| 5 | SouthBound | 49 | 30 | 1 | 4 | |
| 6 | SouthBound | 53 | 28 | 1 | 5 | 49 |

| Roadway 2000 | Sensor 2011 | | | | | |
|---|---|---|---|---|---|---|
| **Lane** | **Direction** | **Speed** | **Volume** | **Long Volume** | **Density** | **Smoothed Speed (per Dir)** |
| 1 | NorthBound | 56 | 35 | 3 | 17 | |
| 2 | NorthBound | 52 | 34 | 6 | 15 | |
| 3 | NorthBound | 55 | 39 | 3 | 13 | 54 |
| 4 | SouthBound | *16* | *24* | 0 | 35 | |
| 5 | SouthBound | *12* | *18* | 2 | 39 | |
| 6 | SouthBound | 34 | 35 | 2 | 27 | 21 |

FIG. 63

TIME = $T_2$

| Link | Avg Speed (MPH) | Length | Travel Time (min) | Comments |
|---|---|---|---|---|
| 100 | 55.0 | 0.7 | 0.7636 | |
| 101 | 55.0 | 0.34 | 0.3709 | |
| 102 | 8.8 | 0.73 | 4.9585 | assumed equal weighting to each sensor |
| 103 | 24.2 | 0.51 | 1.2662 | |
| 104 | 36.3 | 0.24 | 0.3963 | 6.852220398 |
| 105 | 36.3 | 0.14 | 0.2312 | |
| 110 | 52.0 | 0.8 | 0.9231 | |
| 111 | 22.3 | 0.34 | 0.9134 | |
| 112 | 55.0 | 0.73 | 0.7964 | |
| 113 | 55.0 | 0.47 | 0.5127 | |
| 114 | 55.0 | 0.25 | 0.2727 | |
| 115 | 55.0 | 0.16 | 0.1745 | |
| 201 | 52.7 | 2.19 | 2.4949 | |
| 202 | 53.3 | 0.08 | 0.0901 | 0.416 miles to sensor 2011<br>0.237 miles to sensor 2010 |
| 203 | 54.3 | 0.42 | 0.4638 | assume negligible effect from sensor 2010 |
| 204 | 55.0 | 0.81 | 0.8836 | |
| 205 | 53.5 | 0.59 | 0.6617 | |
| 210 | 49.0 | 2.27 | 2.7796 | |
| 211 | 38.7 | 0.08 | 0.1240 | 0.416 miles to sensor 2011<br>0.237 miles to sensor 2010 |
| 212 | 20.7 | 0.34 | 0.9871 | assume negligible effect from sensor 2010 |
| 213 | 16.0 | 0.73 | 2.7375 | |
| 214 | 23.0 | 0.65 | 1.6957 | |

Congestion Item Calculations

| Past 320 to Ridley Park | | |
|---|---|---|
| Travel time (min) | 6.85 | 7 |
| Delay (min) | 5.08 | 5 |
| Avg Speed (MPH) | 14.19 | 14 |

| 420 to Ridley Park (SB) | | |
|---|---|---|
| Travel time (min) | 1.84 | 2 |
| Delay (min) | 0.59 | 1 |
| Avg Speed (MPH) | 37.24 | 37 |

| MacDade to I-95 | | |
|---|---|---|
| Travel time (min) | 3.72 | 4 |
| Delay (min) | 2.56 | 3 |
| Avg Speed (MPH) | 17.24 | 17 |

FIG. 64

METHOD OF CREATING A VIRTUAL TRAFFIC NETWORK

CROSS REFERENCE TO RELATED APPLICATION

This application claims the benefit of U.S. Provisional Patent Application No. 60/428,596 filed Nov. 22, 2002 and entitled "Traffic Data Processing and Management System."

COMPACT DISC APPENDIX

This patent application includes an Appendix on one compact disc having a file named appendix.txt, created on Jun. 17, 2003, and having a size of 108,544 bytes. The compact disc is incorporated by reference into the present patent application.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

The present invention relates generally to monitoring traffic flow conditions on a road system, and more specifically to collecting, processing and managing traffic data to determine real-time traffic conditions on a roadway using a virtual traffic network.

Collecting and disseminating information related to traffic flow on a road system is generally known in the art. FIG. 1 illustrates an example of a typical traffic collection and reporting system 100. Information about traffic flow is often collected through live descriptions of the road system (or portions thereof) from aircraft or mobile units, traffic operators 102 listening to scanners, or other similar means. One commonly used method of collecting traffic flow information usually entails describing traffic information in free form text, and inputting the text to a PC or similar application 104 specifically designed for collecting a free-form text description of traffic information. The traffic information is typically displayed as a group of text messages 106, and is often copied or faxed to a media house (not shown), such as a radio or TV station, for on-air reporting. Since the collected traffic information as reported by the media house is not substantively processed, it has no value other then the text description itself. A recent improvement in reporting traffic information includes delivering the traffic information directly to the media house via direct network connections. However, the traffic information is still reported in the same text message format 106. FIG. 2 shows an enlarged version of the text message format 106 according to the prior art.

The traffic industry has long struggled with the problem of being able to determine, with any degree of accuracy and consistency, the details and lifecycle of traffic events that occur along major roadways. The details (such as the number of and which lanes are affected, the presence of emergency personnel on scene, road closure, shoulder passage, etc.) are important in understanding the impact the traffic event will have on roadway conditions, both immediately and over time. The ability to accurately describe an event in detail in a consistent and standard manner, track the progress of the event over time, accurately locate the event on a geo-spatial traffic network to determine its relative locations to other events and roadways, and understand the impact of the event on traffic flow, all in real-time, has never been accurately solved. Without this level of detail it is impossible to accurately correlate factors such as multiple traffic events on the same or different highways, conditions at the time of the event, or the predicted clearance time of the event.

FIG. 1 further shows another well known method of collecting and reporting traffic data through the use of digital roadside sensors 115 (either within the roadway such as loops or within the right of way on free standing structures). Various types of sensors 115 known in the art are employed for this purpose. The digital sensors 115 collect traffic flow data 116 such as speed, volume (number of vehicles passing the sensor per period of time), vehicle classification (car or truck), and density (the percentage of the roadway that is occupied with vehicles). The traffic flow data 116 is generally collected in real-time (as it occurs), and then input to a computer system 103 where the flow data 116 is analyzed and converted into traffic data which is integrated with commercial map data 108.

However, the traffic industry has been unable to integrate real-time traffic flow data 116 on a lane-by-lane basis into advanced traffic event collection systems. Existing traffic event collection systems, such as PB Farradyne's MIST® software platform, California's CALTRANS, and GCM Gateway developed by the Illinois Dept. of Transportation, collect flow data in real-time but do not integrate that data into event collection systems that accurately provide point to point traffic data (such as congestion information) on a geo-located road network and which reflects the impact of other traffic events in the system. The most advanced systems provide color-coded traffic flow reflecting analysis of the traffic flow data 116, typically in the form of a web page showing a graphical representation 105 of the road system. FIG. 3 shows an enlarged version of the graphical representation 105 of the traffic flow on the road system. Such a system does not report traffic data in real-time nor does the traffic data reflect traffic events on the road system. A few traffic collection systems provide actual travel times along major corridors and roadways. However, such traffic data is also not integrated with a traffic event collection system. Even though some public agencies and a few private companies display a map with traffic events combined with traffic flow data 116 on a web page or computer application 107, the resulting traffic data is discrete and displayed on the road network map from a rendering perspective. That is, the traffic events have no knowledge of the flow data on the map and vice versa, and their impact on each other is unknown—each piece of data is placed on the map independently of the other data. The traffic event information and the flow data are treated as separate systems even though they are placed on the same road network map from the users' perspective. Additionally, since the exact location of an event is never mapped onto a geo-spatial traffic network, there is never an understanding of how one traffic event impacts the overall flow of traffic. FIG. 4 shows an enlarged version of a web page or computer application 107 showing combined traffic flow data 116 with traffic events according to the prior art.

Without integrating real-time traffic flow data 116 with event data, the true impact that a traffic event has on roadway conditions is impossible to determine. For example, accurate traffic data, such as travel time and delay time cannot be determined. Additionally, the geo-location of congestion on a road system, the queuing effect the congestion is causing, the determination of travel time through that congestion and the dissemination of that information in real-time is impossible.

Problems also persist with the state of the art of reporting traffic data. First, there is no parameterization of individual traffic events so that specific changes in the lifecycle of a traffic event may be tracked. Additionally, when reporting traffic information via free form-text there is no consistent format from report to report. For example, if a lane is closed, a subsequent traffic report may or may not include the state of the lane. Furthermore, since there are no set parameters, the traffic data cannot be tracked, stored and compared historically. Thus, if a similar event previously occurred on the same or different roadway, there is no ability to view detailed information of a prior, similar event to compare various traffic data, such as clearance time, to help predict clearance time for the present traffic event.

Present traffic systems also cannot store real-time flow data and event information in a "warehouse" so that true data mining against both the flow data and event data can be achieved for use in real-time advanced algorithms. As such, there is no national database of traffic data that integrates real-time flow and event data that can be mined either for a particular city or across multiple metropolitan areas, up to and including a national view.

Because of the manner in which traffic data is currently reported, there is no system which not only integrates traffic event information and traffic flow data, but also provides an interface so that different applications can easily retrieve the traffic data in a format that which is suitable for multiple media applications, such as radio and television. There is also no ability to fully qualify the flow data together with event data on a spatially correct road system which allows applications to retrieve traffic data in a personalized and granular way.

Additionally, present traffic collection and reporting systems do not utilize a layered architecture that enables collection of disparate types of sensor data for integration into a common platform with event data which, on the user side, provides a common component architecture to allow for seamless integration of various renderings in multiple applications for the government, telematics, fleet/logistics, the media, and consumers. There is no layered architecture that allows end-user applications to leverage a common component interface so that multiple renderings of the same data can be easily manipulated and multiple traffic reporting applications can be developed without altering the core traffic data processing and management system.

BRIEF SUMMARY OF THE INVENTION

Briefly stated, according to one aspect of the present invention, a computer-implemented method of creating a virtual traffic network includes inputting map data representing a road system and inputting flow data related to traffic flow on the road system. The map data and the flow data are integrated to produce a virtual traffic network representing traffic conditions on the road system.

According to another aspect of the present invention, a computer-implemented method of creating a virtual traffic network includes inputting map data representing a road system and inputting traffic information about traffic events on the road system. The map data and the traffic information are integrated to produce a virtual traffic network representing traffic conditions on the road system.

According to another aspect of the present invention, a computer-implemented method of creating a virtual traffic network includes inputting map data representing a road system, inputting flow data related to traffic flow on the road system, and inputting traffic information about traffic events on the road system. The method further comprises integrating the map data, the flow data and the traffic information to produce a virtual traffic network representing traffic conditions on the road system.

According to another aspect of the present invention, a computer-implemented method of entering traffic information for a road system comprises providing one or more electronic traffic forms, each traffic form including at least one predefined traffic parameter field. Traffic information about traffic events on the road system is entered into one of the traffic forms. The traffic information corresponds to the at least one traffic parameter field on the selected form. A virtual traffic network representing traffic conditions on the road system is provided. The traffic information entered into the selected traffic form is integrated into the virtual traffic network.

According to another aspect of the present invention, a computer-implemented method of querying a system that provides traffic data for a road system includes providing a virtual traffic network representing traffic conditions on the road system. The method further includes providing one or more electronic traffic forms, each form including at least one predefined traffic parameter field. A traffic query is entered into one of the forms, the query defined by the at least one traffic parameter field on the selected form. The traffic data corresponding to the query from the virtual traffic network is obtained.

According to another aspect of the present invention, a computer-implemented method of rendering traffic data representing traffic conditions on a road system includes defining one or more renditions of the traffic data, each rendition comprising a predefined rendition rule set. A traffic item in input and a rendition of traffic data corresponding to the traffic item for each defined rendition is created.

According to another aspect of the present invention, a computer-implemented method of rendering traffic data representing traffic conditions on a road system includes selecting a group of traffic items, each traffic item represented by one or more renditions. The method further includes selecting one of the renditions, each rendition having a predefined rendition rule set. The traffic data for the group of traffic items within the selected rendition and organizing the traffic data according to the rendition rule set in the selected rendition is obtained.

According to another aspect of the present invention, a computer-implemented method of displaying traffic data corresponding to a virtual traffic network representing traffic conditions on a road system includes creating a graphical map of the road system, the graphical map including a plurality of links. The method further includes determining a status of one or more of the links on the graphical map, the status corresponding to the traffic data associated with each respective link. An animated traffic flow display of the road system is created by combining the graphical map and the status for each link.

According to another aspect of the present invention, an animated traffic flow display representing traffic conditions on a road system includes a graphical map of the road system. The graphical map includes a plurality of links of the road system. Animated traffic flow on the graphical map is associated with each link. The animated traffic flow corresponds to traffic data from a virtual traffic network associated with that link.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

The patent or application file contains at least one drawing executed in color. Copies of this patent or patent application publication with color drawing(s) will be provided by the Office upon request and payment of the necessary fee.

In the drawings:

FIG. 1 is a representation of a traffic collection system according to the prior art;

FIG. 2 is an enlarged view of the text message format in the system of FIG. 1;

FIG. 3 is an enlarged view of the graphical representation in the system of FIG. 1;

FIG. 4 is an enlarged view of the web or computer application in the system of FIG. 1;

FIG. 5 is a representation of a preferred embodiment of a traffic data processing system according to the present invention;

FIG. 6 is an enlarged view of the integrated web application in the system of FIG. 5;

FIG. 7 is an alternate representation of the traffic system of FIG. 5;

FIG. 8 is a block flow diagram showing the high level system components of the traffic system of FIG. 5;

FIG. 9 is a diagram showing the relationship of the sensor data collection architecture to the Virtual Geo-Spatial Traffic Network ("VGSTN") of FIG. 5;

FIG. 10 is a diagram describing the network layer objects of the VGSTN of FIG. 5;

FIG. 11 is a table showing the stored procedures for the Traffic User Roadway Knowledge Interface ("TURKI") used with the VGSTN of FIG. 5;

Figure 5:
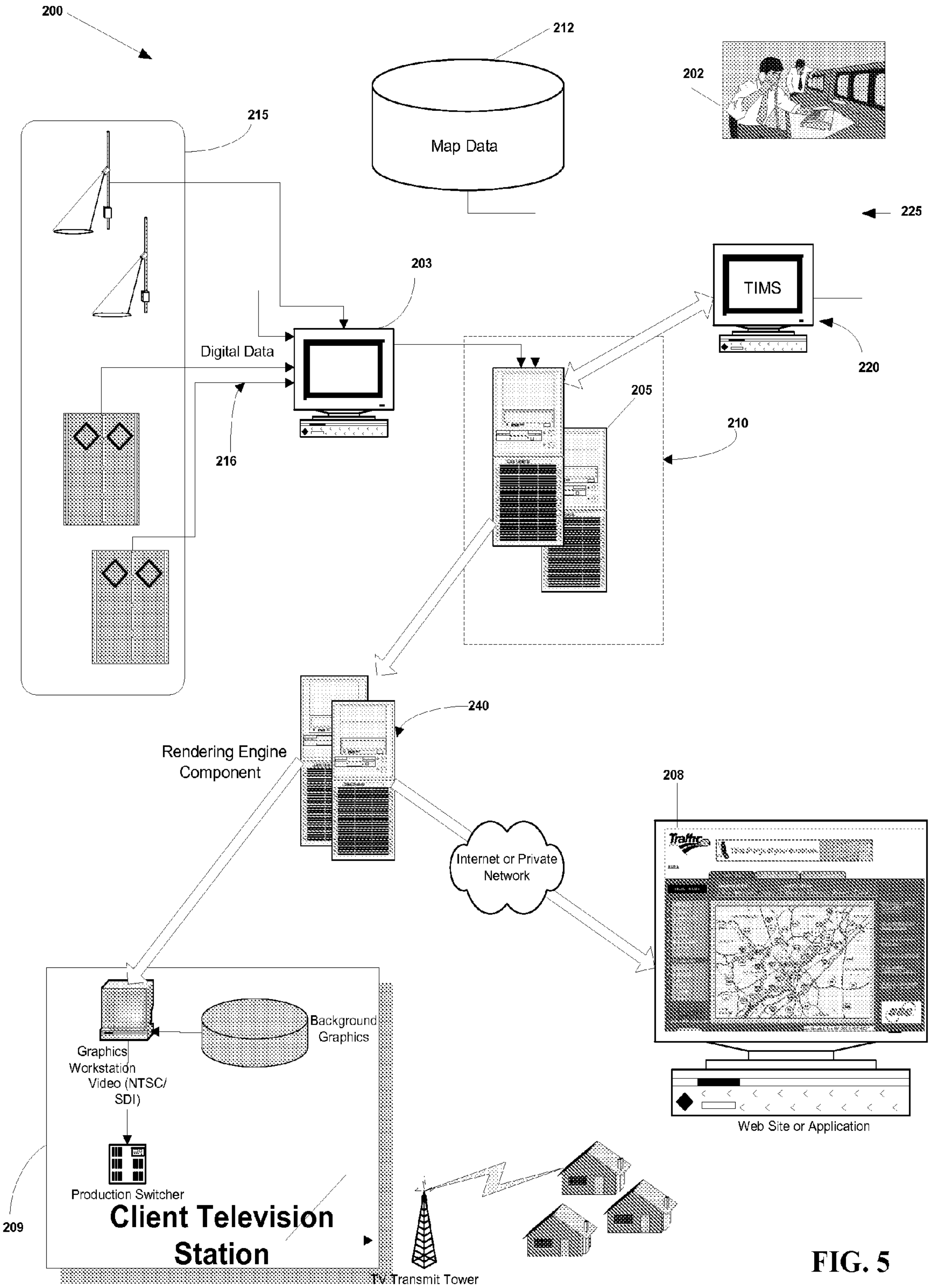
Figure 12:
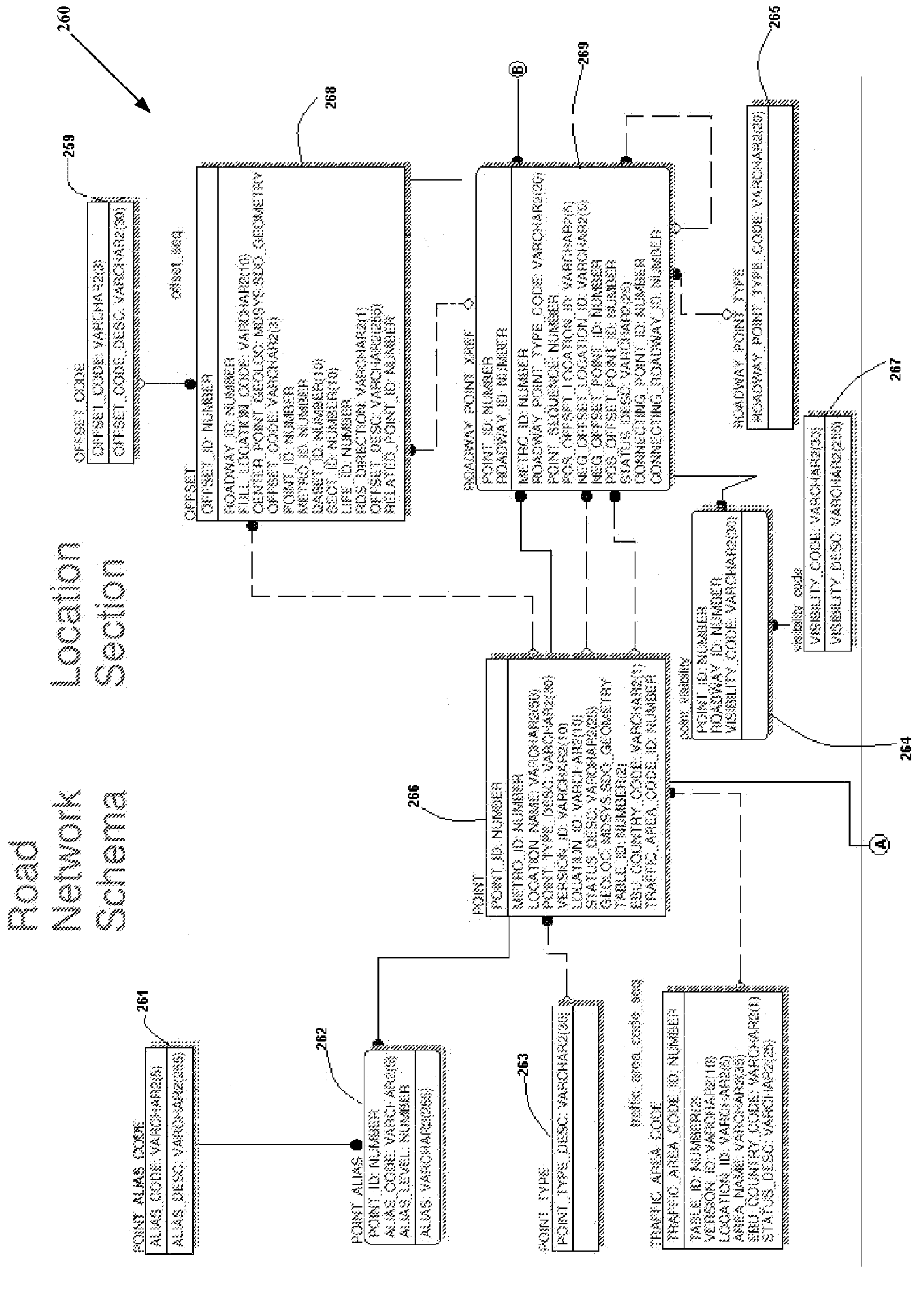
Figure 13:
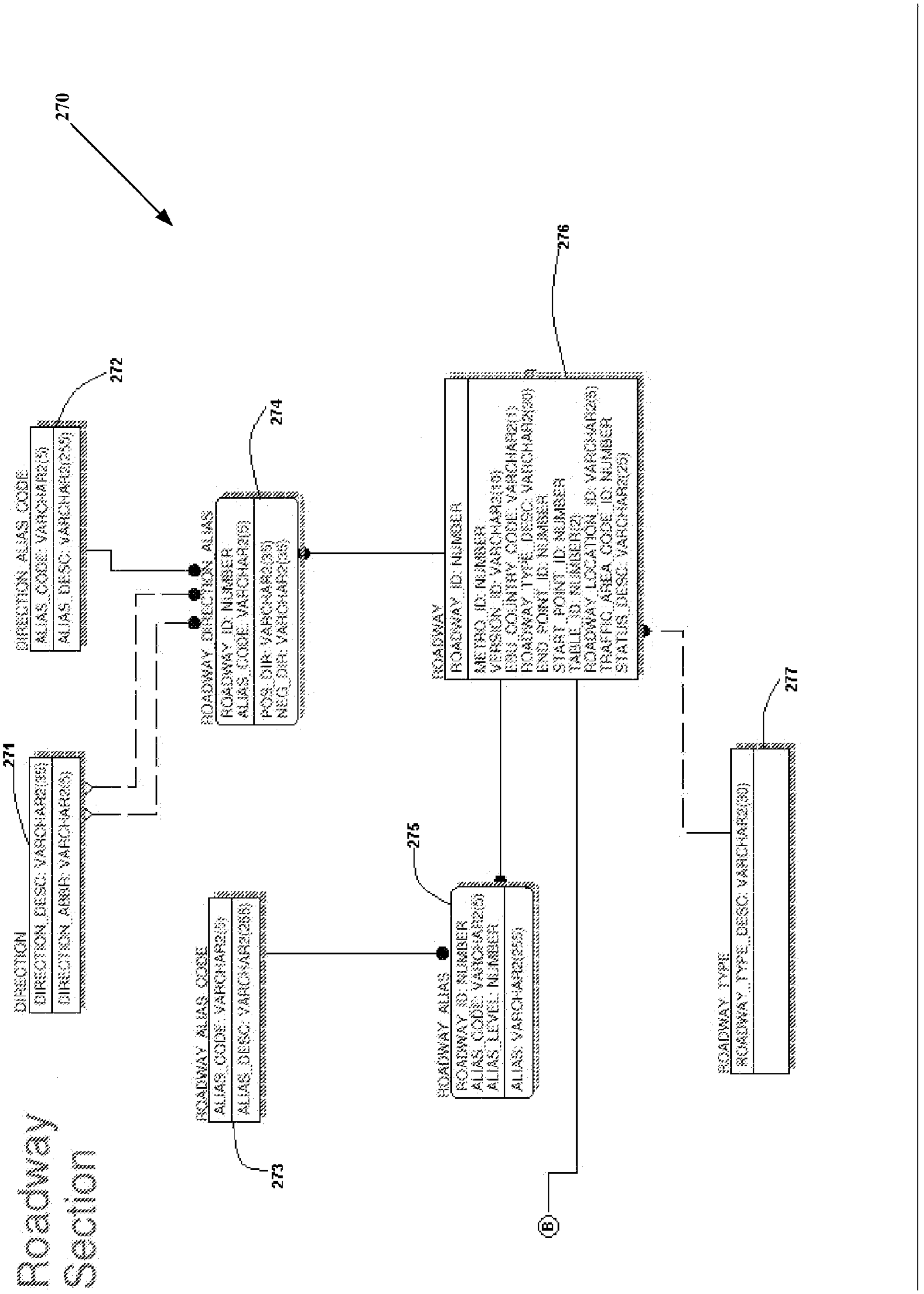
Figure 14:
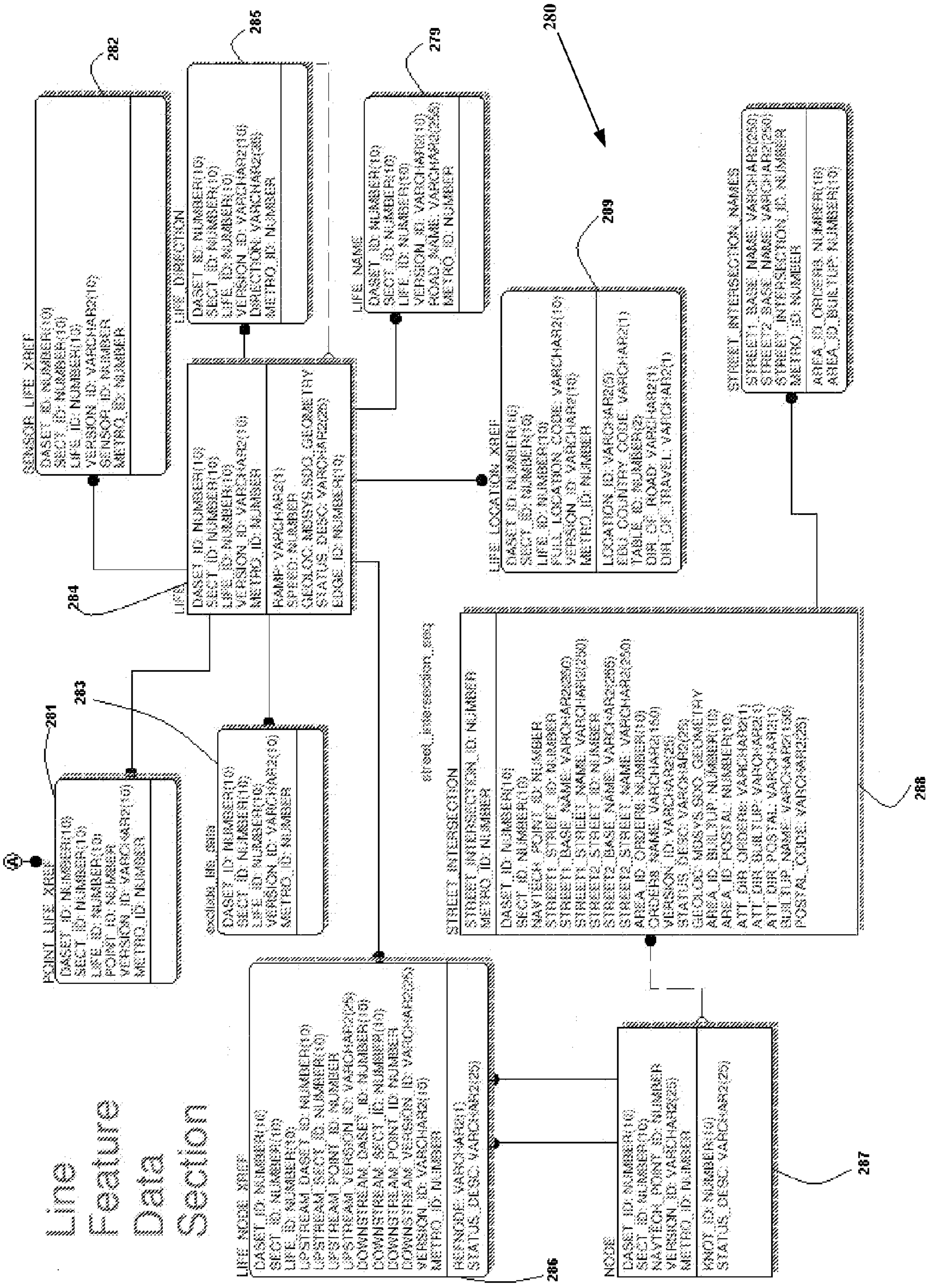
Figure 15:
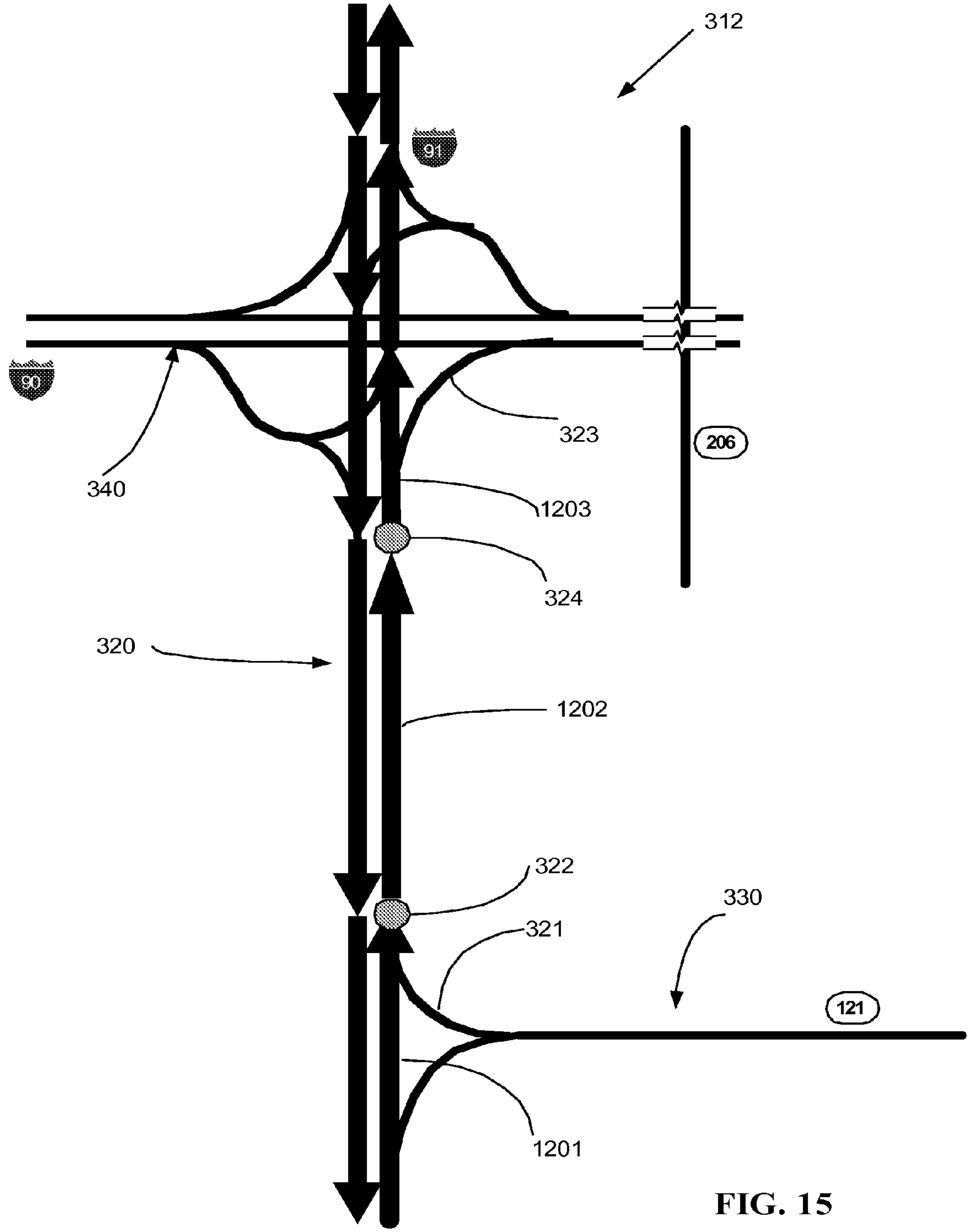
Figure 16:
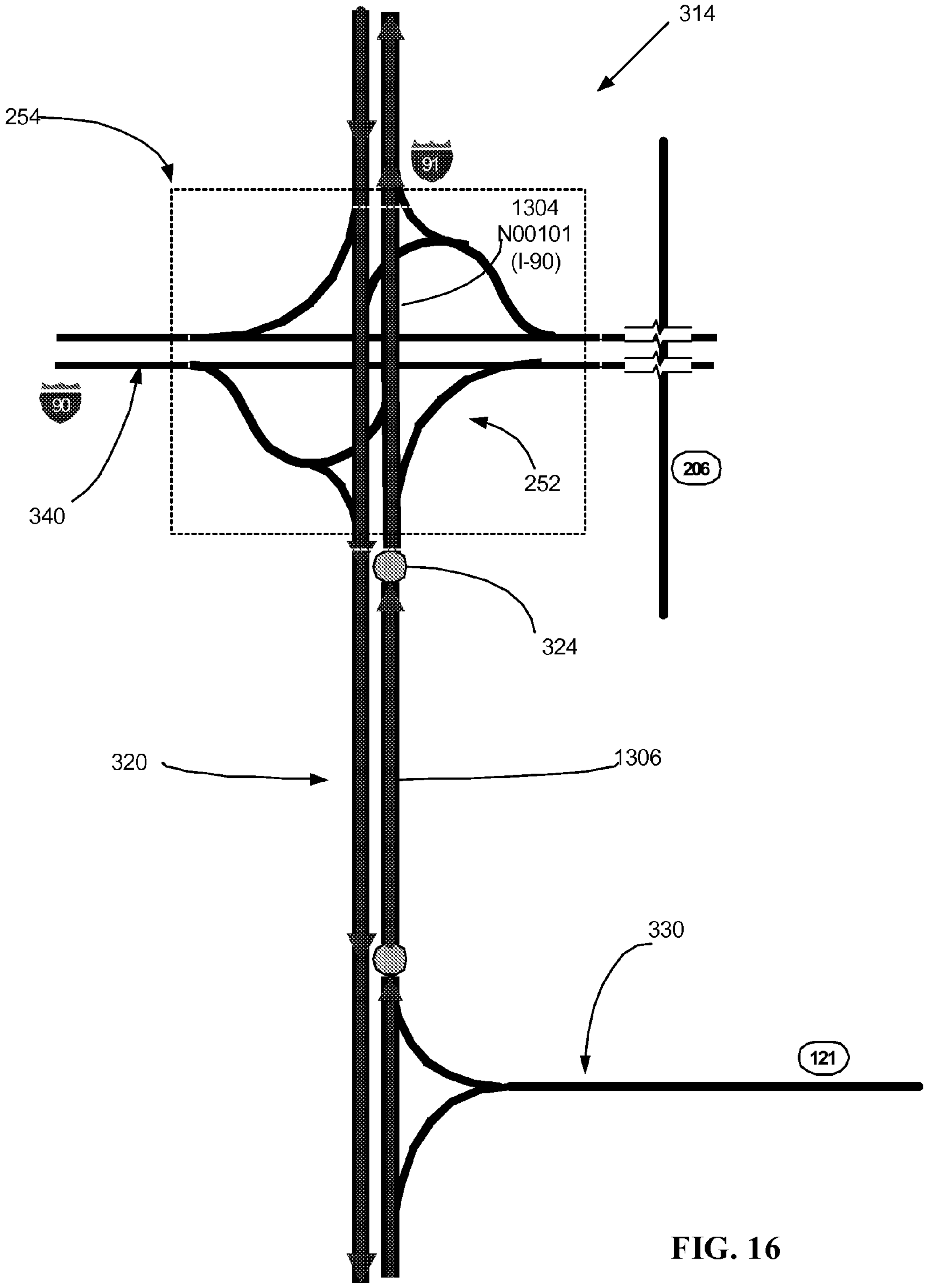
Figure 17:
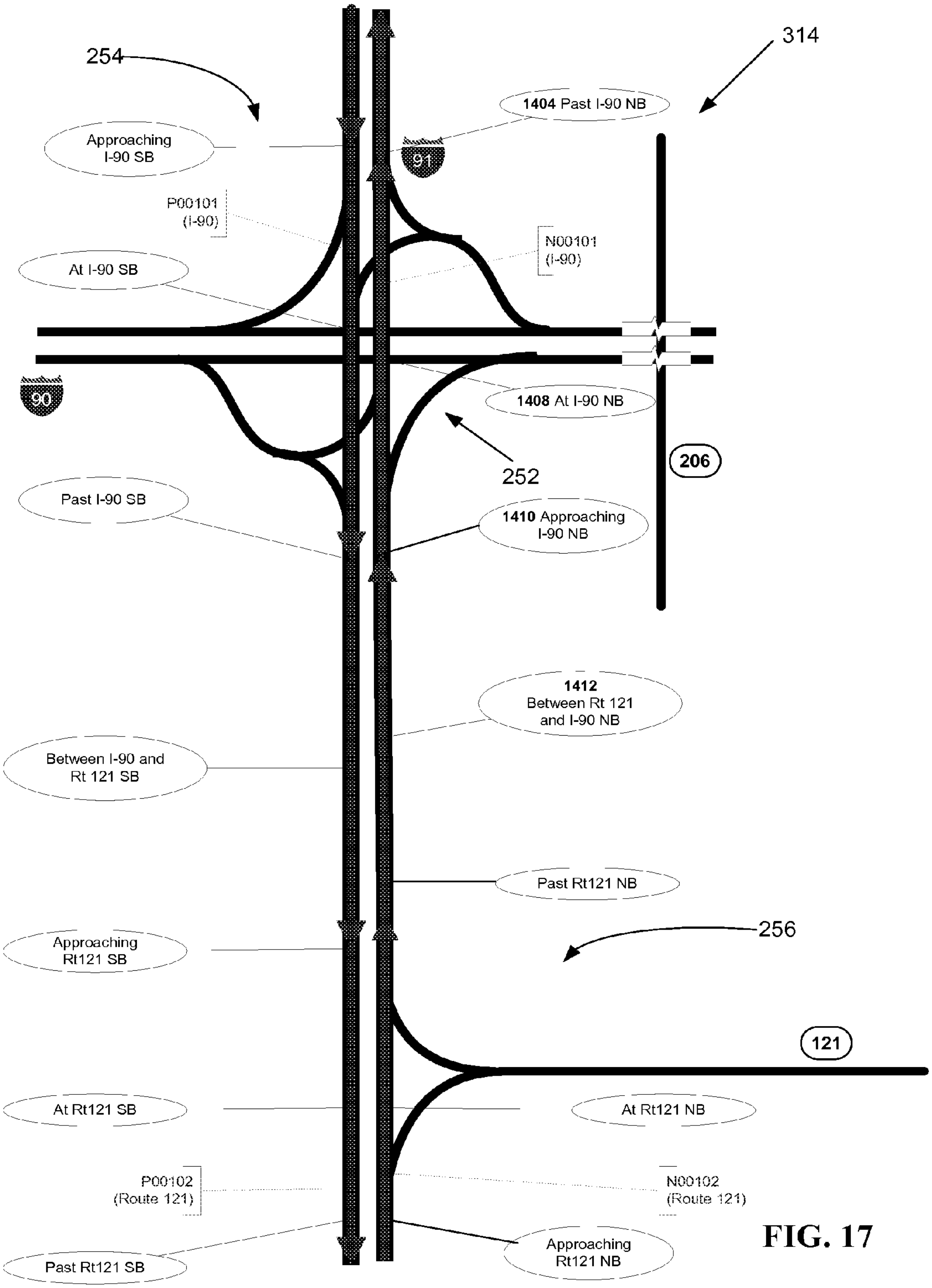
Figure 18:
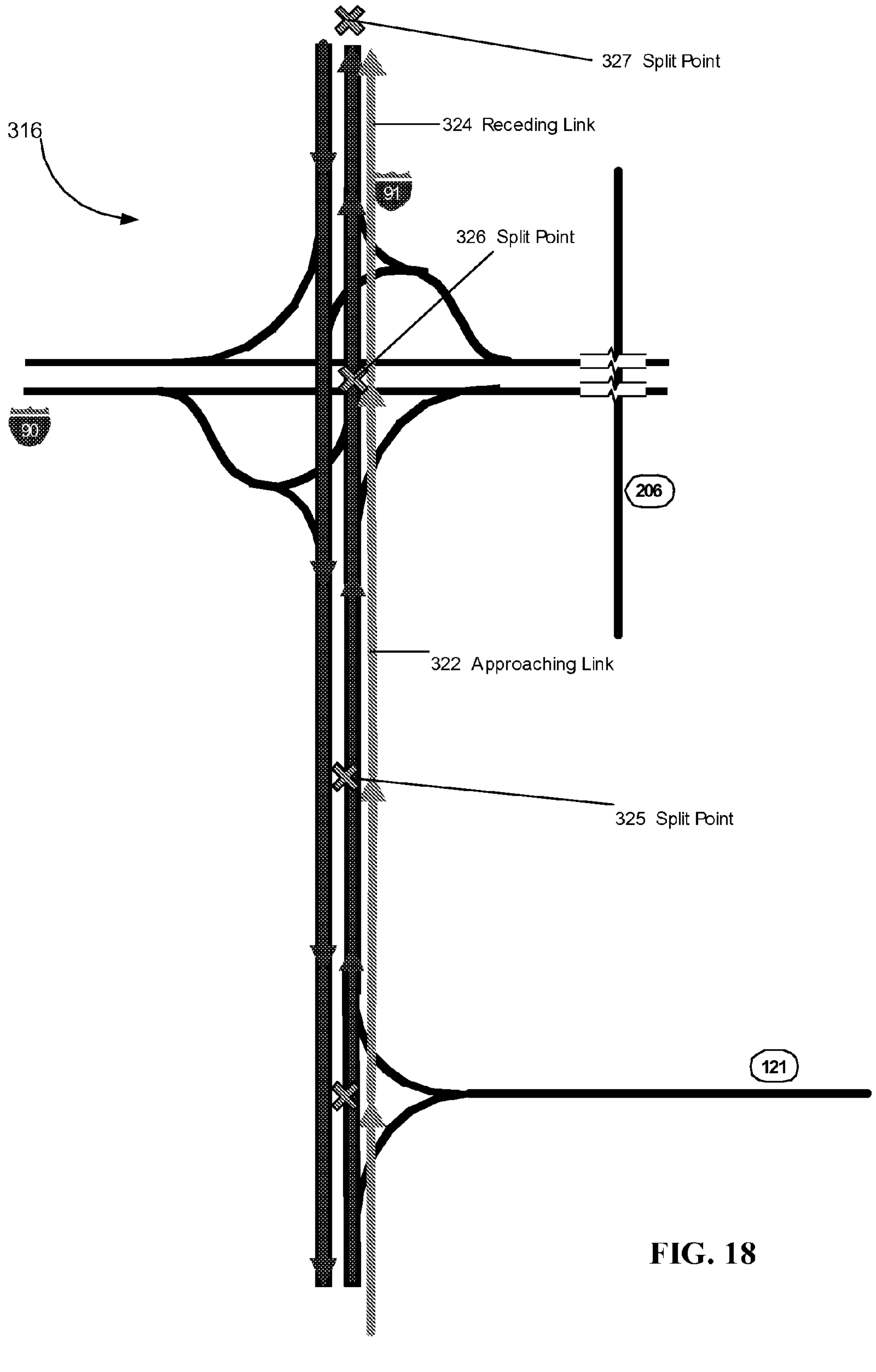
Figure 19:
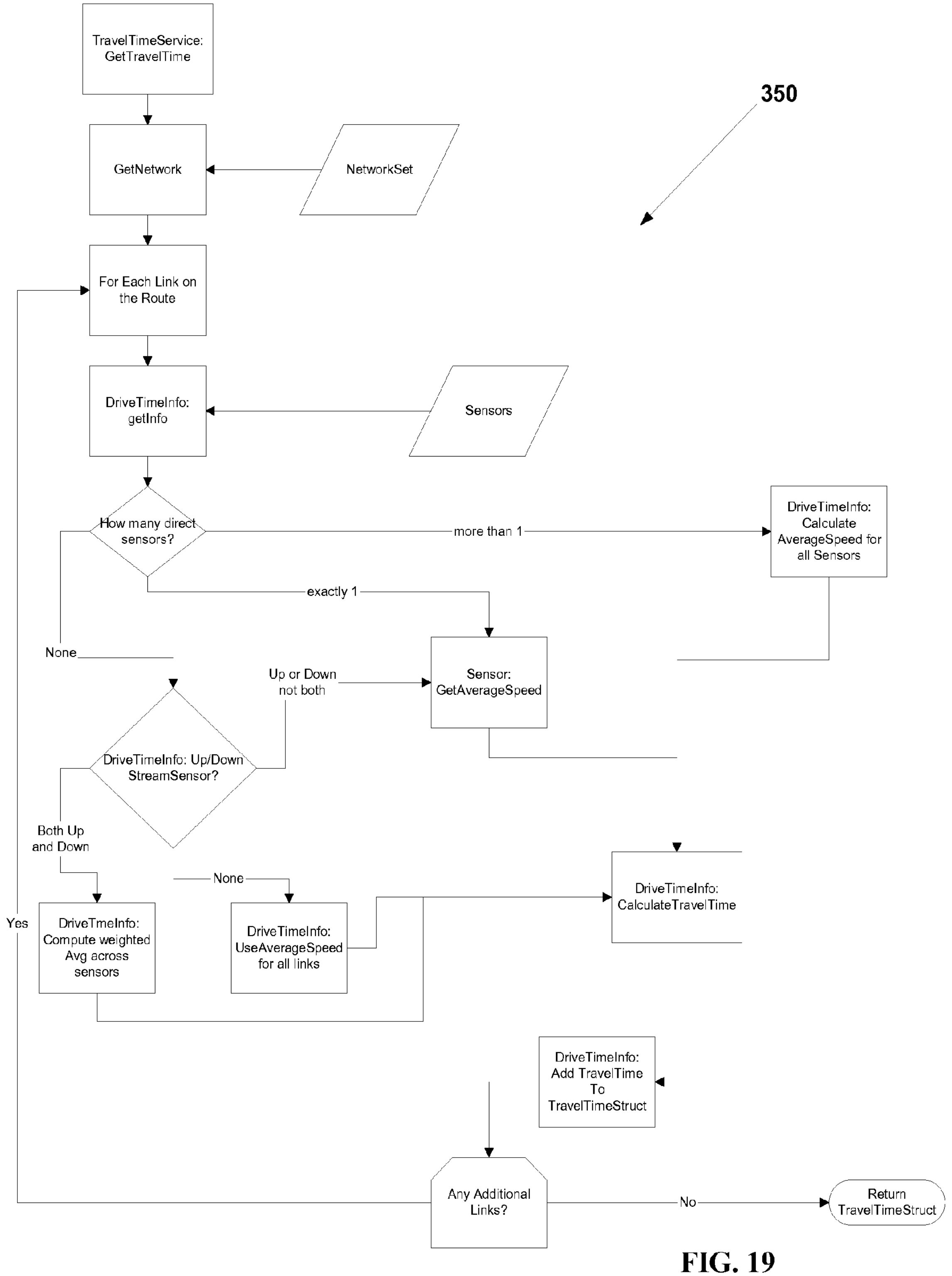
Figure 20:
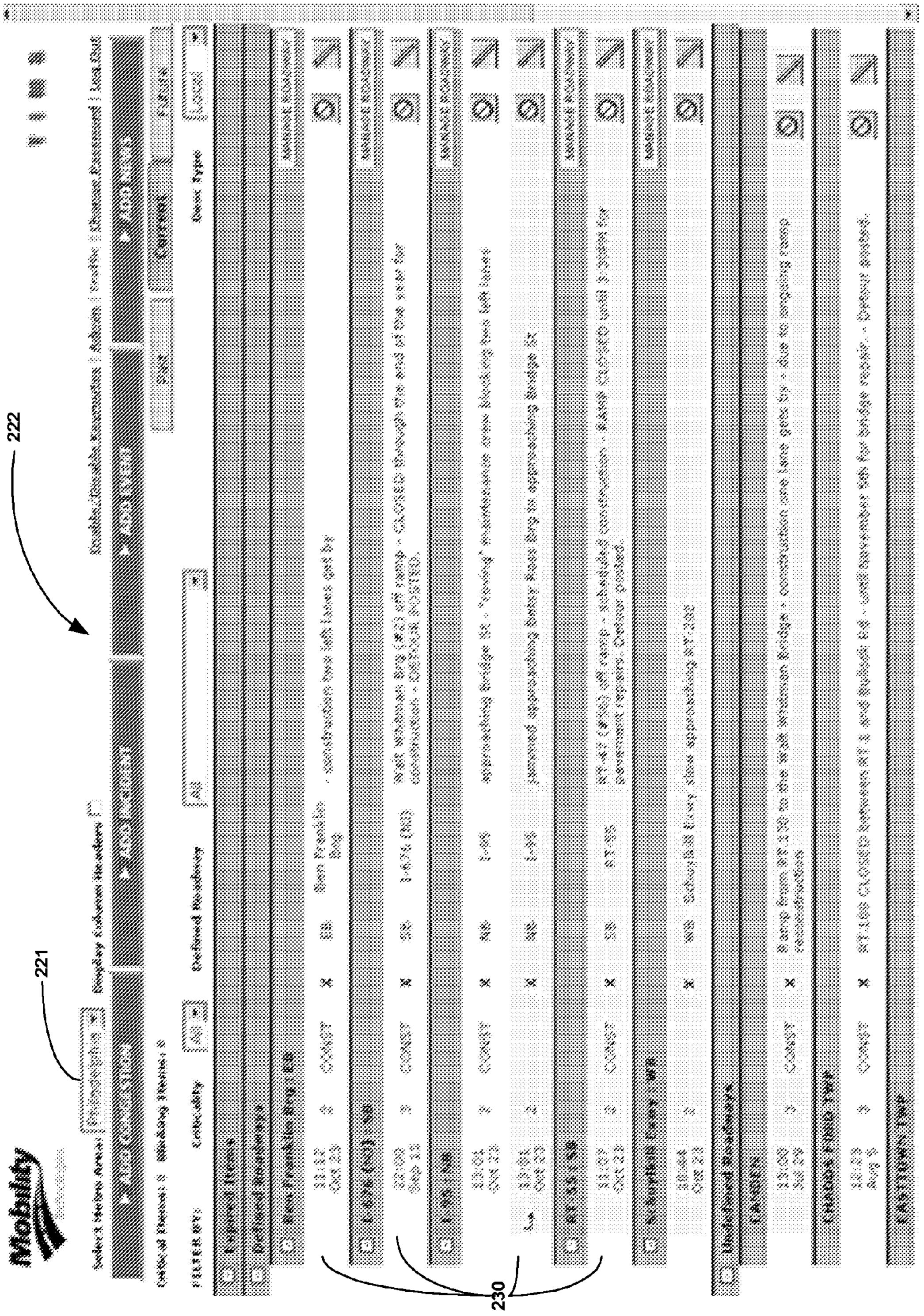
Figure 21:
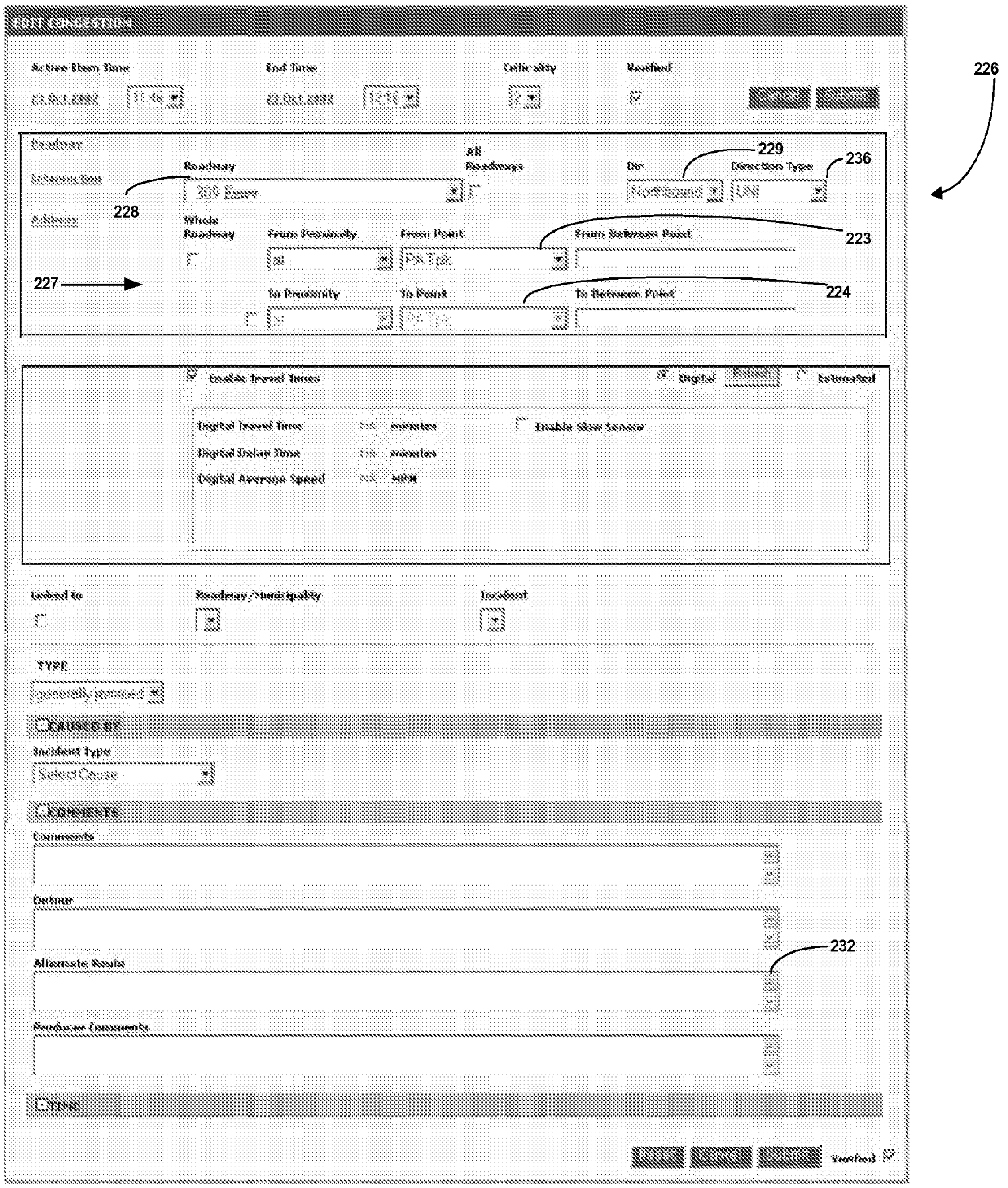
Figure 22:
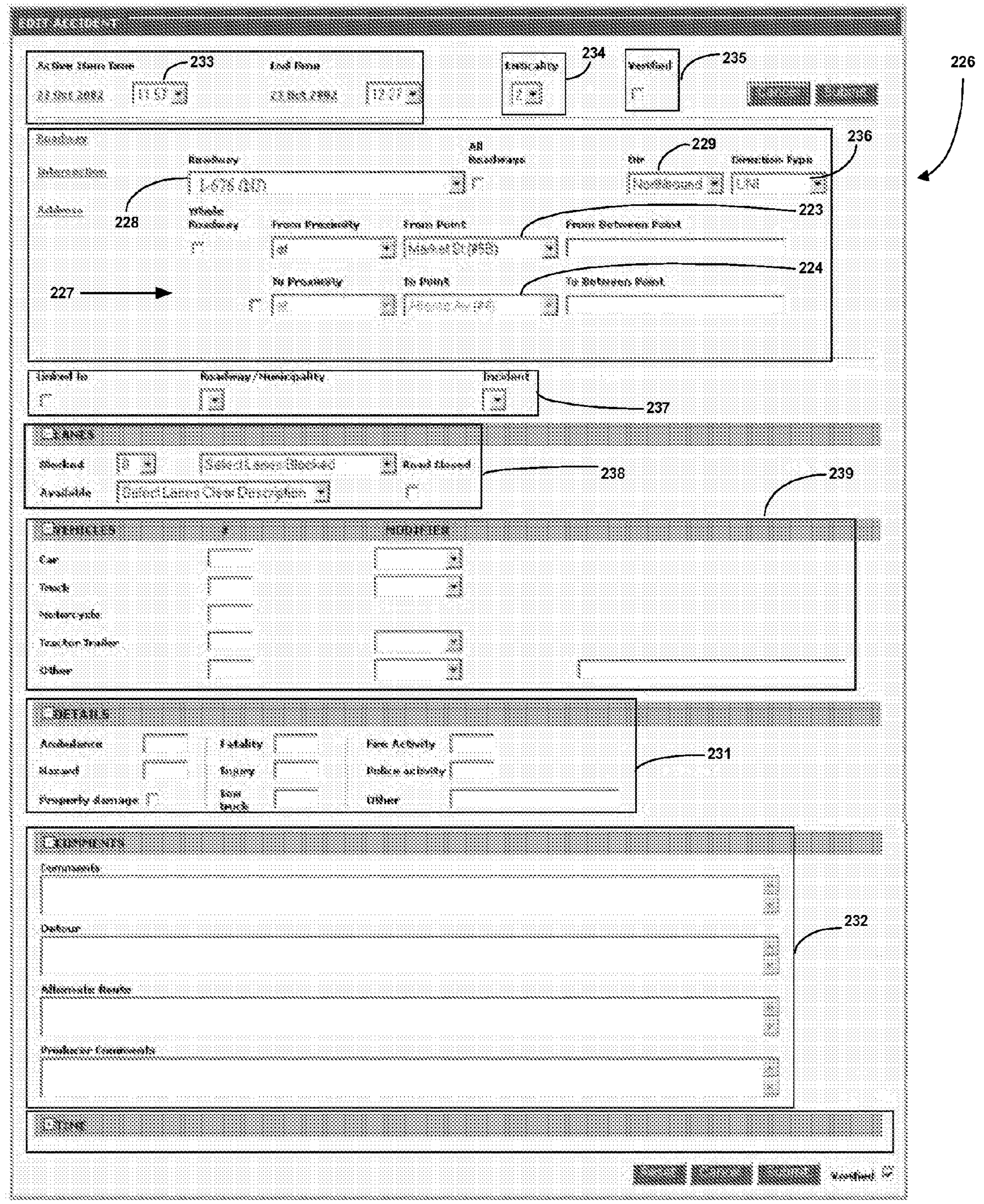
Figure 23:
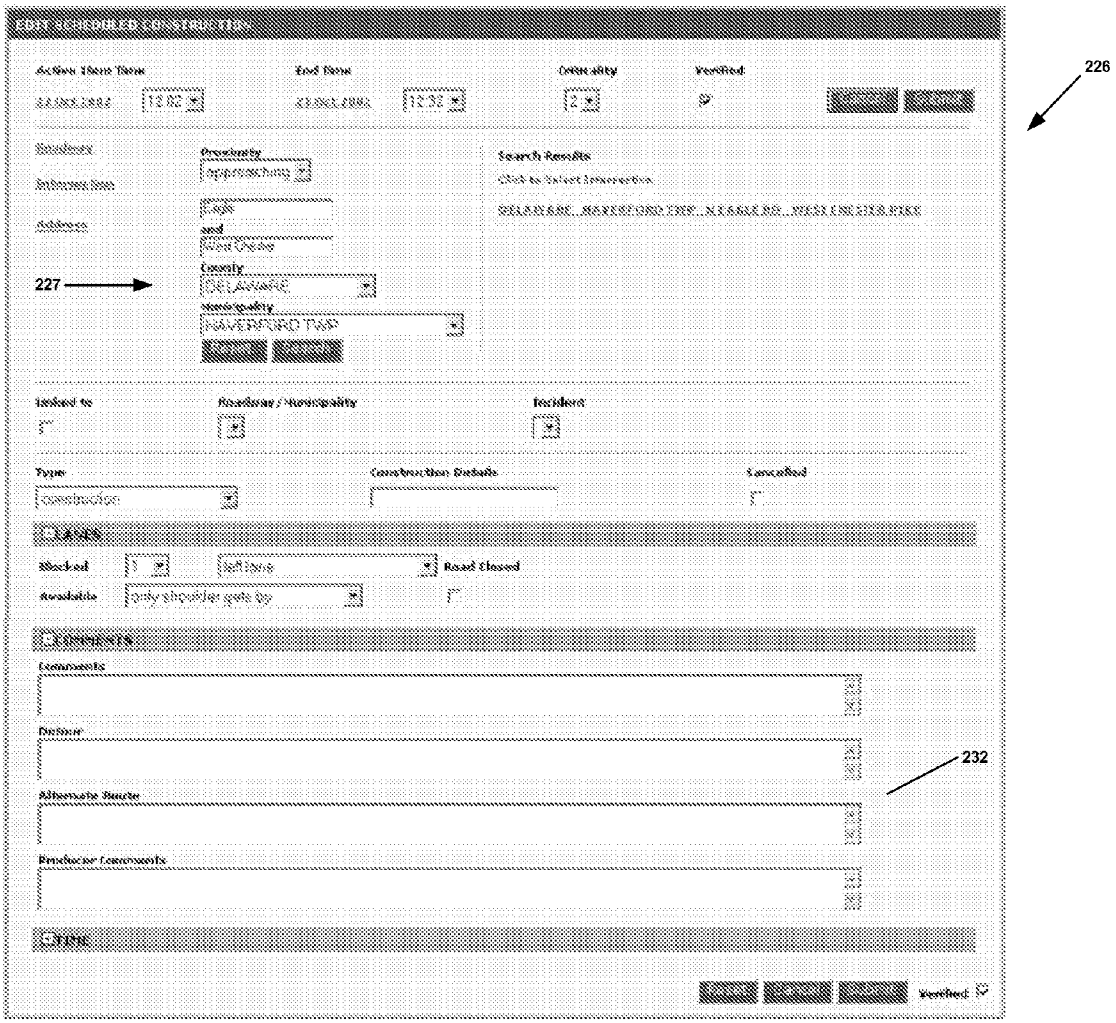
Figure 24:
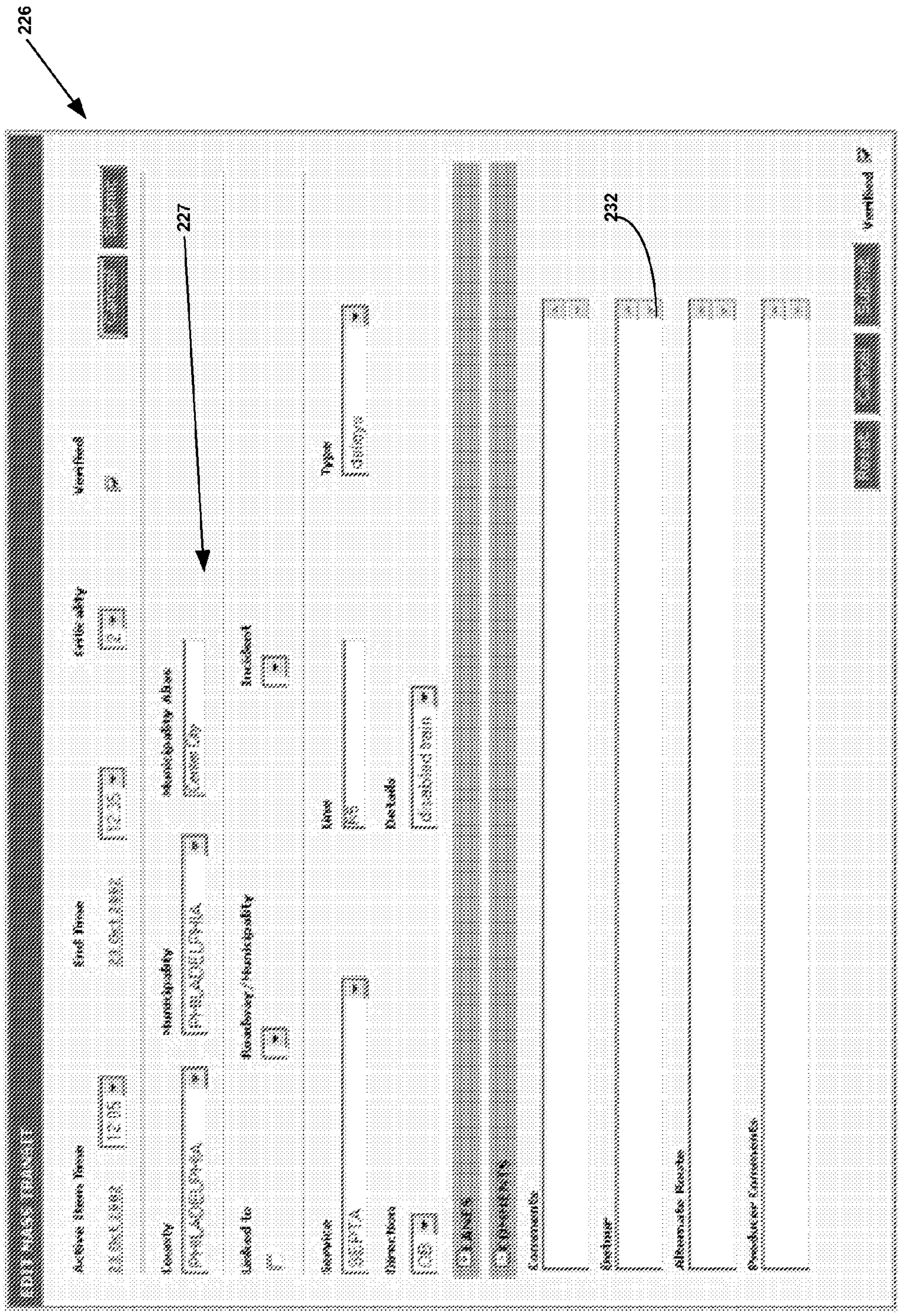
Figure 25:
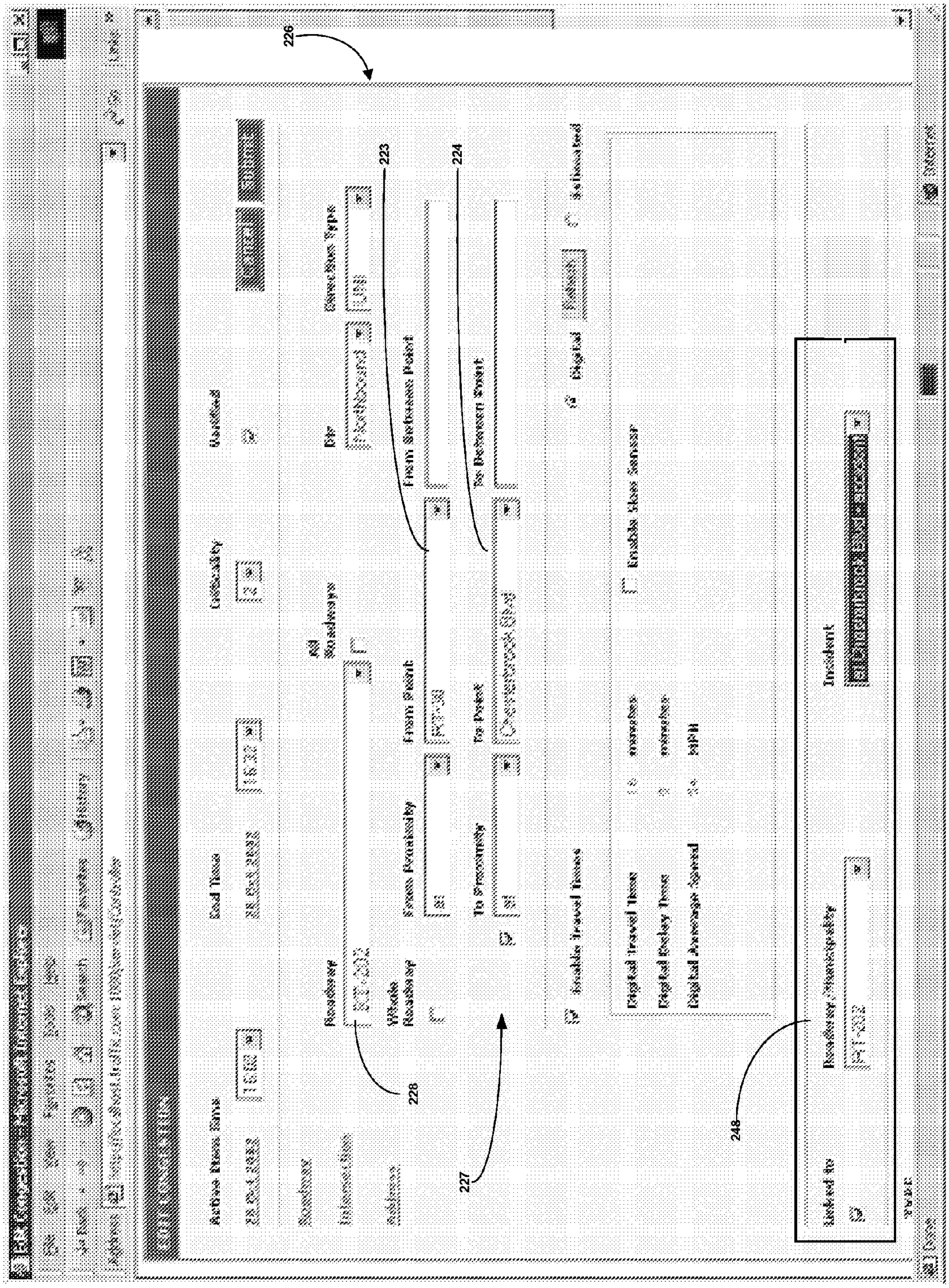
Figure 26:
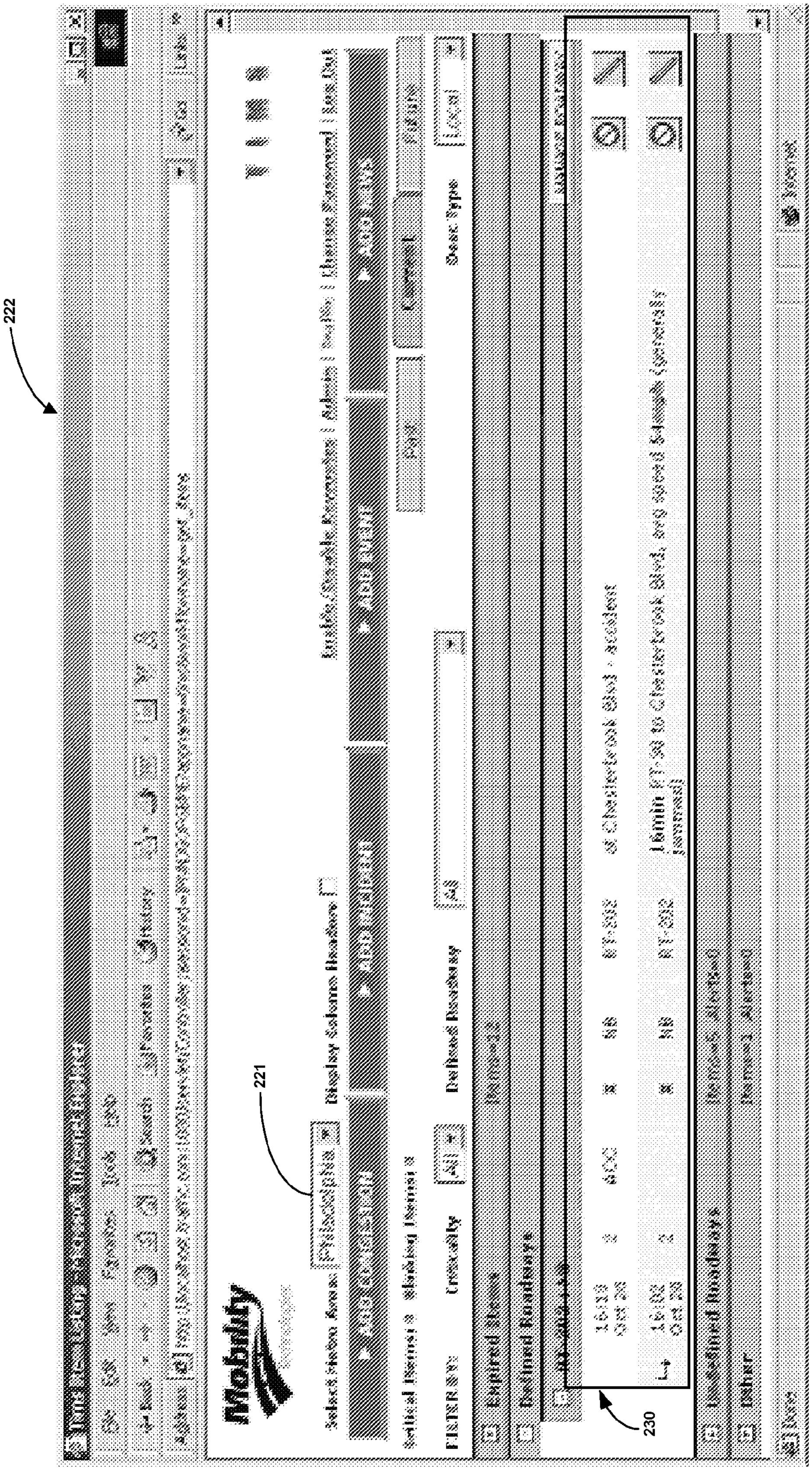
Figure 27:
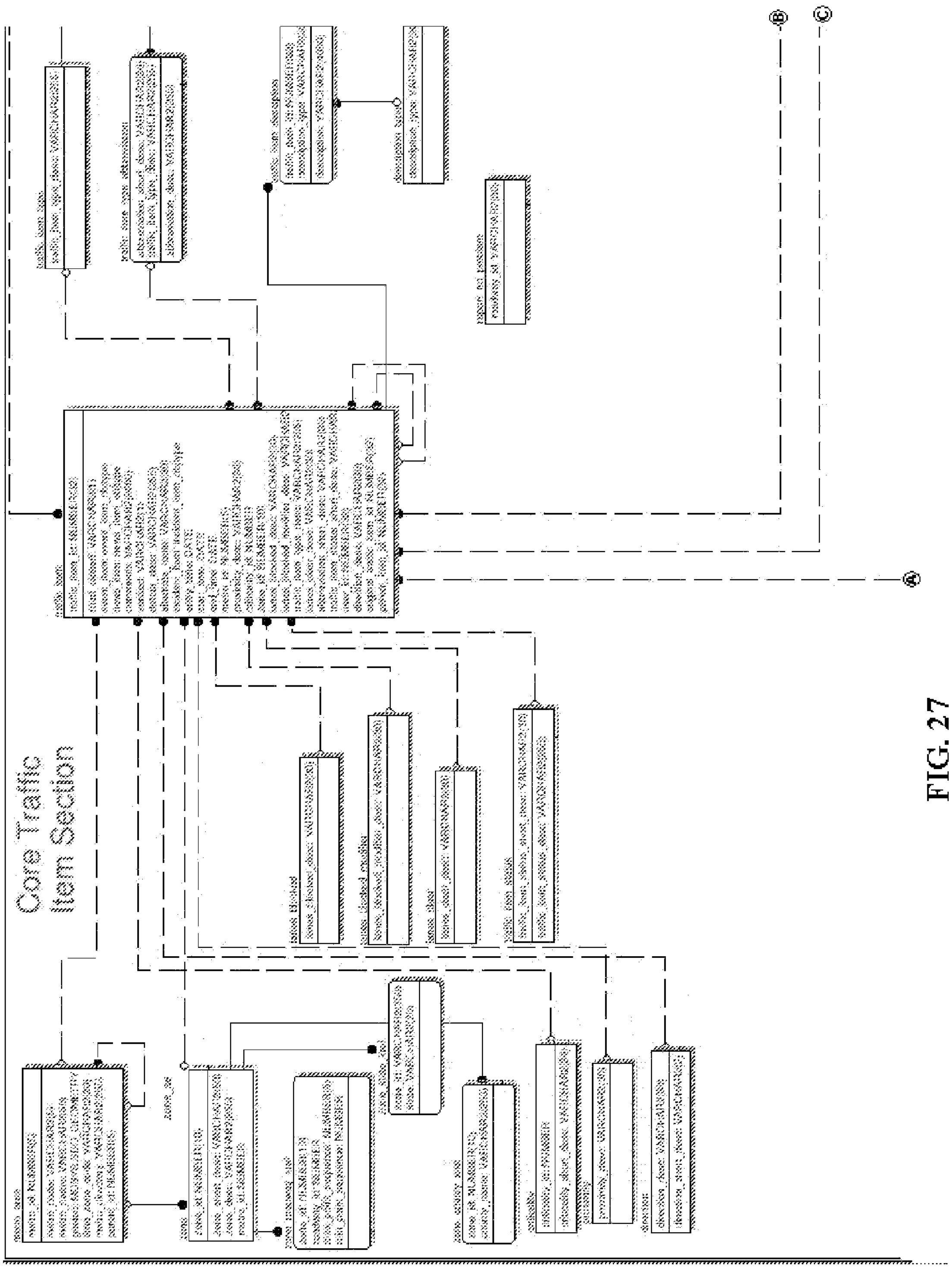
Figure 28:
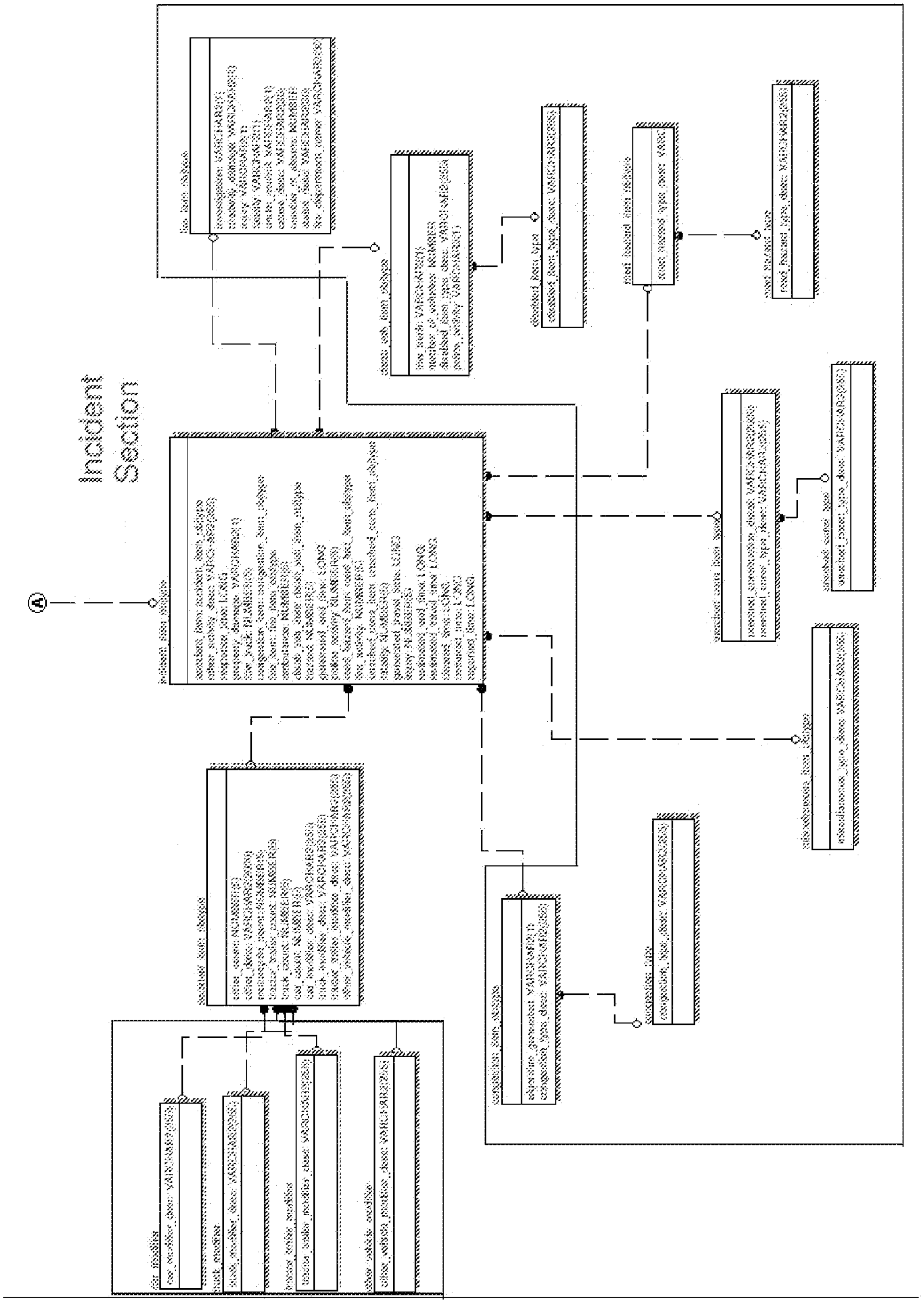
Figure 29:
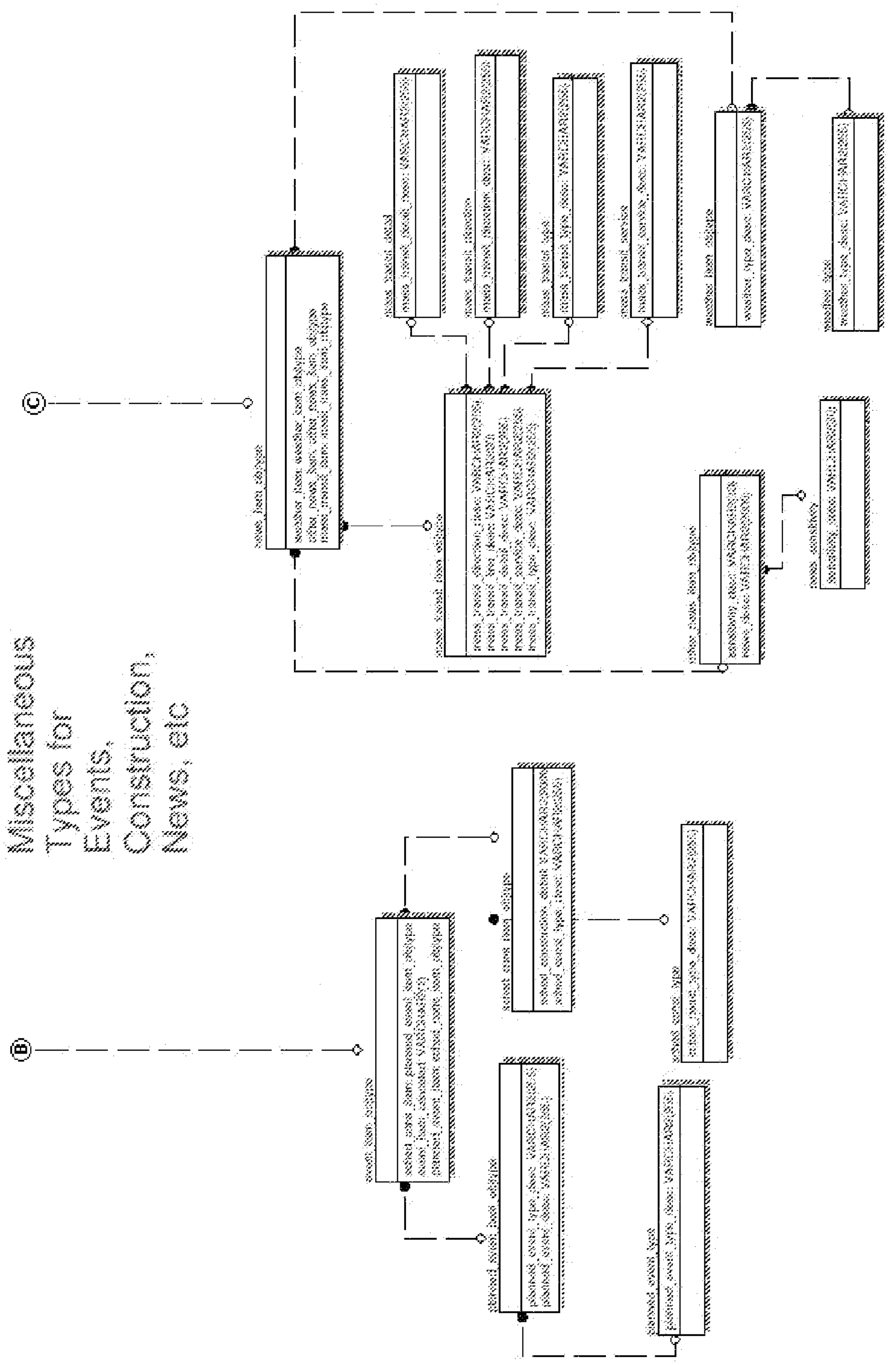
Figure 30:
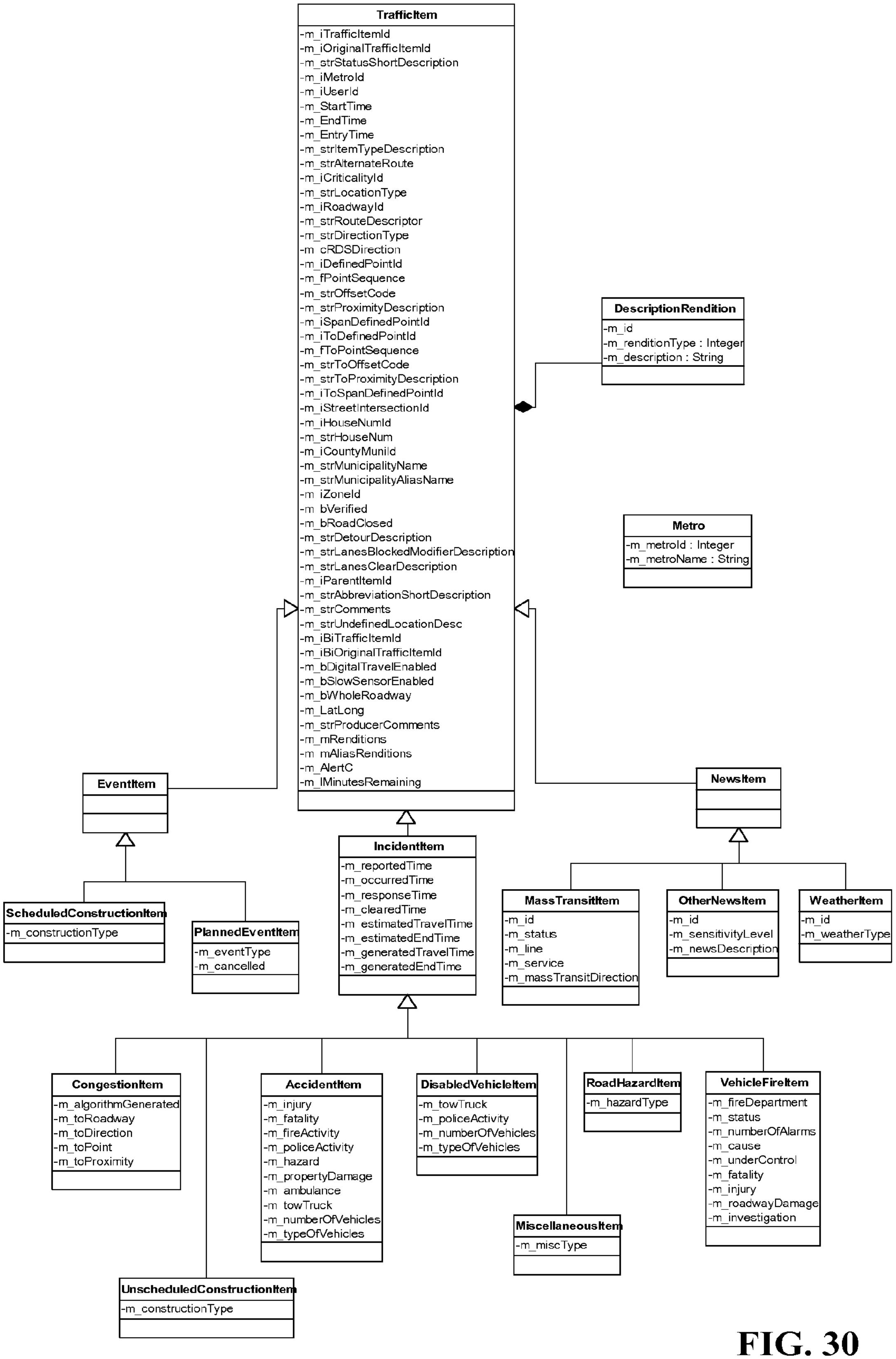
Figure 33:
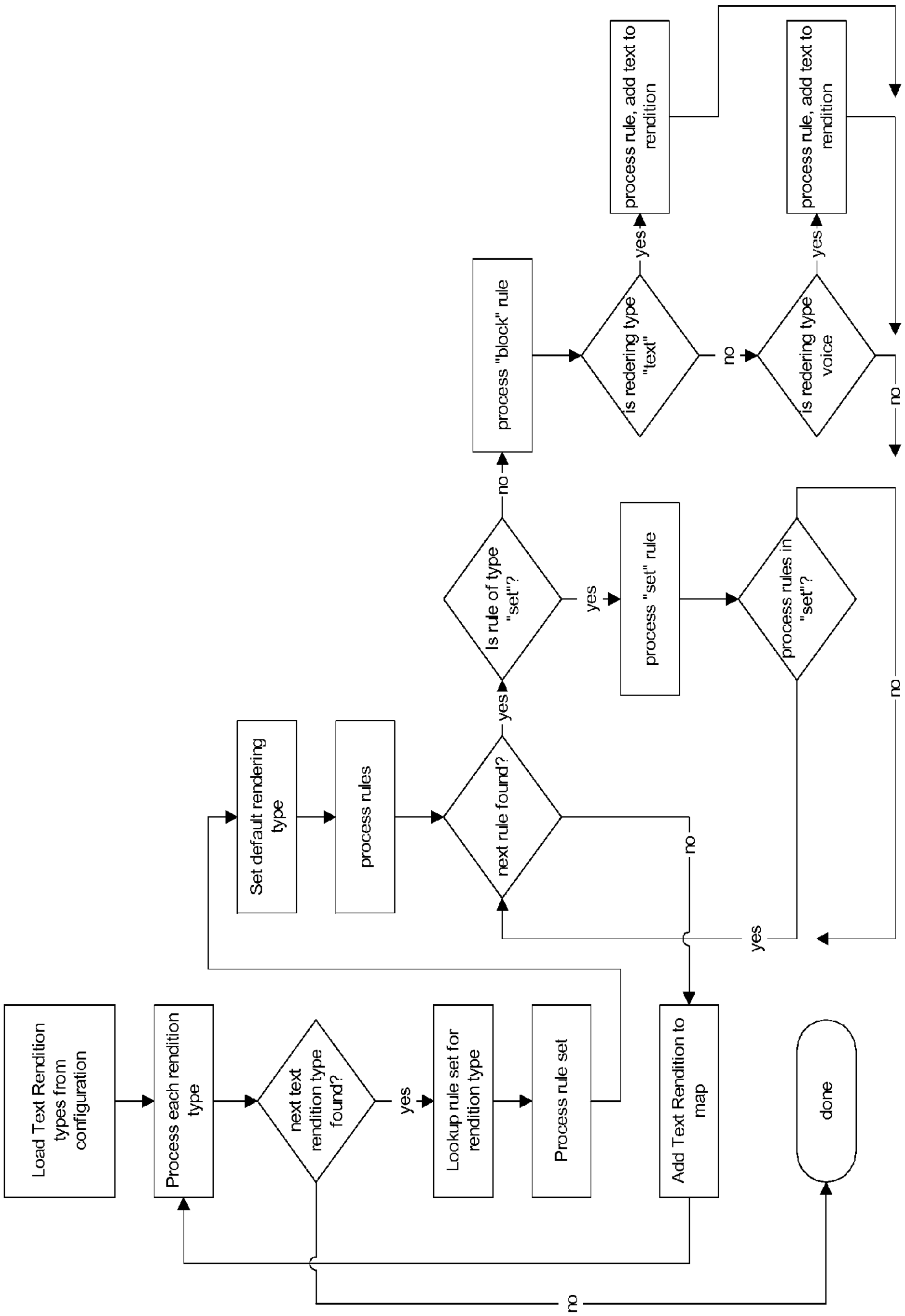
Figure 34:
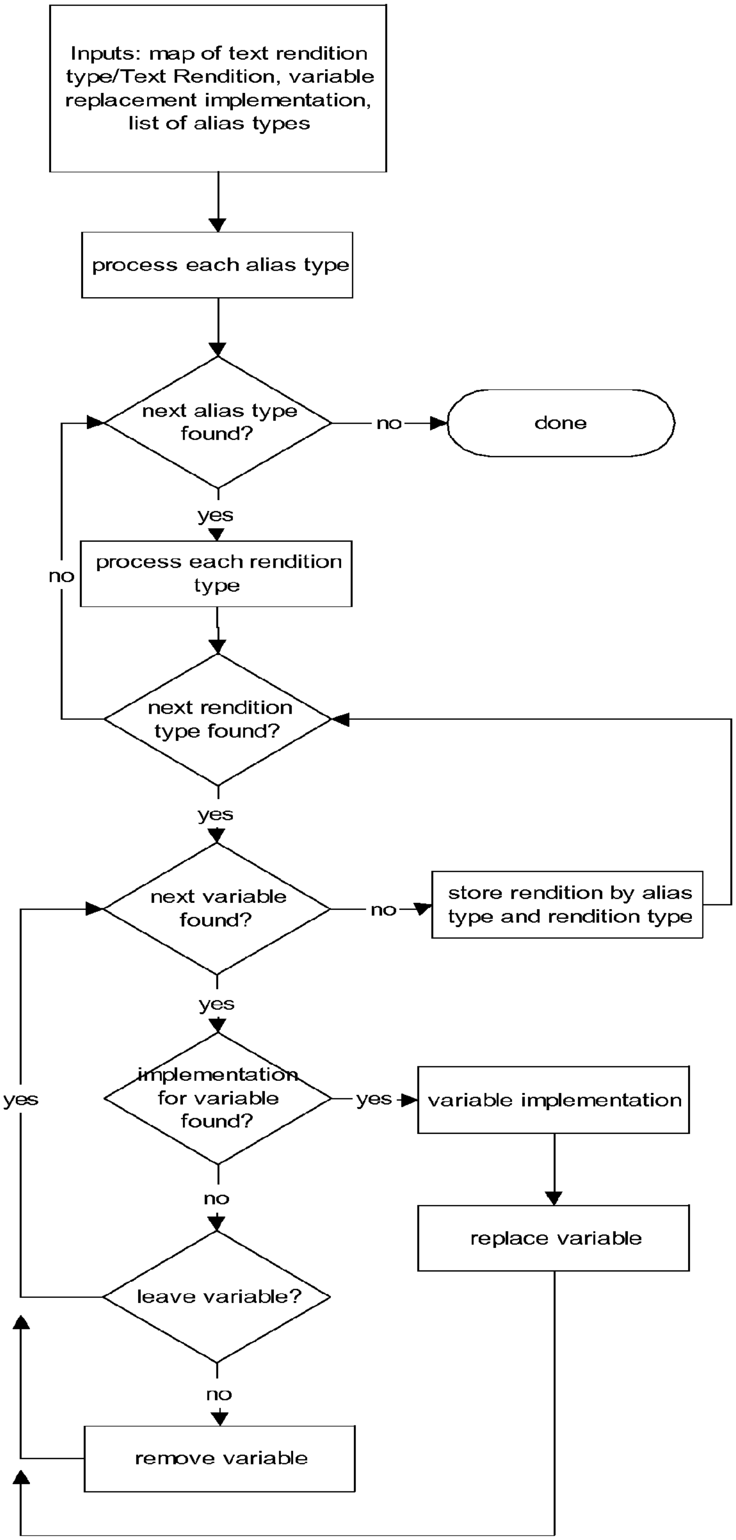
Figure 36:
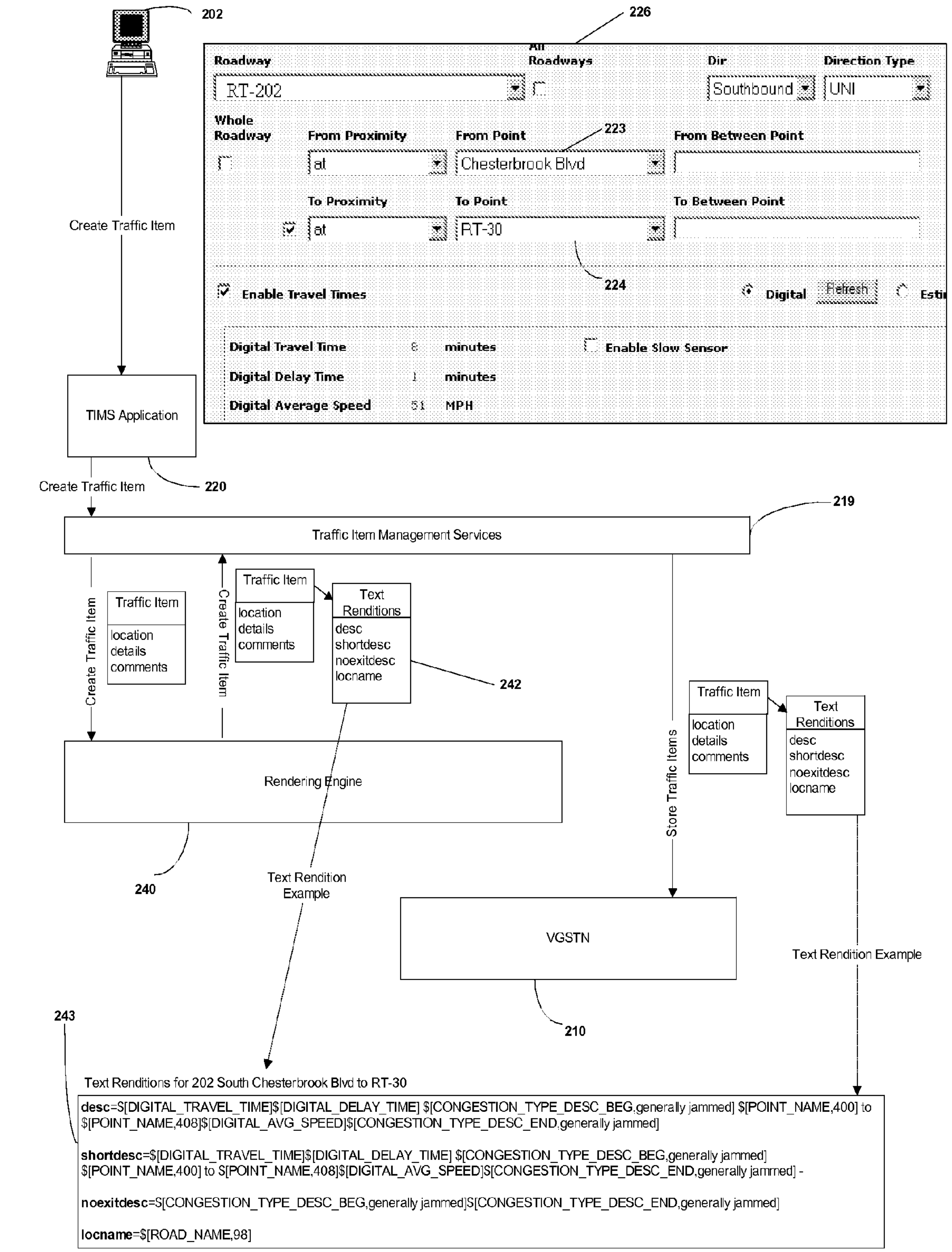
Figure 37:
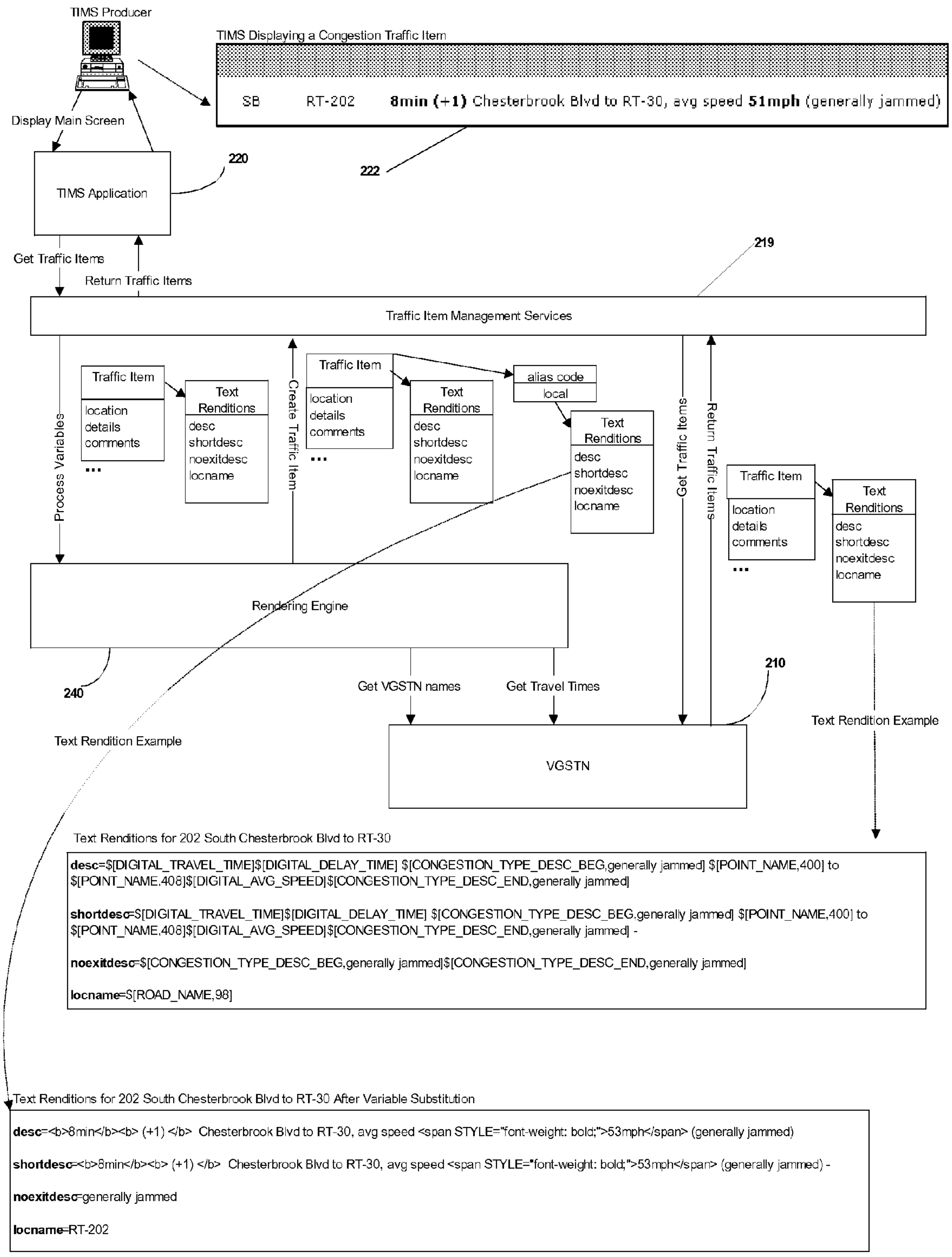
Figure 38:
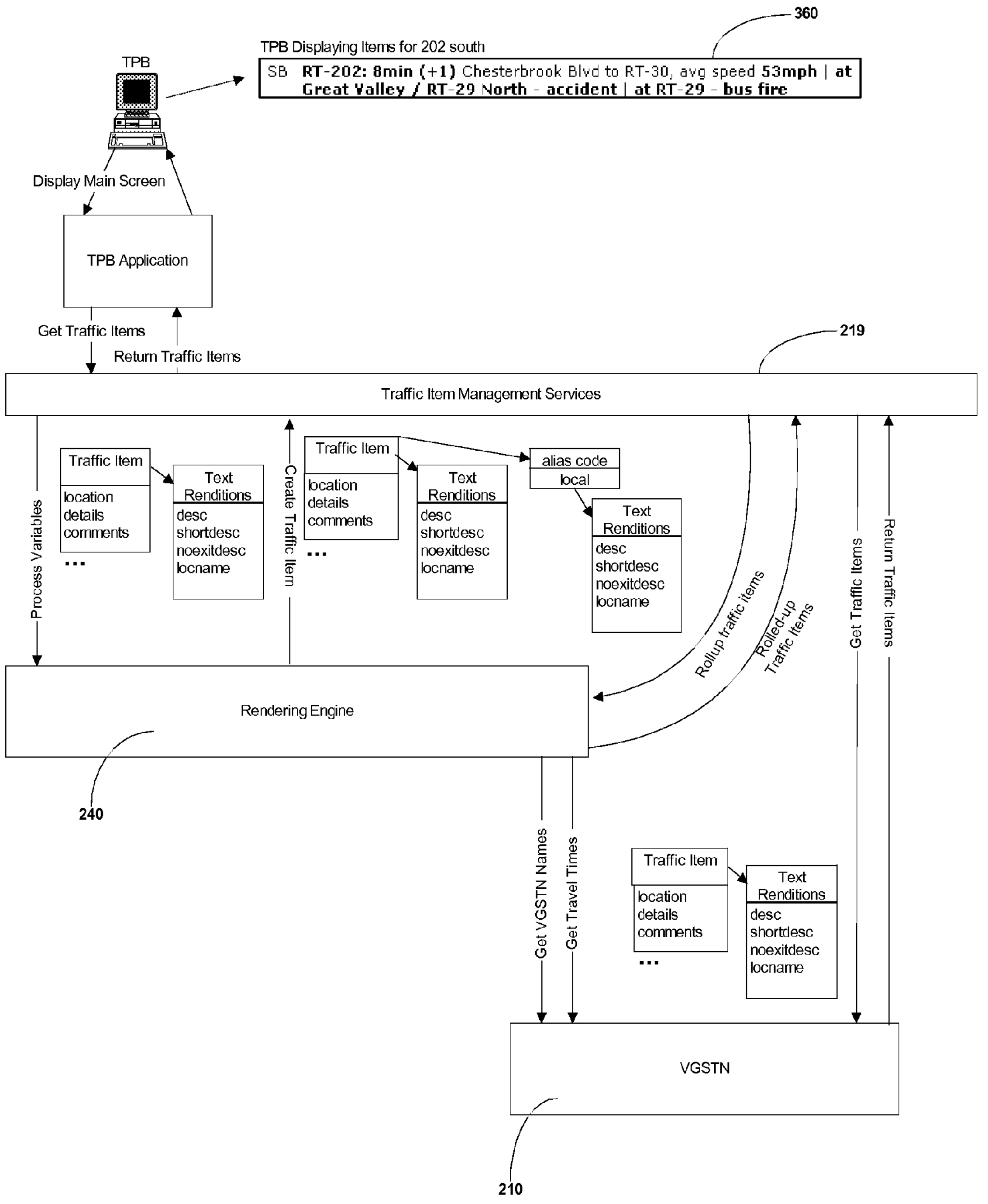
Figure 39:
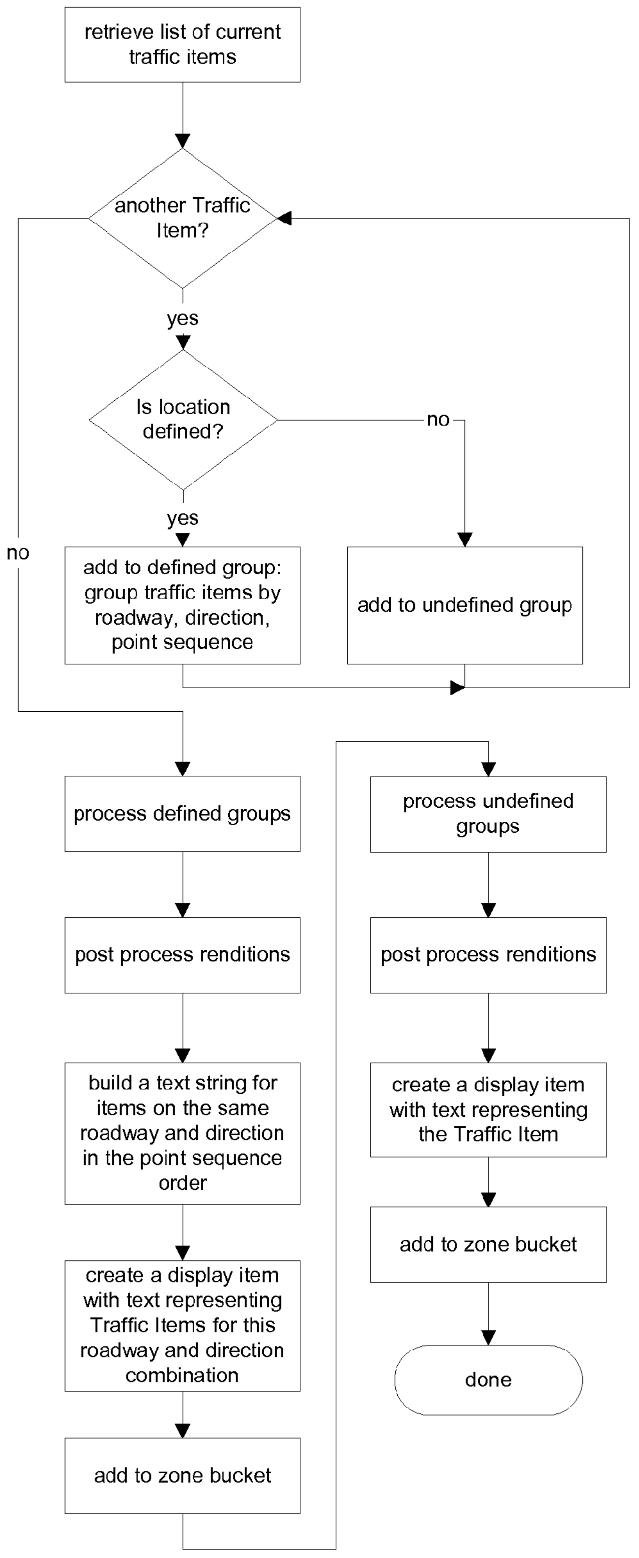
Figure 40:
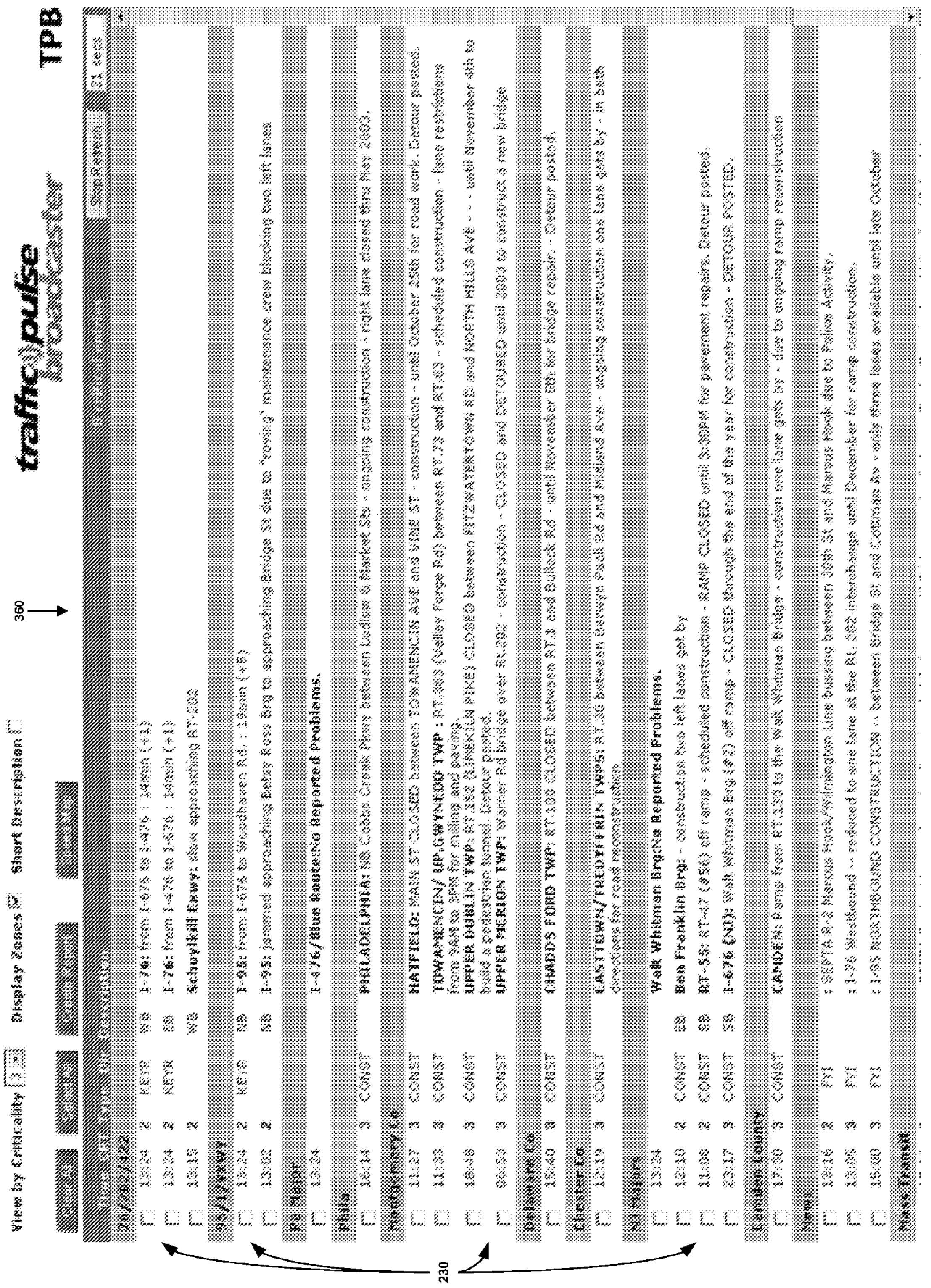
Figure 41:
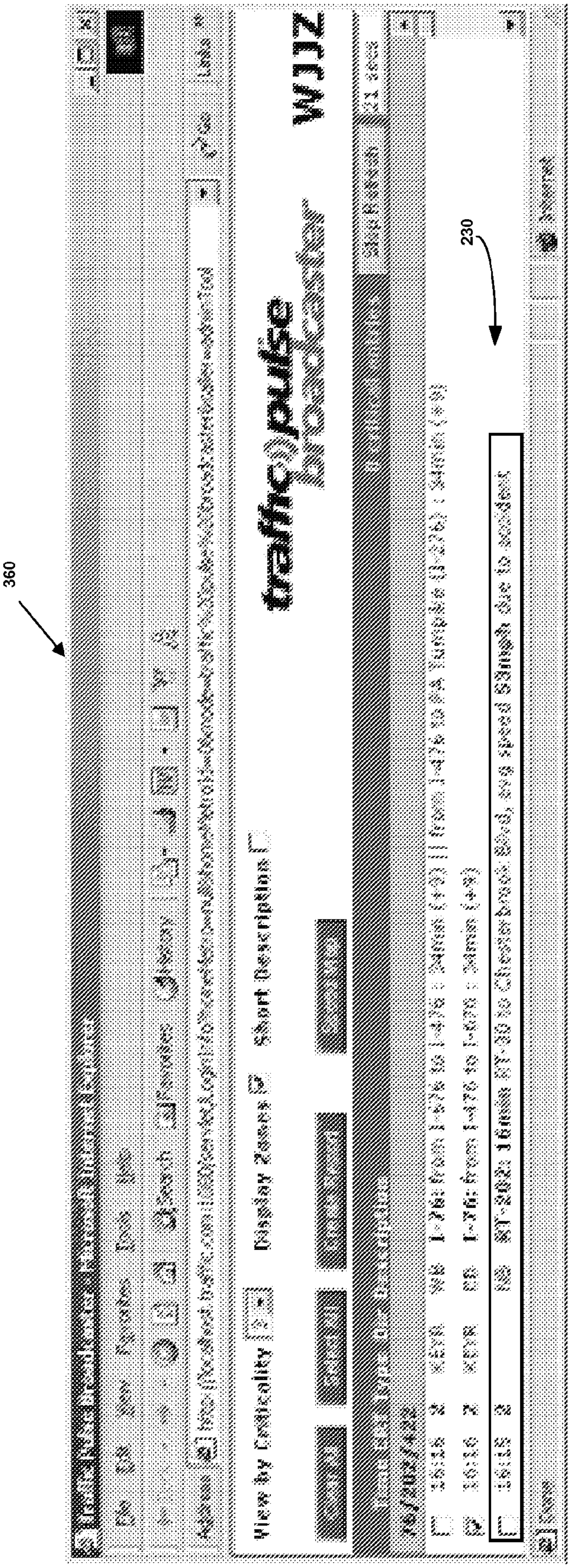
Figure 42:
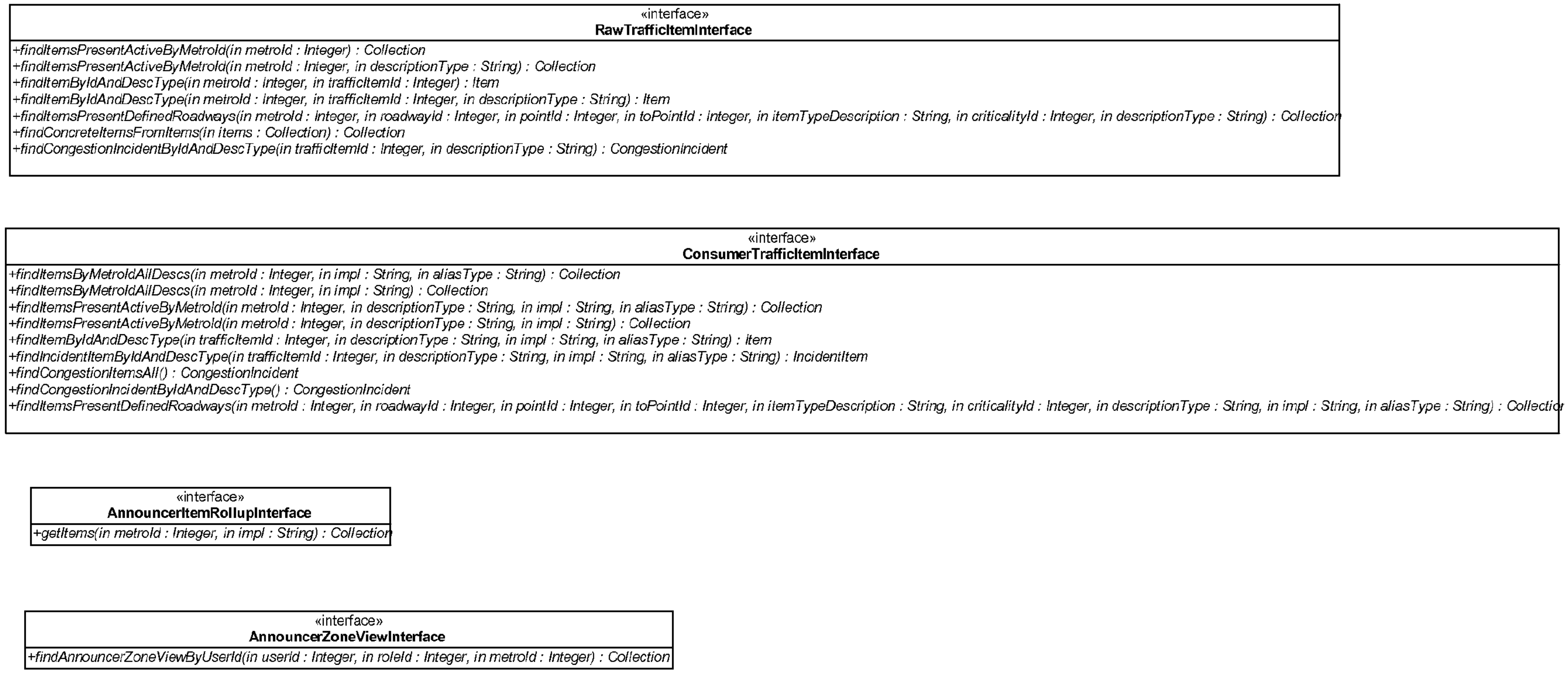
Figure 43:
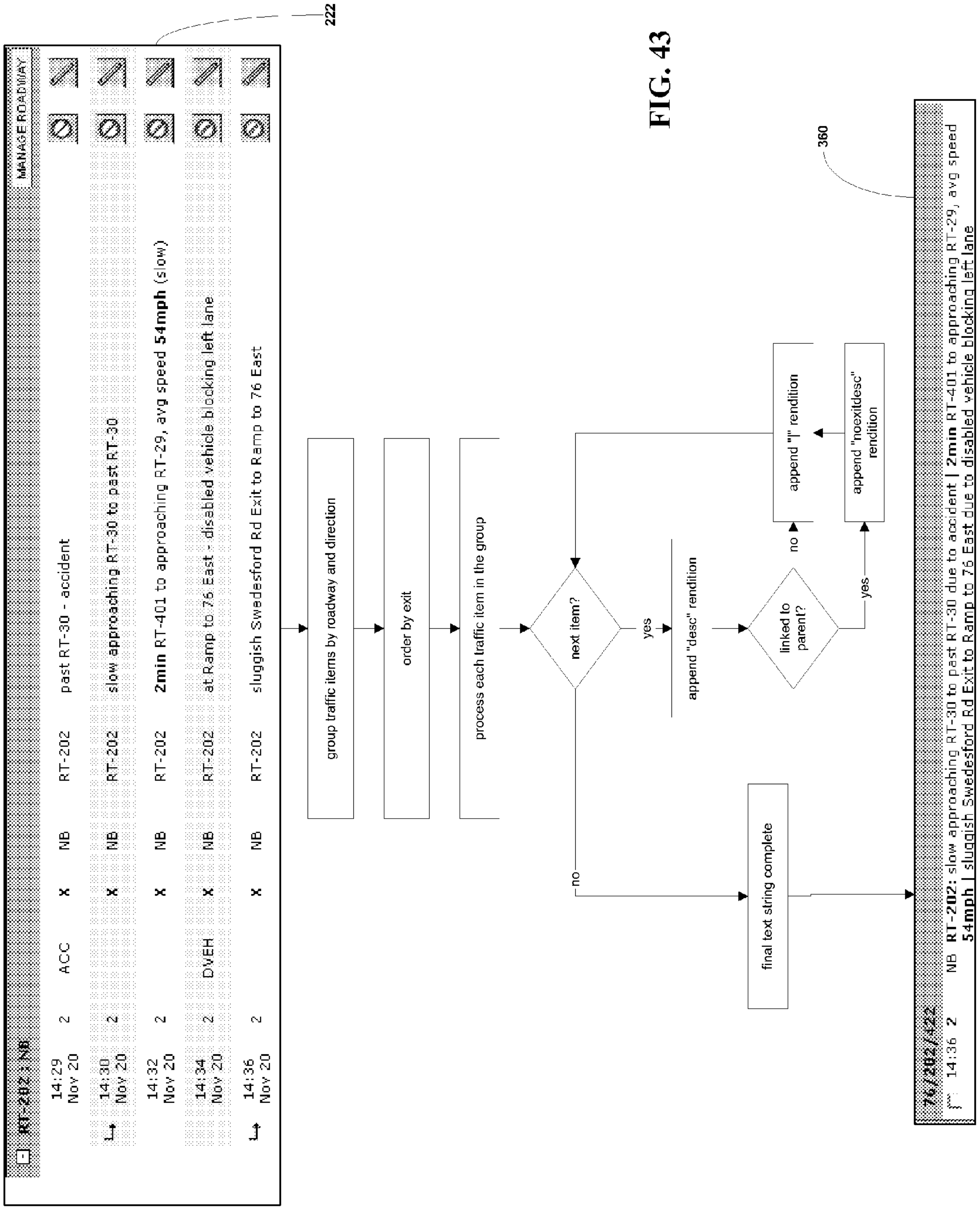
Figure 44:
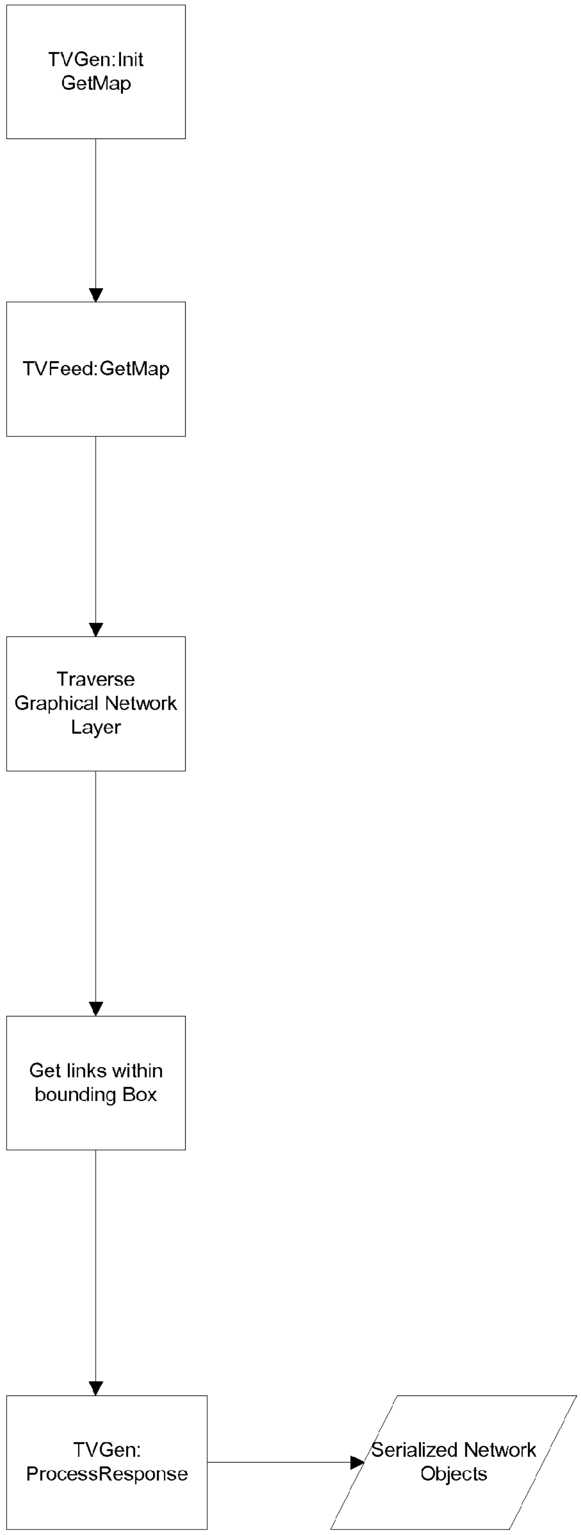
Figure 45:
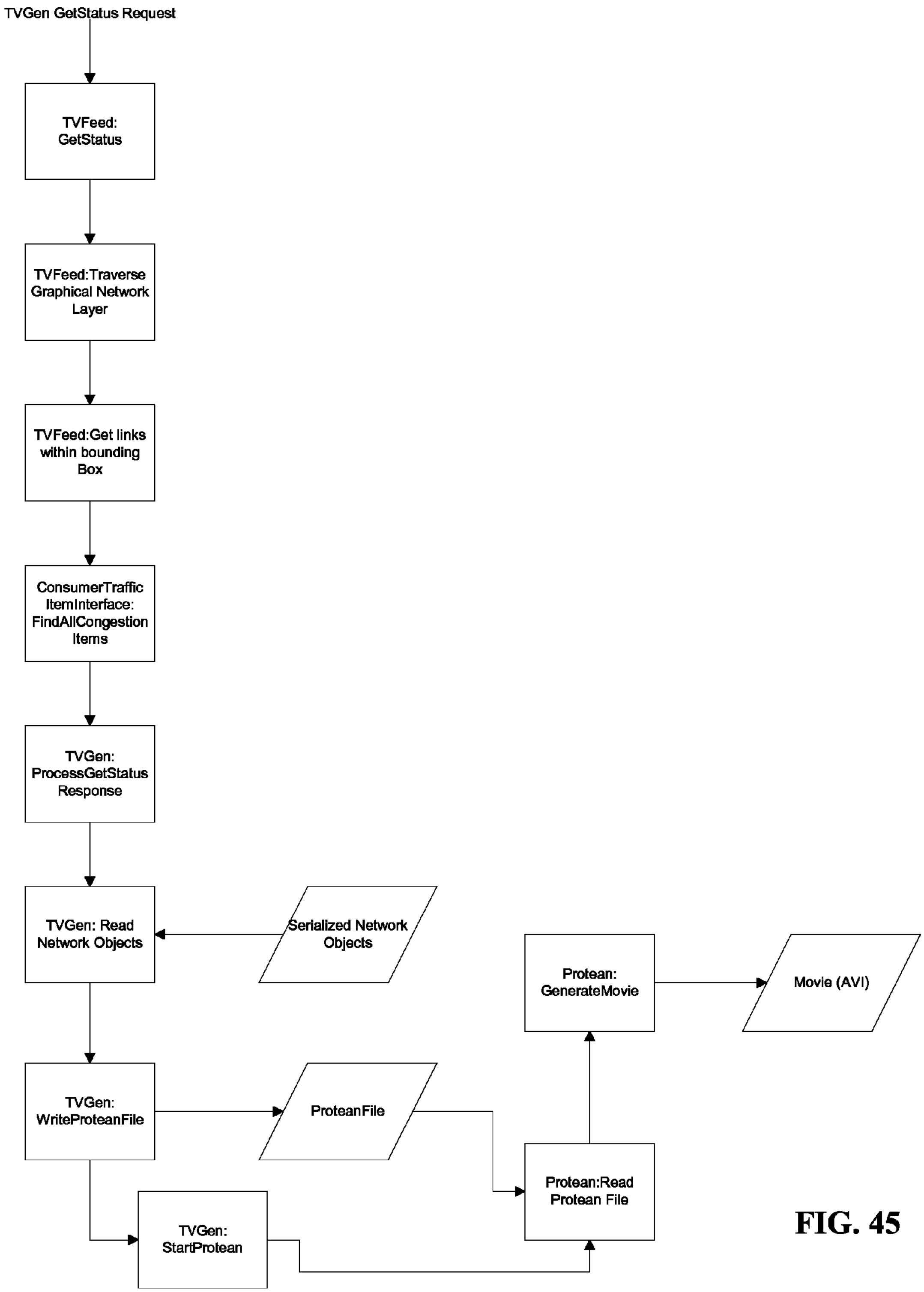
Figure 48:
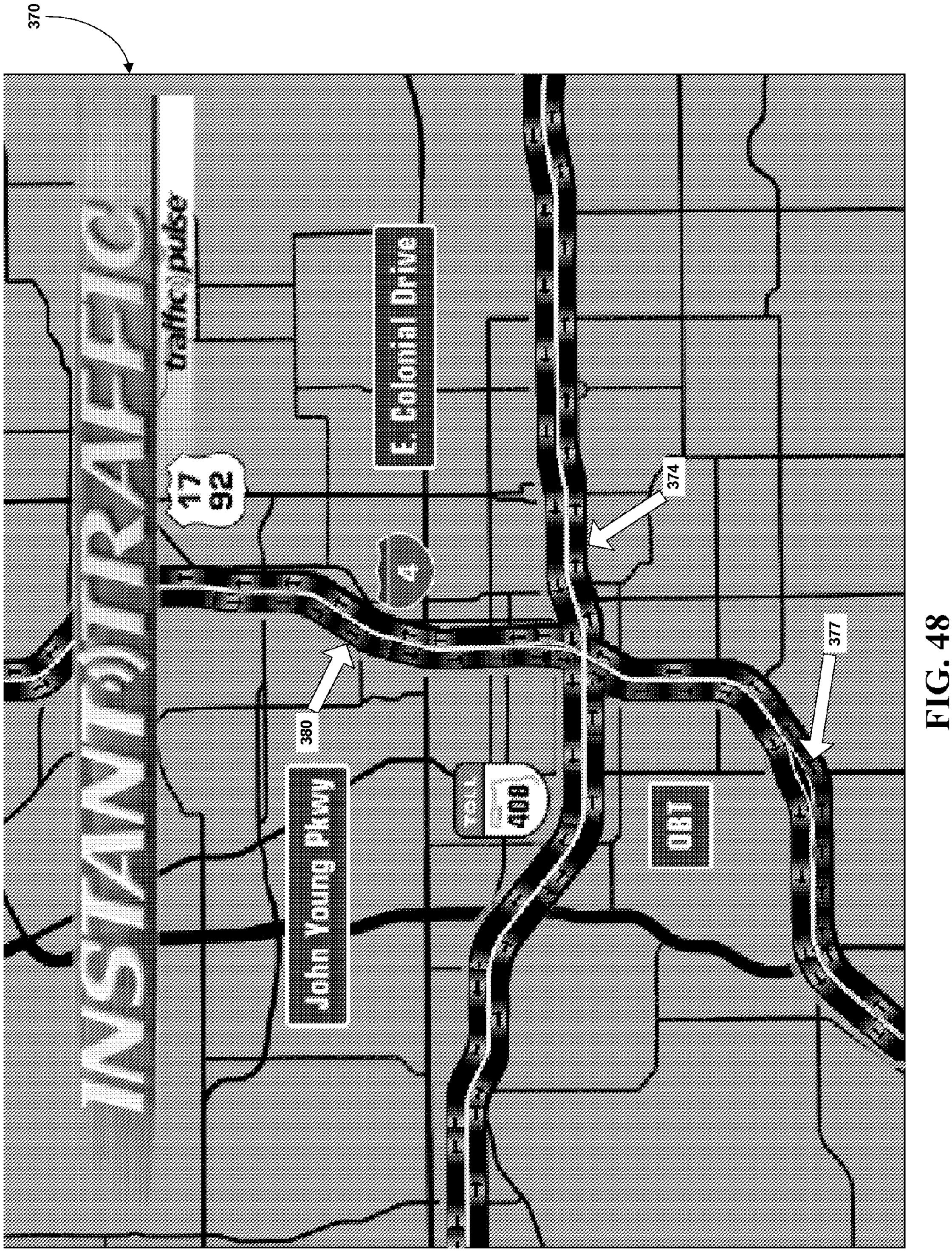
Figure 49:
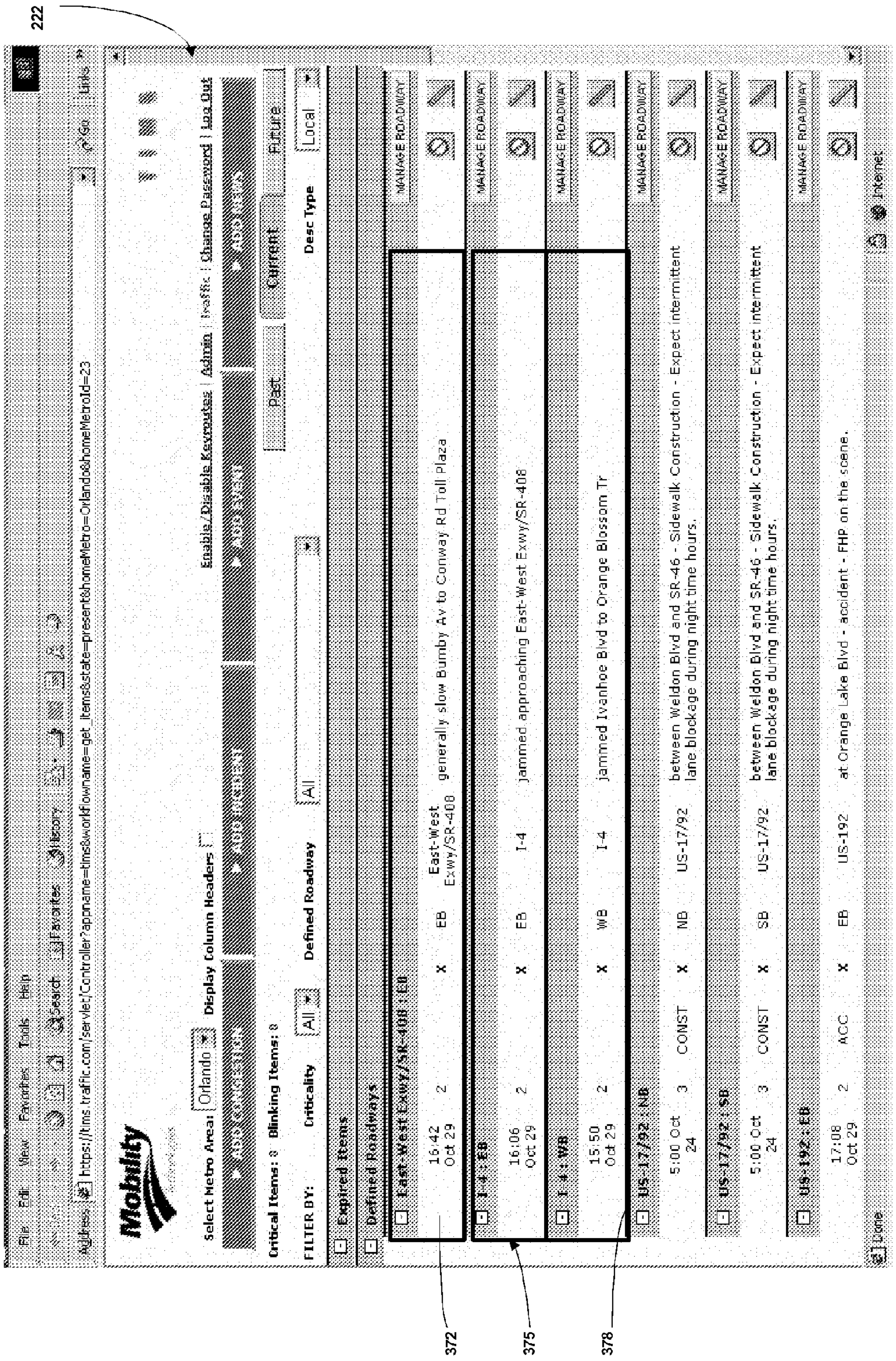
Figure 53:
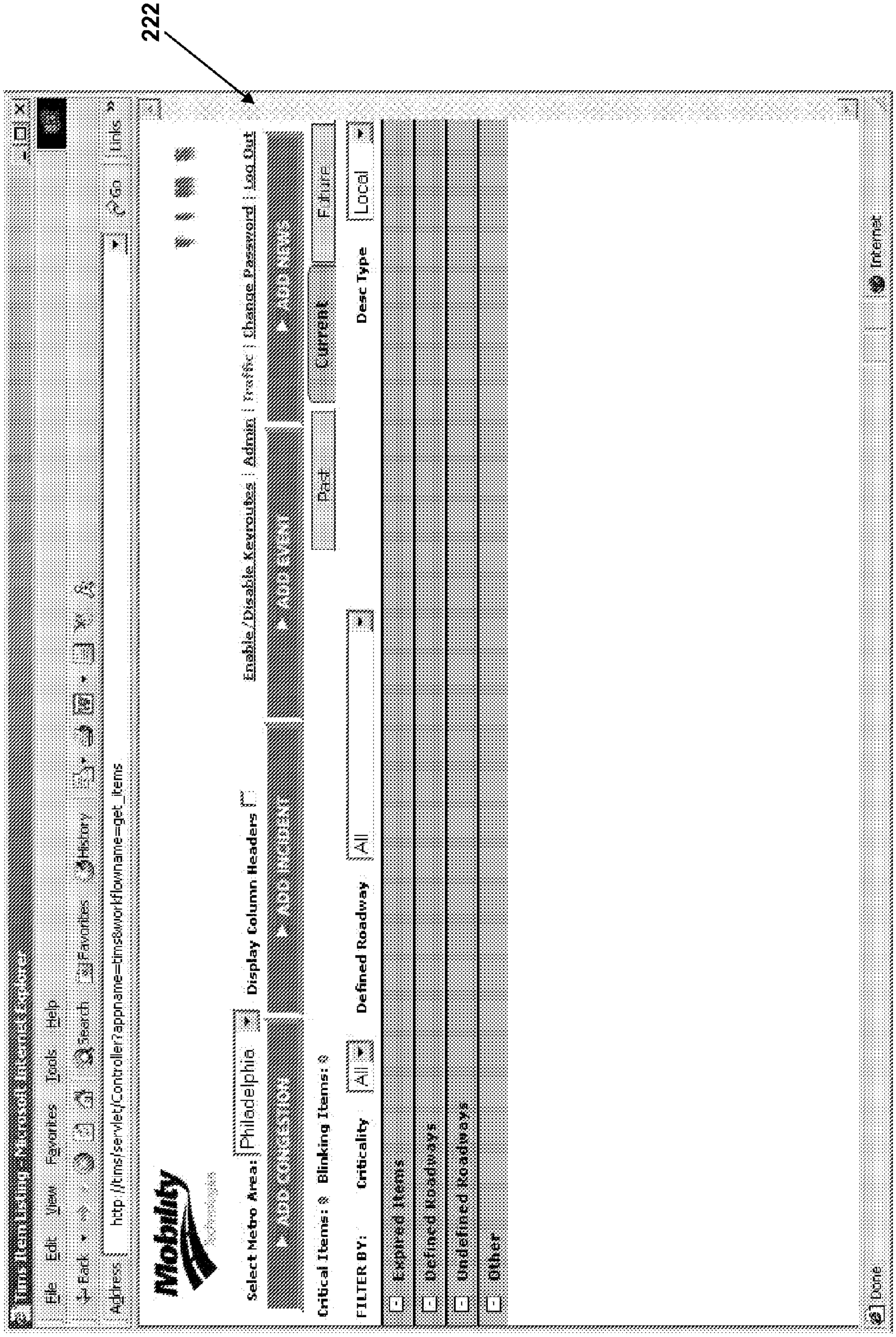
Figure 54:
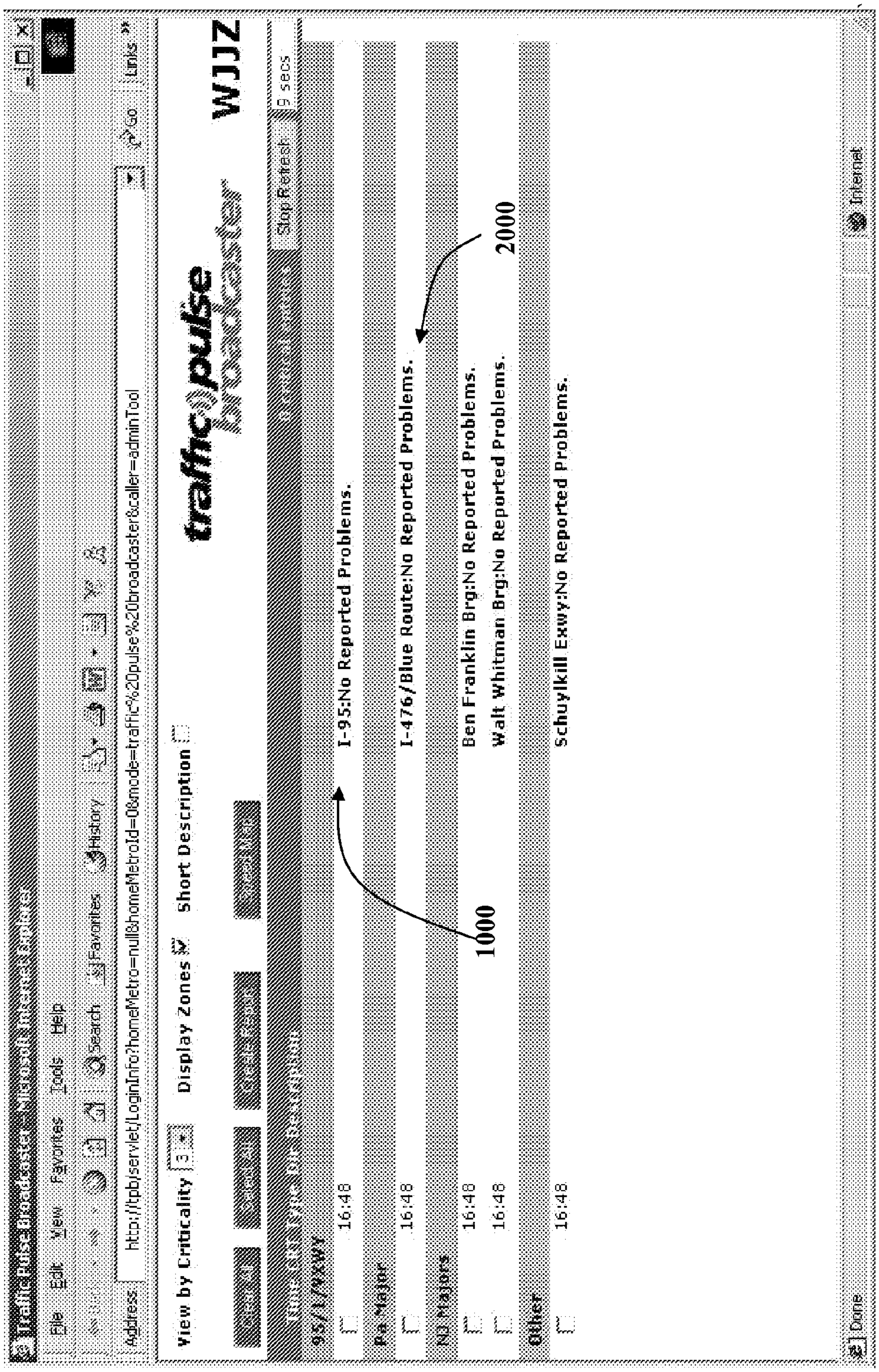
Figure 55:
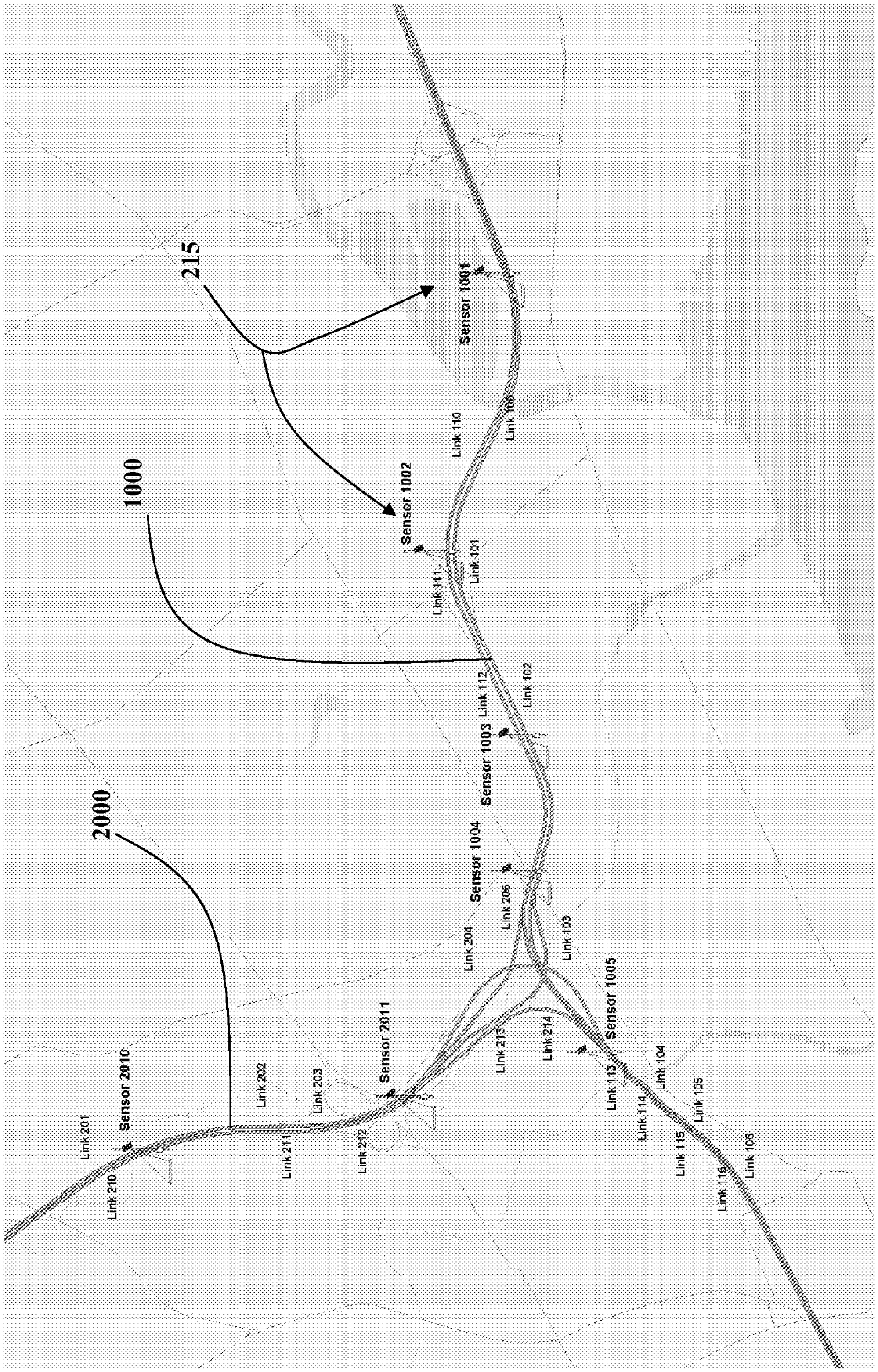
Figure 59:
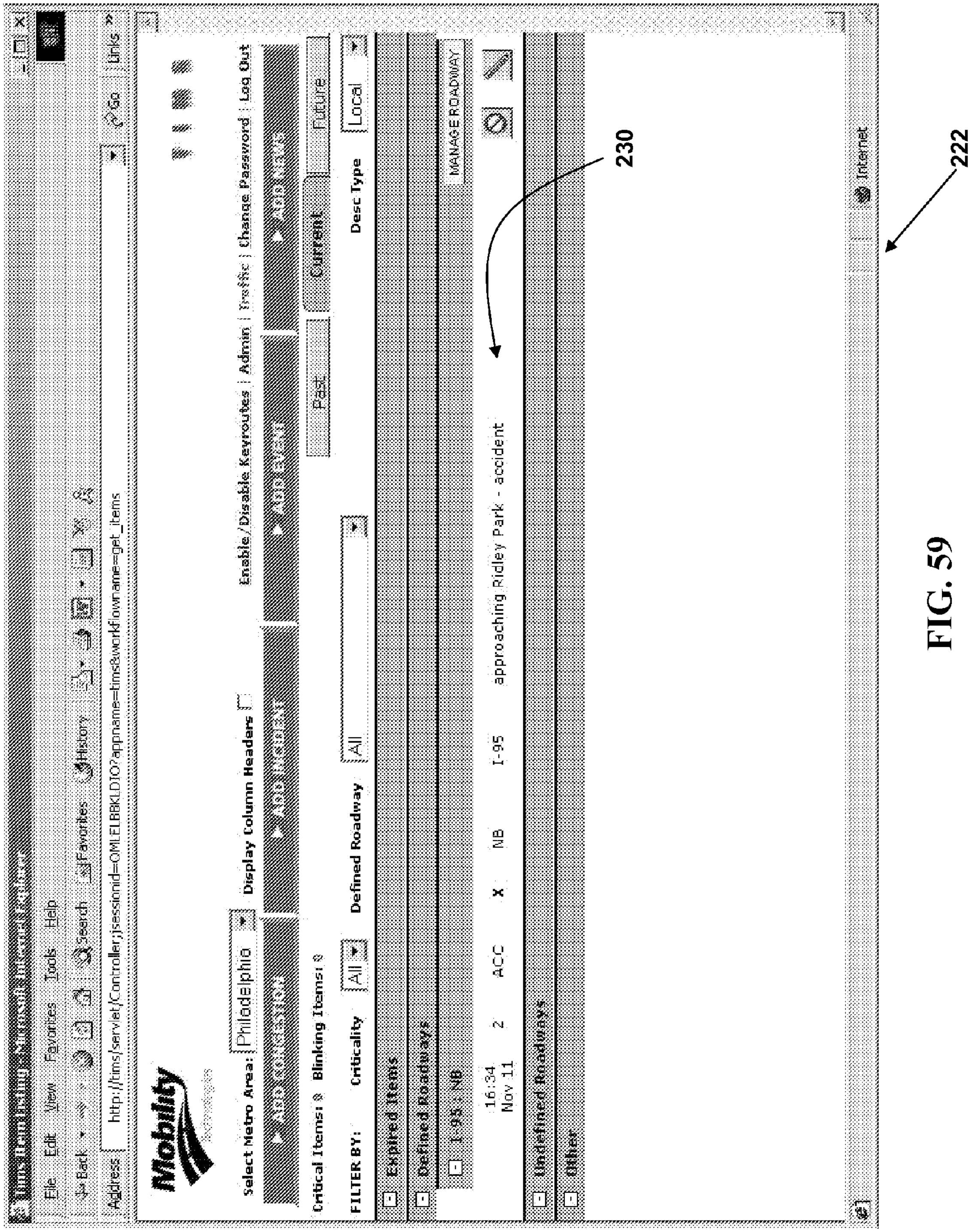
Figure 60:
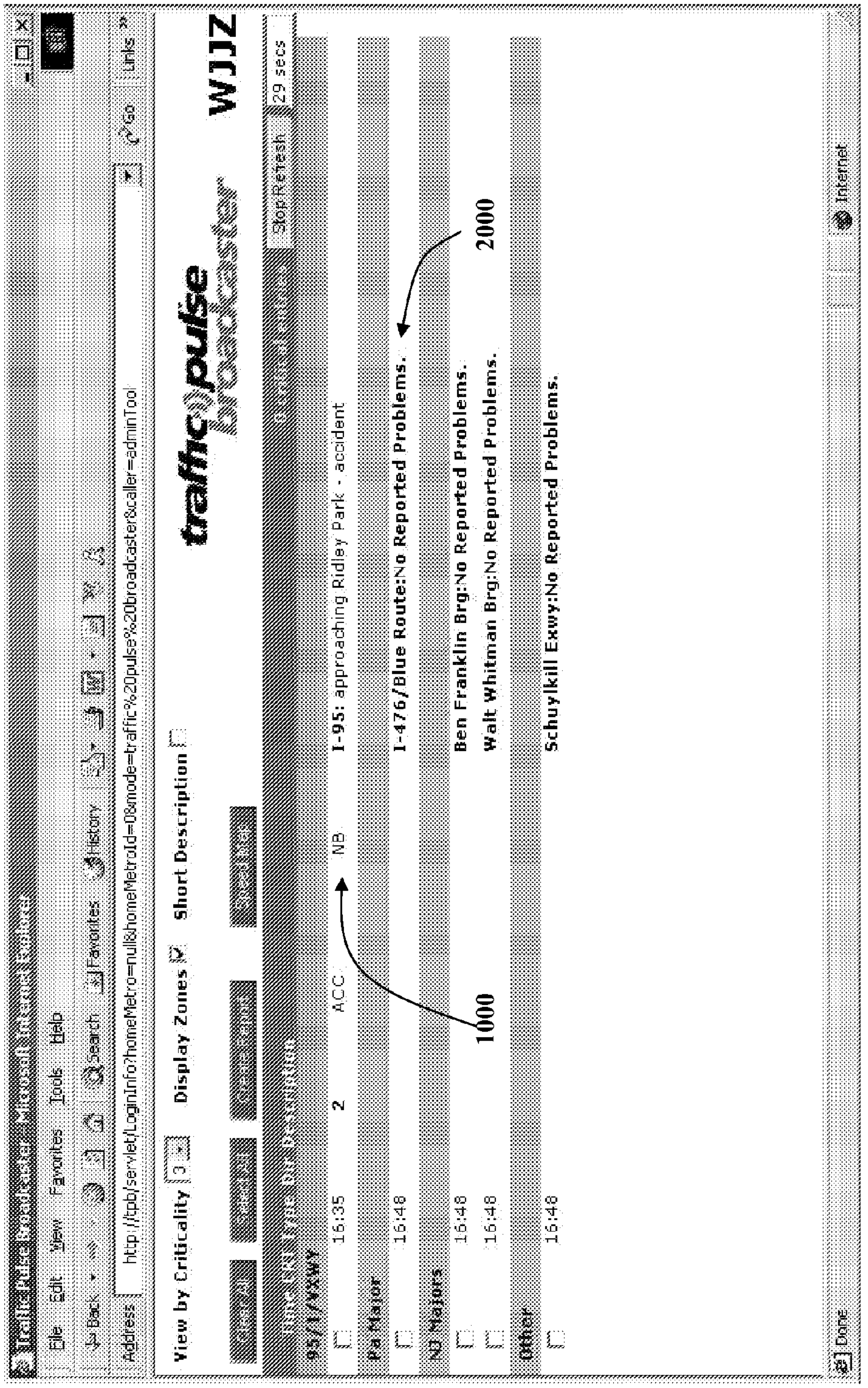
Figure 61:
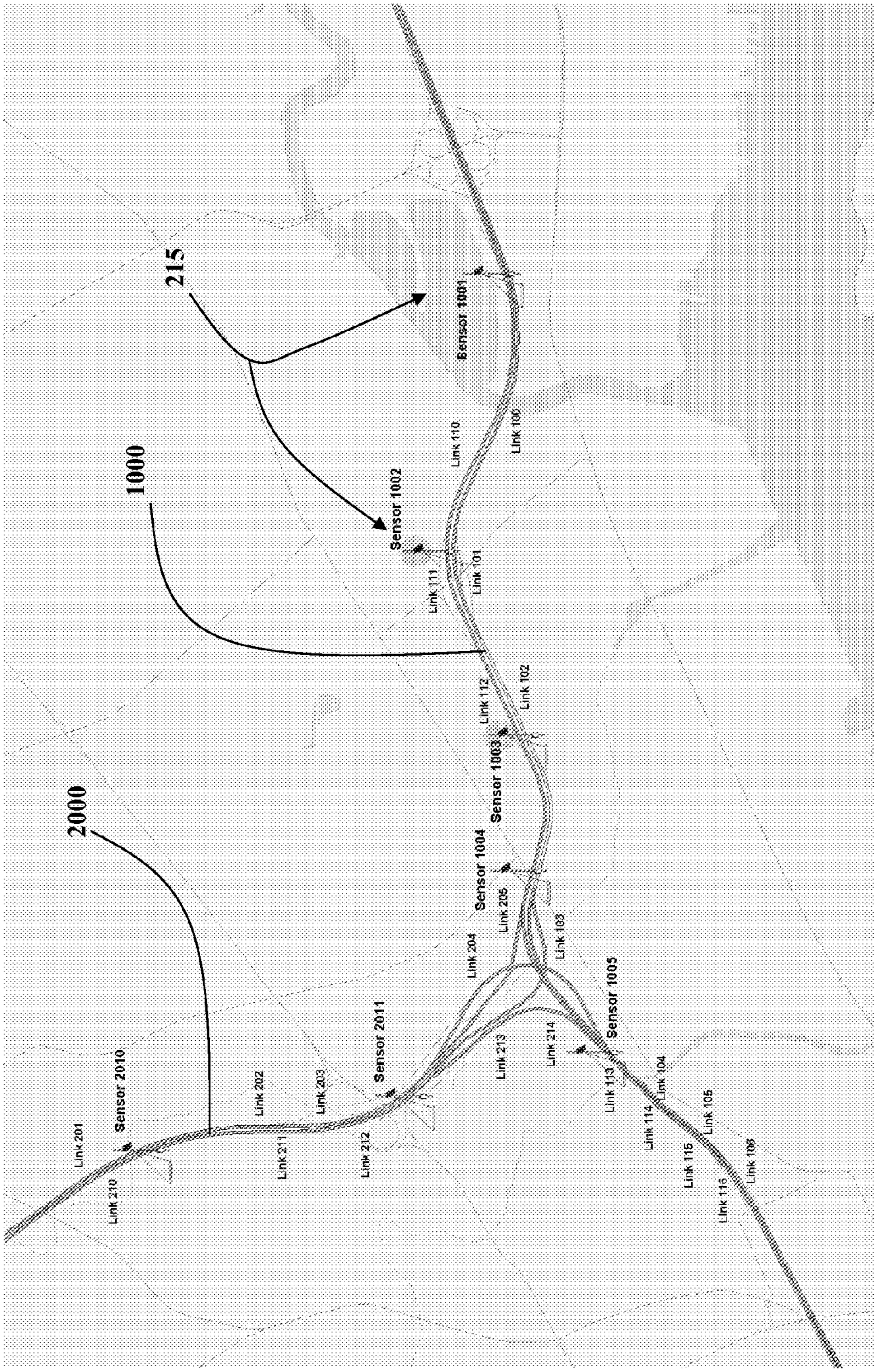
Figure 65:
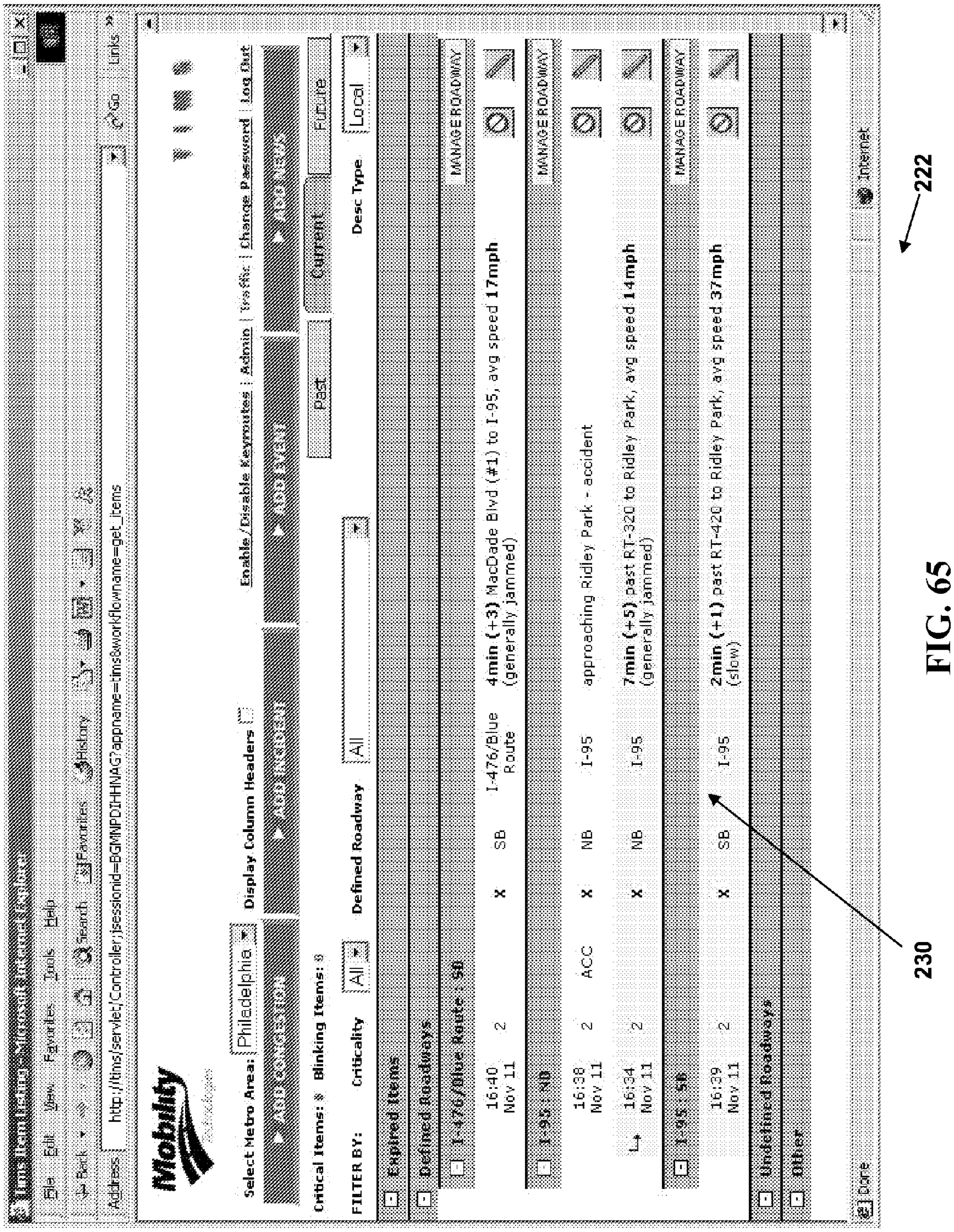
Figure 66:
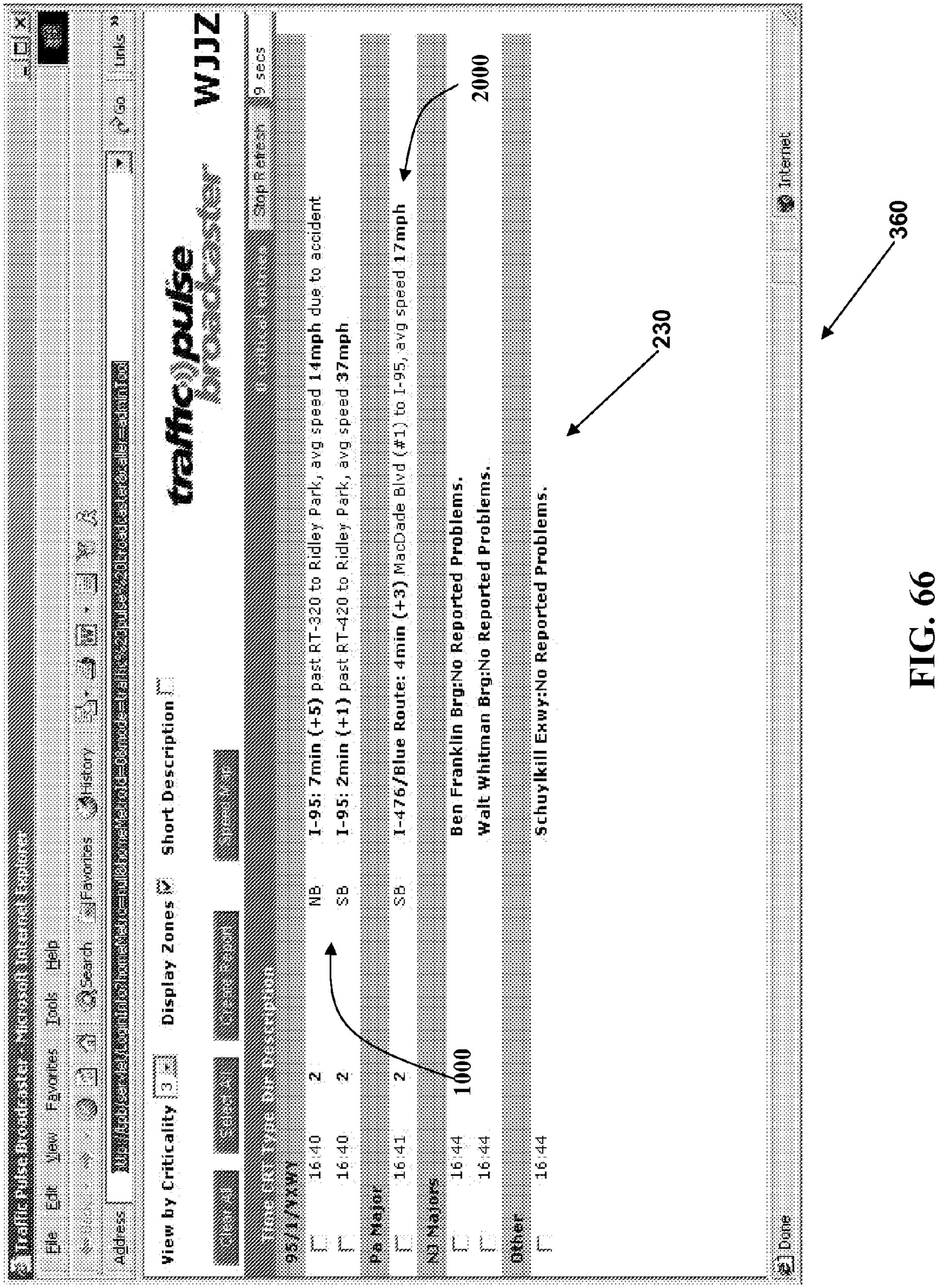
Figure 67:
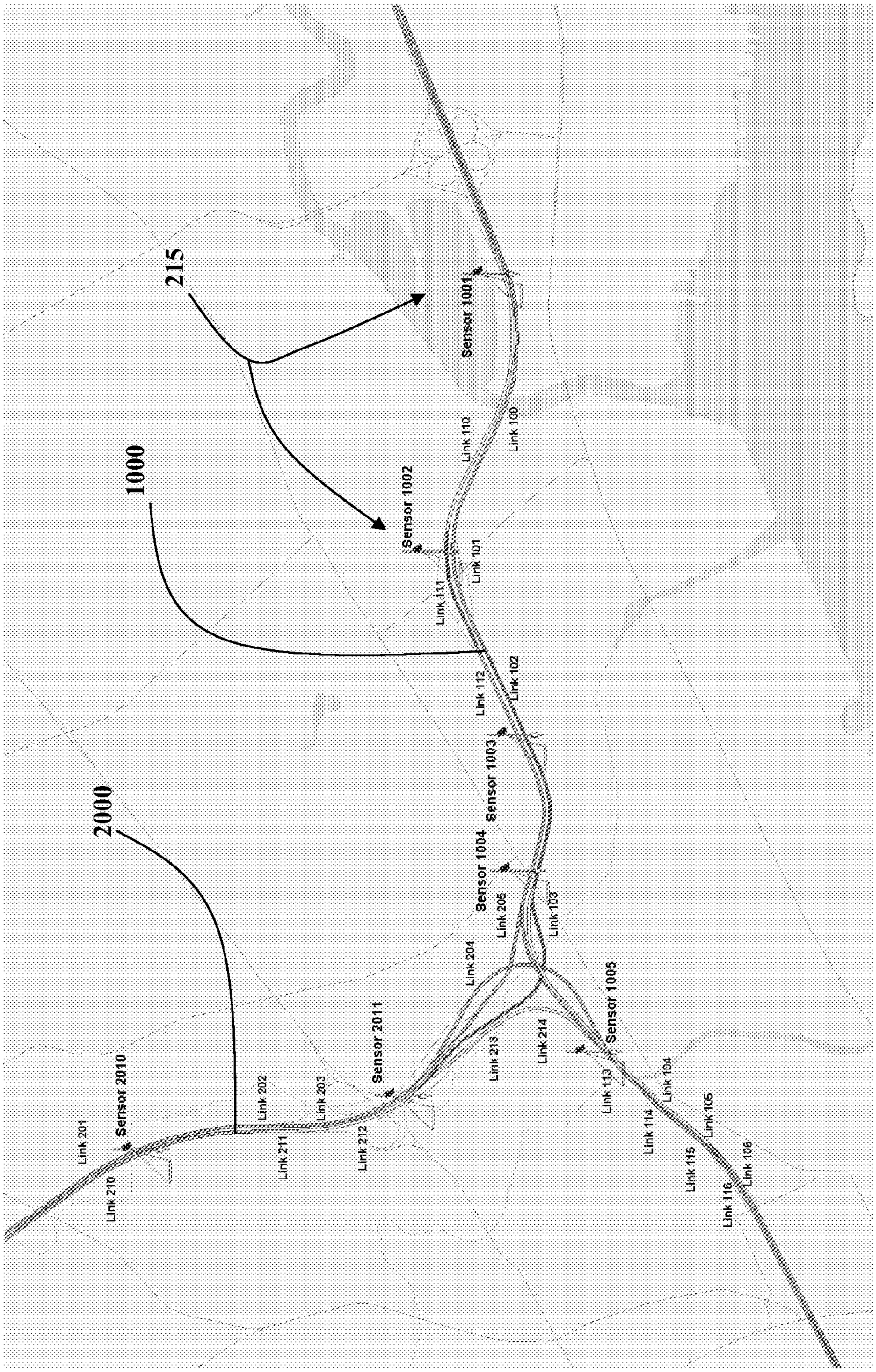

FIG. 12 is a diagram describing the database tables used to model the Location section of the VGSTN of FIG. 5;

FIG. 13 is a diagram describing the database tables used to model the Roadway section of the VGSTN of FIG. 5;

FIG. 14 is a diagram describing the database tables used to model the Line Feature section of the VGSTN of FIG. 5;

FIG. 15 is a graphical representation of the base layer of the VGSTN of FIG. 5;

FIG. 16 is a graphical representation of the traffic layer of the VGSTN of FIG. 5;

FIG. 17 is a graphical representation showing the proximities of the traffic layer of FIG. 16;

FIG. 18 is a graphical representation of the graphical layer of the VGSTN of FIG. 5;

FIG. 19 is a flow diagram describing the TravelTime calculations for the VGSTN of FIG. 5;

FIG. 20 is an example of the main screen of the Traffic Information Management System ("TIMS") used with the VGSTN of FIG. 5;

FIG. 21 is an example of the TIMS edit screen for congestion items;

FIG. 22 is an example of the TIMS edit screen for accident items;

FIG. 23 is an example of the TIMS edit screen for scheduled construction items;

FIG. 24 is an example of the TIMS edit screen for mass transit items;

FIG. 25 is an example of the TIMS edit screen using the link feature;

FIG. 26 is an example of the TIMS main screen of FIG. 20 showing a congestion item with digital travel times and linked to an accident;

FIGS. 27-29 are diagrams describing the database tables used to model traffic items in the VGSTN of FIG. 5;

FIG. 30 is a diagram describing how traffic items for the TIMS of FIG. 5 are modeled in Java;

FIG. 31 is an example of XML code used by the TIMS of FIG. 5 to create dropdown roadway menus;

FIG. 32 is a table relating the XML nodes in the code of FIG. 31 to database tables and columns;

FIG. 33 is a flow diagram describing the creation of text renditions used with the VGSTN of FIG. 5;

FIG. 34 is a flow diagram describing the processing of text renditions used with the VGSTN of FIG. 5 for replacing location names and inserting digital travel times;

FIG. 35 is an example of XML code used by the Renditioning Engine Component ("REC") of FIG. 5 to create text renditions;

FIG. 36 is a diagram showing interaction between the TIMS and the REC for inserting traffic items into the VGSTN of FIG. 5;

FIG. 37 is a diagram showing interaction between the TIMS and the REC for retrieving traffic items from the VGSTN of FIG. 5 for display;

FIG. 38 is a diagram showing interaction between the Traffic Pulse Broadcaster ("TPB") and the REC 240 for retrieving traffic items from the VGSTN of FIG. 5 for display;

FIG. 39 is a flow diagram describing how the TPB used with the VGSTN of FIG. 5 retrieves current traffic items and builds the screen display;

FIG. 40 is an example of a the main screen of the TPB used with the VGSTN of FIG. 5;

FIG. 41 is an example of a screen display in the TPB of FIG. 40 of a congestion traffic item with digital travel times and linked to an accident;

FIG. 42 is a diagram partially describing the services utilized by the TPB of FIG. 40 to display traffic items and digital travel times;

FIG. 43 is a flow diagram showing the process of rolling up text renditions for display by the TPB of FIG. 40;

FIG. 44 is a flow diagram describing how the TV Workstation ("TVGen") initializes the road system for processing into video for display by the two-dimensional television ("TV2D") application used with the VGSTN of FIG. 5;

FIG. 45 is a flow diagram describing how the TVGen retrieves the current conditions from the VGSTN for processing into video for display by the TV2D of FIG. 44;

FIG. 46 is an example of the XML code for the GetMap function used by the TVFeed in the TV2d application of FIG. 44;

FIG. 47 is an example of the XML feed from the TVFeed component of the TV2D application of FIG. 44 displaying the status of the graphical layer for a road system in Dallas;

FIG. 48 is an example of the video display output by the TV2D application for the XML fee of FIG. 47;

FIG. 49 is an example of the TIMS main screen reflecting incidents shown on the display of FIG. 48;

FIGS. 50-52 are tables showing sample sensor and traffic data at $T_0$ for an example demonstrating the traffic system according to the present invention;

FIG. 53 is a TIMS main screen display at $T_0$ corresponding to the example of FIGS. 50-52;

FIG. 54 is a TPB display at $T_0$ corresponding to the example of FIGS. 50-52;

FIG. 55 is a graphical display at $T_0$ corresponding to the example of FIGS. 50-52;

FIGS. 56-58 are tables showing sample sensor and traffic data at $T_1$ continuing the example of FIGS. 50-55;

FIG. 59 is a TIMS main screen display at $T_1$ corresponding to the example of FIGS. 56-58;

FIG. 60 is a TPB display at $T_1$ corresponding to the example of FIGS. 56-58;

FIG. 61 is a graphical display at $T_1$ corresponding to the example of FIGS. 56-58;

FIGS. 62-64 are tables showing sample sensor and traffic data at $T_2$ continuing the example of FIGS. 50-61;

FIG. 65 is a TIMS main screen display at T2 corresponding to the example of FIGS. 62-64;

FIG. 66 is a TPB display at T2 corresponding to the example of FIGS. 62-64; and FIG. 67 is a graphical display at T2 corresponding to the example of FIGS. 62-64.

DETAILED DESCRIPTION OF THE INVENTION

The traffic data processing system 200 according to the present invention allows traffic information from a variety of sources to be collected, processed, disseminated and displayed in a highly flexible manner, in a single integrated system, such that the traffic data present in the system is easily accessible and represents actual, real-time traffic conditions on the road system.

DEFINITIONS

The following terms, as used throughout the description of the present invention are assigned the following meaning when construing the application:

Traffic Data: Traffic related information that the VGSTN generates, stores and reports to the end user or application through a variety of means. Traffic data includes travel time, delay time, speed, and congestion data. Traffic data may be the same as the traffic information once inside the VGSTN.

Road System: The actual, physical network of roads.

Traffic Event: An occurrence on the road system which may have an impact on the flow of traffic. Traffic events include incidents, weather, construction and mass transit.

Incident: A traffic event which is generally caused by a vehicle obstructing the flow of traffic on the road system. Incidents are generally locatable at a specific point. Incidents include accidents, congestion, disabled vehicles, and vehicle fires.

Traffic Information: Information about traffic events which is input to the TIMS by the traffic operator. Traffic information includes details of incidents, congestion, weather and other traffic events. Traffic information may be entered according to traffic parameters.

Traffic Parameter: A specific detail about a traffic event, including location, police presence, injuries, damage, occurrence time, cleared time, etc.

Traffic Flow Data: Digital data collected from independent road sensors. Traffic flow data includes speed, volume, density, flow and classification of traffic on the road system.

Traffic Operator: A person who gathers and enters traffic information via the TIMS. The traffic information may be collected through any number of traditional methods, including conversing with surveillance aircraft or vehicles and monitoring emergency scanner frequencies.

Referring generally to FIGS. 5-19, the traffic data processing system 200 according to the present invention comprises multiple software applications built on a layered architecture in a series of networked computers 203, 205, 220, and 240. The traffic system 200 creates a continuous virtual representation of the actual road system which can be queried regarding traffic data at any point, any proximity from any point, or between any two points on the road system to retrieve the real-time road conditions corresponding to that location.

Figure 6:
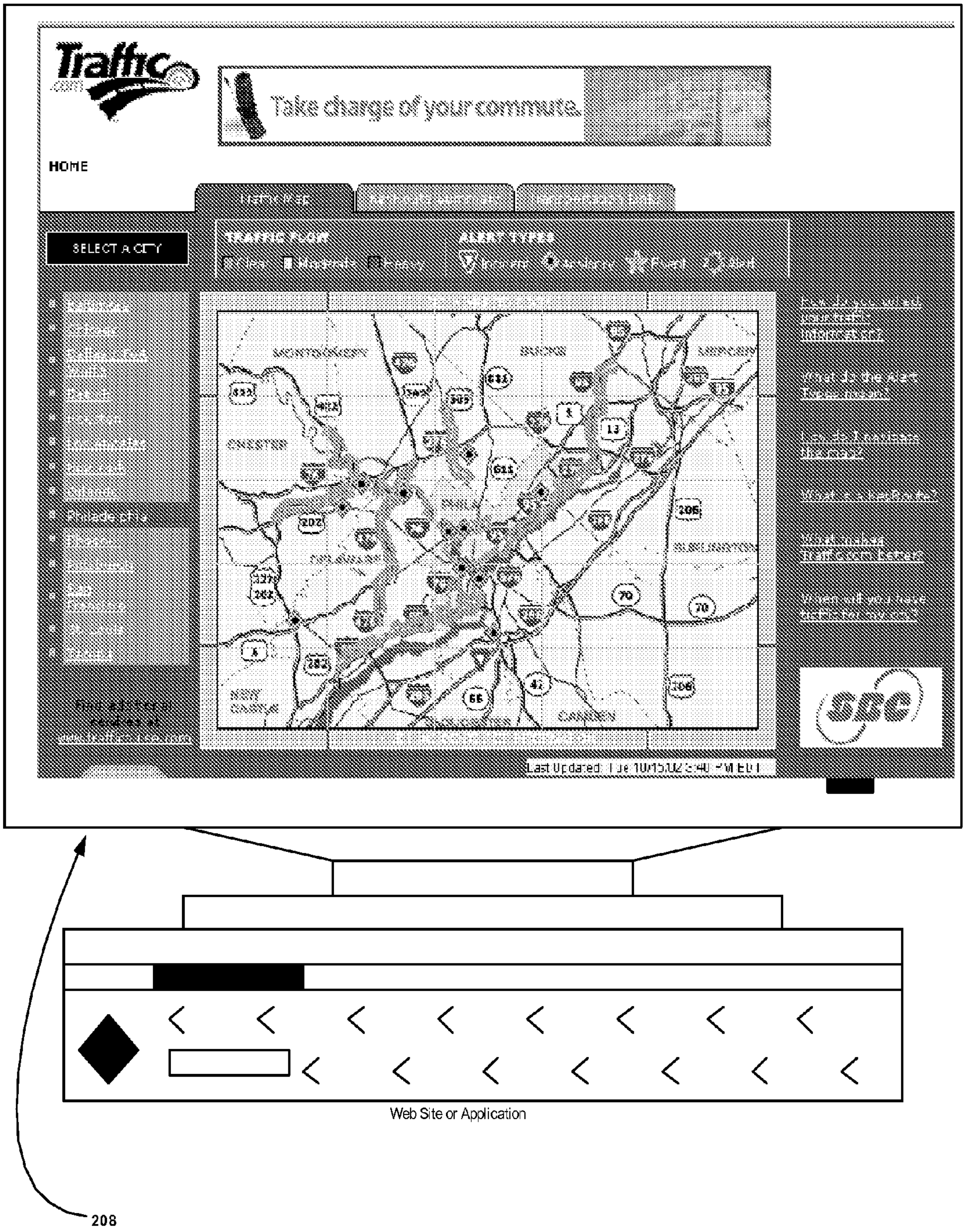
Figure 7:
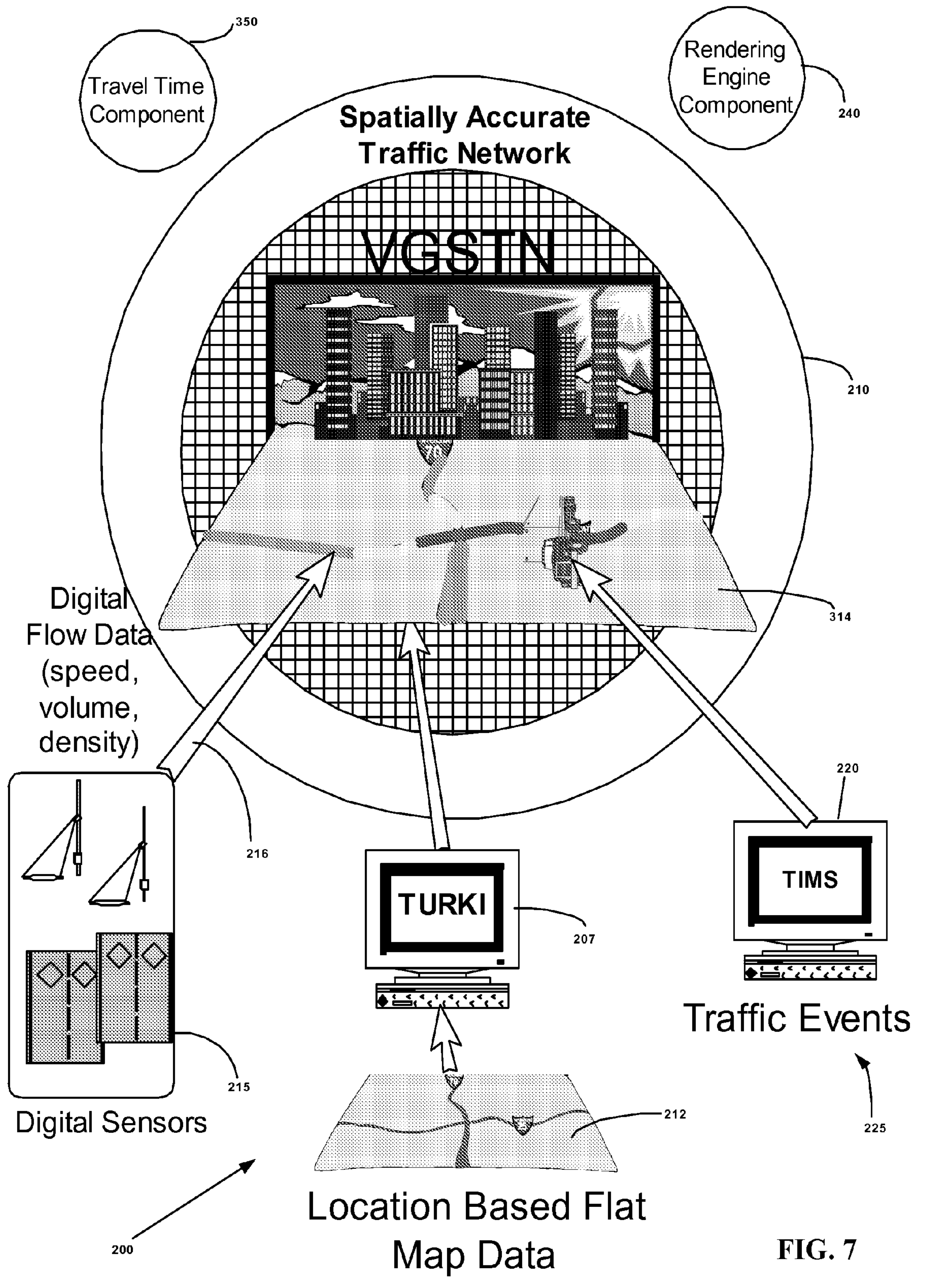
Figure 8:
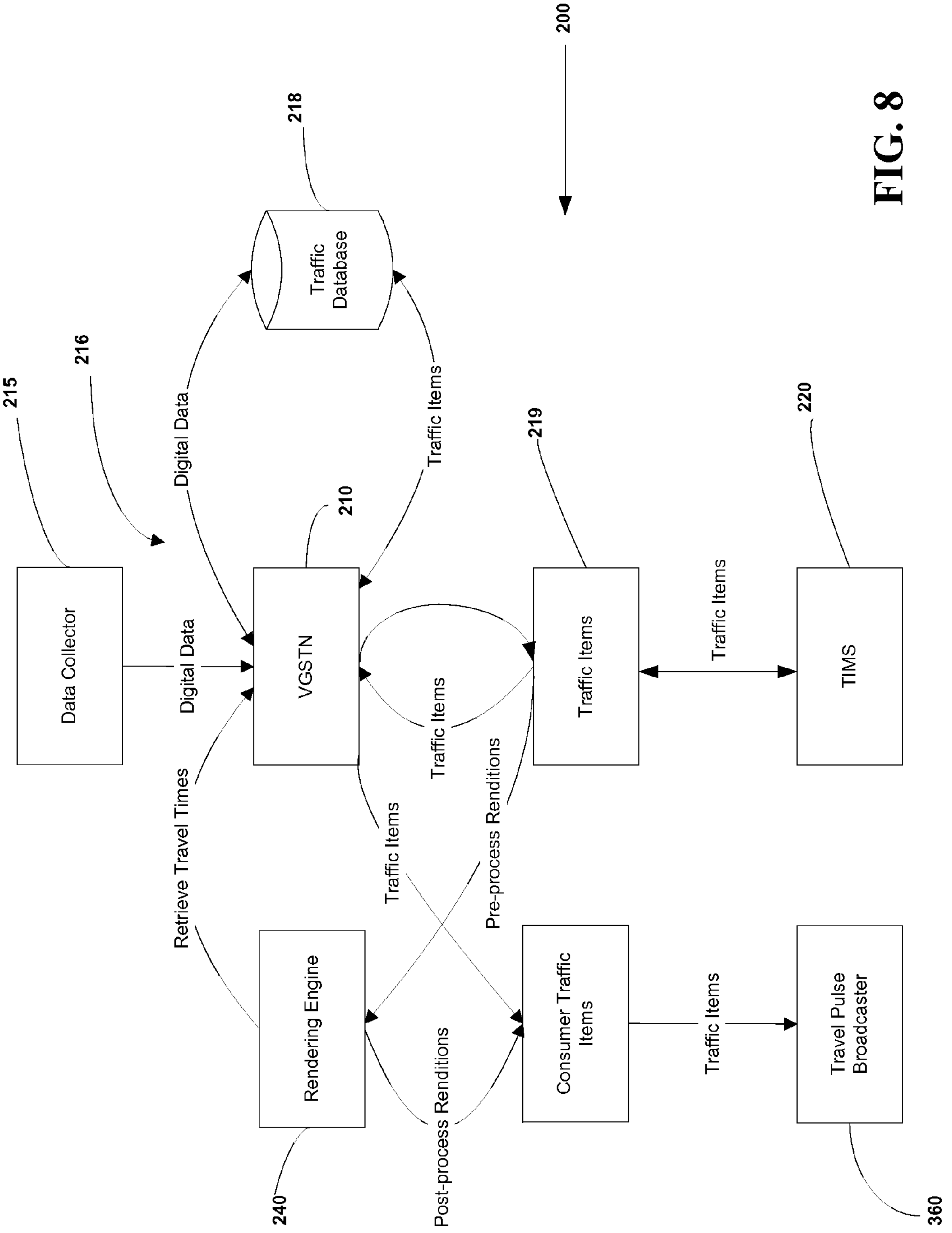

The traffic data processing system 200 includes a virtual geo-spatial traffic network 210 formed by a collection of layered networks within a software and hardware computer architecture 205. The software architecture is embodied in a series of computer applications, middleware, and databases that integrate, store and process map data 212, flow data 216 and traffic information 225, and create, within computer memory, a virtual traffic network. The VGSTN 210 includes an integrated traffic database 218 (see FIG. 8) containing traffic data for a road system across a metropolitan, regional or national area. The VGSTN 210 spans several layers of the software architecture, such that all of the layers reference map data 212 which represents the actual physical road system. End applications, such as a web-based application 208 or a radio or TV station 209 may query the VGSTN for desired traffic data. FIG. 6 shows an enlarged view of a web application 208 reporting traffic data according to the present invention.

The VGSTN 210 allows all of the data within the traffic system 200, including the roadway map data 212, flow data 216, and traffic information 225, to have a synaptic relationship. The synaptic relationship means that the data within the VGSTN 210 is independently aware of the existence, location, attributes and current state of the other relevant traffic data within the traffic system 200. As a result, the VGSTN 210 generates traffic data which dynamically evolves over time and matches the traffic conditions occurring on the actual road system. The VGSTN 210 is preferably continuously updated in real-time. Thus, as actual conditions on the road system change, those changes are instantaneously reflected in the VGSTN 210. However, the traffic system 200 functions in a similar manner if real-time flow data 216 or traffic information 225 is unavailable.

Several separate, known technologies are utilized as inputs to the computer systems 205 which form the VGSTN 210. One such input is dynamic map data 212 which creates a base layer 312 (see FIG. 15) for the VGSTN 210. The base layer 312, made up of the map data 212, represents the actual, physical road system of a metropolitan area at the lowest possible level, using a system of links and nodes. Map data 212 for regional or national road systems may also be used without departing from the spirit and scope of the present invention. The map data 212 is preferably commercially available from digital mapping providers, such as Navigation Technologies, Inc. ("NavTech"), which provide detailed data that identifies the roadways of a road system to a generate graphical representation of the road system. The map data 212 can also be integrated from other known existing road systems, including Geographic Data Technology ("GDT") and Tele Atlas. These mapping systems provide turn-by-turn directions and contain accurate representations of the locations of the roadways across a metropolitan area. The road systems identified in the commercial mapping packages are generally geographically correct with respect to the coordinates (latitude and longitude) of the roadways' physical location. FIG. 15 represents an example of the base layer 312 showing the lowest level of link definitions. In the base layer 312 of FIG. 15, a roadway 320 (in this case I-91) is defined as a set of links and nodes. Each link represents a distinct stretch of the roadway 320 between two nodes. A node is where a commuter either needs to make a decision along the roadway 320 or where two or more roadways merge together.

The base layer 312 is mapped to a higher-level traffic layer 314. As shown in FIG. 16, the traffic layer 314 redefines the links and nodes of the base layer 312 to create a logical representation of the roadway 320. The traffic layer 314 is defined in terms of logical interchanges or decision points for a commuter, where multiple base links and nodes are combined into a single link with an upstream and downstream node. The initial set of these definitions is included with the commercial map data 212, with the base links maintaining a reference to the logical location or interchange. The traffic layer 314 allows higher level management of the road system in the VGSTN 210.

The VGSTN 210 includes a Traffic User Roadway Knowledge Interface ("TURKI") 207 (see FIG. 7), which allows modifications and customizations to the traffic layer 314 to further define the logical roadway representation created by the traffic layer 314.

Examples of the types of modifications which the TURKI 207 enables include:

Defining aliases for roadways, points and directions;
Inactivating roadways;
Splitting roadways;
Joining roadways;
Sharing points across two roadways;
Setting the visibility of points for different layers; and
Defining new points based on intersections.

Creating and utilizing a customized traffic layer 314 which references the base layer 312 makes it possible for the other data which is collected and stored by the VGSTN 210 (traffic flow data 215 and traffic information 225) to be integrated with each other as well as the map data 212. Thus, the VGSTN 210 is able to generate accurate traffic data representing conditions on the road system. Since the traffic layer 314 joins roadways in the base layer 312 to account for direction, directional point-to-point travel times, including the effects of traffic information 225 (i.e., incidents and other traffic events), are determined throughout the VGSTN 210 in real-time to reflect the actual conditions on the road system. The traffic layer 314 of the road system is thus better suited to processing traffic data than the basic link and node model utilized by the base layer 312.

Additionally, since the VGSTN 210 utilizes map data 212 which is accurate to any latitude and longitude coordinate, customizing the traffic layer 314 using the TURKI 207 allows other location data to be located within the VGSTN 210, so that the traffic system 200 is expandable in multiple dimensions. This feature allows other real world information to be located on the traffic layer 314 such as buildings, bridges, landscape, bodies of water, each having the exact location and dimensions of their real-world counter-part. Accordingly, these added features are then also accounted for in the VGSTN 210.

Figure 9:
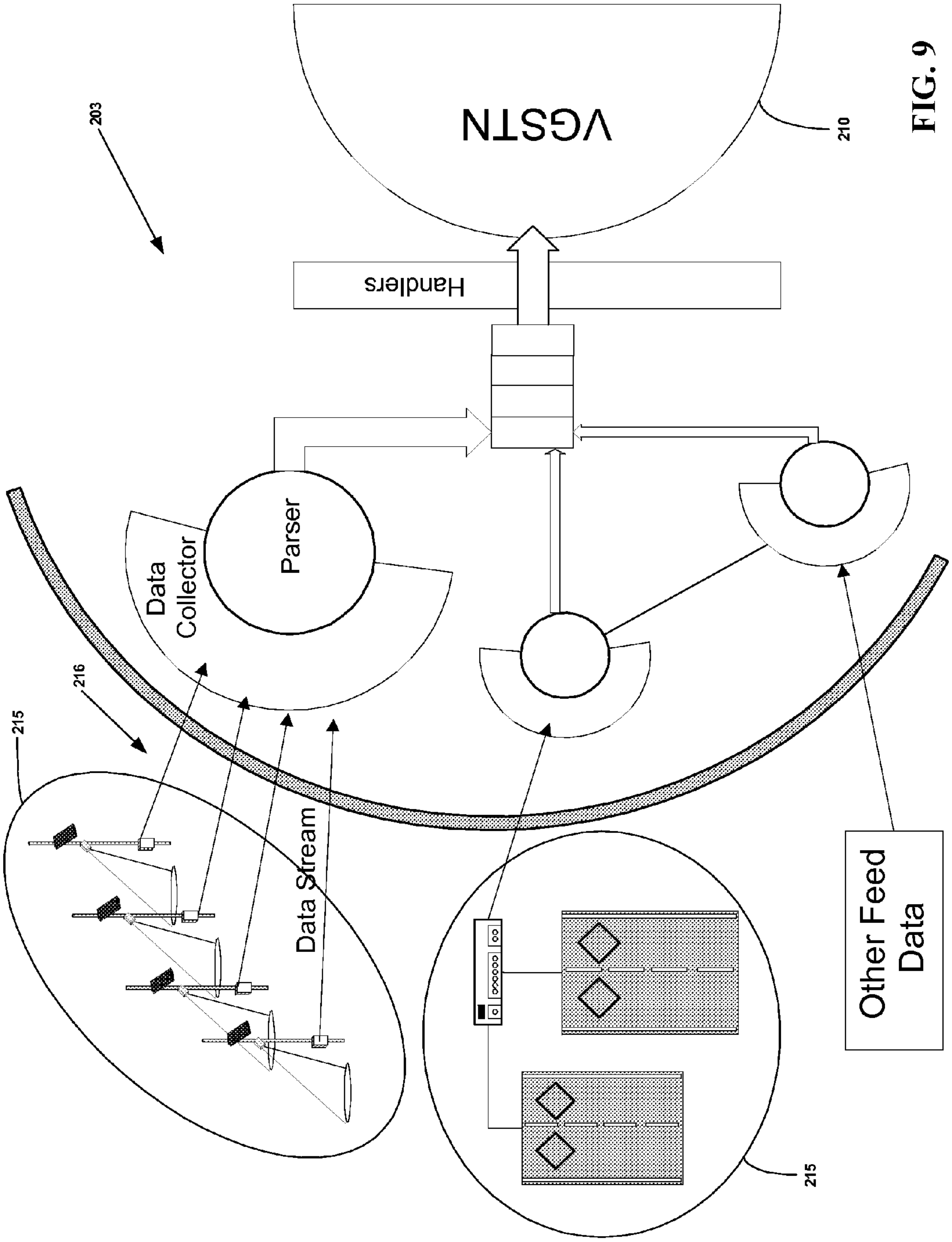
Figure 10:
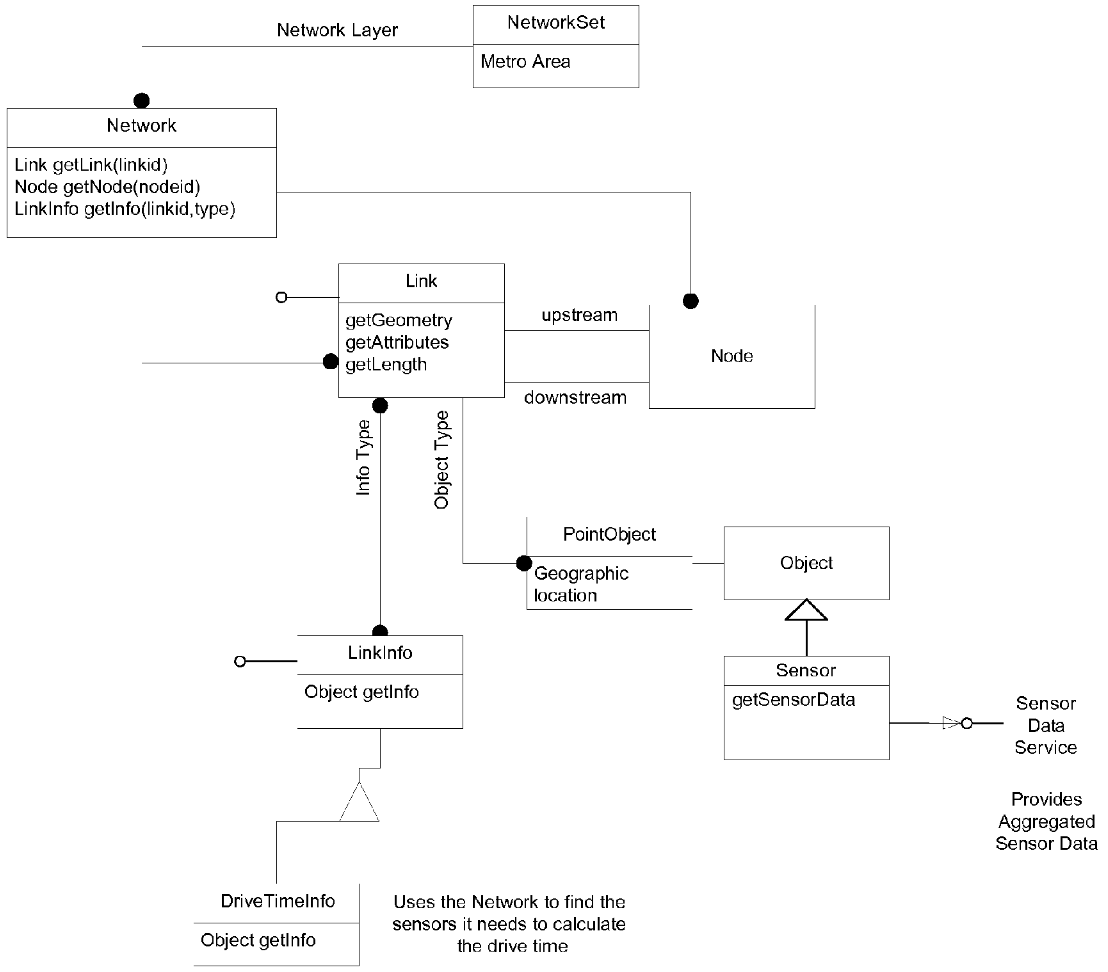

The VGSTN 210 collects traffic flow data 216 in a manner generally known in the art (see FIGS. 5 and 9). The traffic flow data 216 is digital sensor information related to traffic flow on the road system, including the speed, volume and density of vehicles passing various points along a roadway. The traffic flow data 216 is typically collected from a plurality of digital sensors 215 generally known in the art. The digital sensors 215 operate using microwave radar, passive acoustic, video or embedded loops in the roadway. Other sensors known to those skilled in the art may also be used. Generally, any sensor device or combination thereof that monitors volume, speed and/or occupancy of vehicles in a lane or group of lanes, or a device that tracks travel times of vehicles, is considered an appropriate sensor 215 in accordance with the present invention. The actual field structures of the sensors 215 vary depending on the individual sensor and are described in the documentation provided by the manufacturer.

The traffic flow data 216 is preferably collected in real-time or near real-time. The near real-time flow data 216 is typically buffered within the sensors 215, and is either pushed or pulled from the device on a regular interval, typically between 20 to 120 seconds. The sensors 215 typically output via an RS-232 format, which can be converted to Internet Protocol, and streamed into the flow data computers 203, although other formats known to those skilled in the art may be used. The flow data 216 is aggregated and analyzed using the flow data computers 203, and provided to the VGSTN 210 as a data stream in a structured format.

Traffic flow data 216 is often available from government data systems, such as a Department of Transportation ("DOT") or similar sources. A DOT makes flow data 216 available in different forms, depending on the capabilities and policies of the individual DOT. Some DOTs make the raw flow data available at a specified interval in real-time or near real-time through advanced protocols. Other DOTs aggregate the flow data and even calculate some fields (for example speed) and make the data available through more mature protocols. The traffic system 200 is compatible with various DOT systems, allowing the full functionality of the VGSTN 210 to utilize DOT flow data.

The VGSTN 210 further collects traffic information 225 input by a traffic operator 202 in near real-time. The traffic information 225 includes information related to traffic events including incidents (i.e., an accident or congestion), weather, construction or any other traffic event which affects traffic flow on the road system. The traffic information 225 is typically collected by traditional traffic gathering organizations ("TTGO") staffed with local traffic operators 202 who communicate with surveillance aircraft or vehicles, listen to scanners on police, fire, and emergency frequencies, communicate with local DOTs, traffic management centers, transportation or similar agencies, and/or monitor video camera images. The traffic information 225 is usually identified by its general location on the road system, and may be a quantitative (i.e., a numerical value) or a subjective description of a traffic event. For example, if reporting an accident, the traffic information 225 which is entered might include numerical values to indicate the number of lanes blocked and the time the accident occurred. However, if the traffic information 225 is congestion information, a more subjective, human observation (such as length of back-up) may be entered.

According to the present invention, the VGSTN 210 integrates the traffic layer 314, the real-time traffic flow data 216 and the traffic information 225, and utilizes a synaptic relationship model that maps and tracks, over time, the disparate pieces of traffic-related information input to the traffic system 200. Since the VGSTN 210 continually receives input from the digital sensors 215 which are being updated in real-time, for any given point or set of points on the traffic layer 314, the real-time traffic data (actual traffic conditions), as well as any relevant traffic information 225, on the road system is known.

Accordingly, any impact of the traffic information 225 input to the VGSTN 210 is immediately determined.

The VGSTN 210 is also capable of determining and tracking if congestion is building on the road system, even if no traffic information 225 is reported by a traffic operator 202. That is, the traffic information 225 may itself contain congestion information or other traffic event information which prompts a report of congestion conditions from the VGSTN 210. However, because of the continuous real-time flow data 216 input to the VGSTN 210 from the sensors 215, the VGSTN 210 is capable of tracking congestion through the flow data 216 alone. Since the flow data 216 that the VGSTN 210 utilizes is aggregated by the flow data computers 203 using some combination of one or more values of the speed, volume, and occupancy, and classification data that is received from the digital sensors 215, the VGSTN 210 does not actually require the input of traffic information 225 to determine congestion for those roads that contain sensor information. However, congestion information may, and often is, manually created by a traffic operator 202. For roadways without the benefit of digital sensors 215, the traffic operator 202 can input congestion items through the TIMS 220. In this case, the VGSTN 210 is aware that no digital traffic flow data 216 is available, and therefore does not attempt to compute traffic data (i.e., travel and delay times) for that congestion item.

Further, because the VGSTN 210 also contains and manages each of the digital traffic sensor 215 locations which collect the flow data 216, intelligent management of the sensors 215 is possible using the traffic layer 314. For example, if a particular traffic sensor 215 is placed on the road system, the VGSTN 210 knows the exact location of the sensor 215, the direction and number of lanes the sensor 215 is monitoring, and the next closest sensor 215 in each direction. Thus, the VGSTN 210 maintains a synaptic relationship with the flow data 216 and the digital sensors 215.

The unique features of the VGSTN 210 allow multiple representations of traffic events to co-exist and continuously evolve in real-time with the digital flow data 216, while simultaneously providing a detailed understanding of the roadway geometry (lanes, ramps, exits, interchanges, HOV lanes, links, and nodes) from the traffic layer 314. That is, the VGSTN 210 determines the effect on traffic flow on the road system by adjusting the traffic data to reflect the constantly changing real-time flow data 216 and one or more traffic events on or in proximity to that portion of the roadway. The synaptic relationship created within the VGSTN 210 allows for the traffic data and traffic events across a metropolitan area to be self-aware of the surrounding traffic data in the VGSTN 210, and report and change their characteristics accordingly. Once any point on the road system can be queried to understand its relationship to all traffic related information (i.e., flow data and traffic events) in any symmetrical or asymmetrical area outward from that point, then a virtual world is created. Thus, any granularity of traffic data for any portion of the road system in any direction, is easily rendered in multiple formats in real-time. The traffic items 230 stored within the VGSTN 210 evolve over time as additional real-time flow data 216 and traffic information 225 is input and applied to the system. The traffic data is also archived such that time period(s) in the past can be recreated.

In operation, the VGSTN 210 is a dynamic traffic image of the road system of a specified area, and provides current traffic data to end users and/or applications 208, 209. An application or individual may query the VGSTN 210 across a wide permutation of traffic data requests. Requesting a drive time across a particular segment of a roadway, individual lane data between two points on a roadway, or requesting all traffic data within a 1 mile radius of a specified point, are examples requests that end users or applications can make to the VGSTN 210. Because of the rendering engine component 240 (discussed in further detail below) of the present invention, an application, new or existing, can make use of existing traffic data when requesting current, real-time traffic data from the VGSTN 210.

Referring to FIGS. 5, 7-8 and 20-32, the traffic data processing system 200 further includes a Traffic Information Management System 220 which allows traffic operators 202 to input traffic information 225 to the VGSTN 210 and manage and query the traffic data already within the VGSTN 210 for the road system of a metropolitan area. The TIMS 220 also allows traffic data to be effectively reported to a traffic operator 202, end user or application.

The TIMS 220 operates using independent records, or traffic items 230, for inputting traffic information 225 to and querying traffic data from the VGSTN 210. A traffic item 230 is a record defined by the TIMS 220 (and recognized by the VGSTN 220) by its location on the road system. When stored in the VGSTN 210, each traffic item 230 contains traffic data associated with its corresponding location. The location is preferably defined in the TIMS 220 as either a single point (for example, a known location on the road system) or a pair of "from" and "to" points (for example, a pair of mile markers on the road system). Another way to identify a location in the TIMS 220 is by an offset and street intersection, or by a street address corresponding to a link in the VGSTN 210. Traffic information 225 is entered and traffic data is queried by referencing a traffic item 230 (i.e., some form of location information) to which that information or data corresponds. That is, to input traffic information 225 to the VGSTN 210 via the TIMS 220, the traffic information 225 needs some location reference so that the VGSTN 210 knows how to integrate the traffic information 225. Similarly, to query traffic data from the VGSTN 210, it is actually traffic data with respect to a specific location (or area) which has meaning and which is reported. Using traffic items 230 to enter traffic information and query traffic data has the advantage that each individual traffic item 230 is stored and tracked over time in the VGSTN 210.

The TIMS 220 main screen 222 contains a drop-down menu (see FIG. 20) of metropolitan areas 221, giving the traffic operator 202 the ability to have a national view of traffic conditions. After choosing a metropolitan area 221, the TIMS 220 displays the traffic items 230 for the specific metro area 221, as shown in FIG. 20. This is accomplished by the TIMS 220 requesting to the VGSTN 210 to retrieve the currently active traffic items 230 for the specified metro area 221. The traffic items 230 go through a post-processing step using the REC 240 before being presented to the traffic operator 202 or end user on the TIMS main screen 222. Each traffic item 230 contains the relevant traffic data corresponding to the location on the road system identified by that traffic item 230.

A traffic operator 202 has the ability to create traffic items 230 or edit or delete existing traffic items 230. A traffic item 230 is created by the TIMS 220 when the traffic operator 202 enters traffic information 225 or queries the VGSTN 210 with respect to a location on the road system for which no traffic item 230 already exists. The different TIMS edit screens 226 (see FIGS. 21-24) present the traffic operator 202 with a menu of choices as to what type of information will be entered. The TIMS 220 then uses a series of forms, or screens, to prompt the traffic operator 202 for all of the relevant information to be entered. Each form includes a set of standardized, predetermined fields which represent specific pieces of information for the traffic operator 202 to enter with respect to the particular traffic item 230 which is being created or edited. The forms and fields used depend on the type of traffic information 225 to be entered and what type of information the user has available. For example, the traffic information 225 entered by the traffic operator 202 could be incident, construction, mass transit, weather or other traffic event information. Since each of these types of traffic information 225 is generally represented in a different way, the field information requested by the TIMS edit screens 226 is different for each type of entry. FIGS. 21-24 show different TIMS edit screens 226, corresponding to congestion, accident, construction, and mass transit, respectively, with differing fields for creating different types of traffic items 230. When entering traffic information 225, a minimum of two entries are required: a location point and a piece of information corresponding to that point. If a traffic operator 202 is simply creating a traffic item 230 to query the VGSTN 210 about traffic data about a specific location, it is possible to enter only a single location point to identify that traffic item 230. Alternatively, the location of the traffic item 230 can be referenced by a street intersection or street address in the VGSTN 210.

The TIMS 220 also interfaces with the VGSTN 210 by using the integrated traffic data from the VGSTN 210 to determine when, and to what extent, a roadway is congested. Traffic operators 202 generally use traditional traffic flow maps 105 to visually determine the presence of congestion on the road system. A traffic operator 202 can then create a traffic item 230 in the TIMS 220 to reflect the congestion information. FIG. 21 shows the edit screen 226 for entering congestion information. Entering congestion information into the TIMS 220 is similar to entering accident information, but also includes the travel times retrieved from the VGSTN 210 for the specified portion of the road system. That is, since a congestion item is never at one specific location on the road system, but rather exists over some distance between two points 223, 224, and the VGSTN 210 already knows traffic flow data 216 from the sensors 215 for those points, the VGSTN 210 supplies traffic data to be included with the traffic item 230 that is created for the congestion information. Thus, when "from" and "to" points 223, 224 for the congestion are selected, the TIMS 220 requests the VGSTN 210 to return the traffic data (for example, digital travel time, digital delay, and digital average speed) between the selected points 223, 224. The digital travel and delay times are then incorporated into the text displayed to the traffic operator 202 on the TIMS screen 222 for the congestion as well as into the traffic item 230 which is created and stored in the VGSTN 210. For traffic items 230 which are created using a single location point, travel time or delay time cannot be incorporated into the traffic item 230 since the traffic information 225 only references single point, and not a distance over which a time or delay can be calculated.

The traffic items 230 created by the TIMS 220 are placed with geo-location accuracy in the VGSTN 210 based on the location of the traffic item 230 on the road system. The traffic information 225 which is input to the TIMS 220 is thus integrated with the VGSTN 210. The VGSTN 210, via the TIMS 220, then returns traffic data related to that particular traffic item 230, reflecting the traffic information 225 just entered. This enables the traffic operators 202, immediately upon entering a traffic item 230, to ascertain the impact of that traffic item 230 on a particular roadway based on the traffic data received from the VGSTN 210. The traffic data which is reported to the TIMS 220 from the VGSTN 210 is available to other applications as well.

Referring to FIG. 25, if the traffic operator 202 knows that two or more traffic items 230 or pieces of traffic information 225 are related, the traffic operator 202 can link the corresponding traffic items 230 in a parent-child relationship. Linking, for example, allows the VGSTN 210 to relate a congestion traffic item 230 to a incident traffic item 230. Applications which reference the VGSTN 210 can then present the linked traffic items 230 together. An example is congestion due to an accident on the same roadway and direction or congestion due to an accident on the same roadway but in the opposite direction. In the TIMS 220, traffic data for the linked item is displayed on the main screen 222 under the traffic item 230 to which it is linked (see FIG. 26). In an application such as the Traffic Pulse Broadcaster 360, discussed in further detail below, the text for the linked items might appear as: "RT-202: 16 min Chesterbrook Blvd to RT-30, avg speed 53 mph due to accident." In the TPB display of FIG. 41, note that the traffic item 230 lists travel time and average speed for the distance between the two points and references an accident.

The TIMS 220 allows traffic operators 202 or other users to interface with the VGSTN 210 and enables detailed traffic information 225 to be collected in a consistent format, on a national basis, in real-time. Using the TIMS 220, traffic operators 202 directly interact with the VGSTN 210 so that the impact of traffic information 225 can be directly related to the real-time flow data 216 which is layered onto the VGSTN 210. The flow data 216 and traffic information 225 is integrated on a national basis such that any traffic operator 202 can immediately determine the impact of traffic information 225 on traffic data such as travel times, delay times, congestion and speed. The traffic data provided by the VGSTN 210 allows the traffic operator 202 to understand and set the severity of the traffic information 225 based on what is occurring on the road system at that instant.

Without this detailed level of granularity, entering traffic information 225 so that it has a synaptic relationship, similar to the relationship of a neural network, and the ability to evolve over time, is not possible within the VGSTN 210. The TIMS 220 interface to the VGSTN 210 allows any view, query, scope or granularity of the traffic data within the VGSTN 210 to be interrogated without any predefined patterns. Any point on the road system that is modeled within the VGSTN 210 can be queried regarding its proximity to other traffic events, within a particular direction of a roadway, spanning multiple roadways, or its relationship and impact to other data, including flow data.

Referring to FIGS. 33-38, the traffic data processing system 200 further includes a rendering engine component 240 which represents each traffic item 230 as a text rendition for presentation or further processing by another application. The text renditions are stored in the VGSTN database 218 with the current version of each traffic item 230.

The REC 240 has two primary capabilities. Initially, the REC 240 builds a text rendition of each traffic item 230 entered into the VGSTN 210 from the traffic information 225 related to that traffic item 230. Text renditions are created when the TIMS 220 creates a traffic item 230 (see FIG. 36). The traffic item 230 is passed from the VGSTN 210 to the REC 240. The REC 240 processes the traffic item 230 and creates multiple text renditions according to the flow diagram of FIG. 33. As shown in FIG. 36, the list of text renditions 242 contains text entries 243 for each rendition type. The traffic item 230, including its corresponding text rendition, is then returned to and stored in the VGSTN 210.

Second, the REC 240 stores and manages the individual text renditions in an efficient manner, so that an application which interfaces with the REC 240 and the VGSTN 210 only need to be capable of displaying the selected text rendition (i.e., a text string). Thus, an individual application does not need to be passed the specific traffic data which is entered into or generated by the VGSTN 210. For example, the type or qualifiers of an incident, or even new types of incidents, are unnecessary for the end application to know. Furthermore, the REC 240 makes it unnecessary for an end application to know about changing traffic data. That is, for traffic data within an individual traffic item 230 which changes over time, the REC 240 inserts a variable into the corresponding field in the text rendition of the traffic item 230, so that the traffic data automatically updates upon rendering to the end application. For example, a text rendition for a congestion item contains variables referencing travel time data for that traffic item 230. When the traffic item 230 is retrieved, a process by the REC 240 inserts the current travel and delay times for real-time reporting to the end application.

Since the REC 240 allows elements of the VGSTN 210 to be rendered in any number of formats (depending on the application), and the REC 240 requires only the final end rendition of the data be passed to the application, there is thus increased efficiency in the amount of data passed to the application. Renderings for applications such as VXML for voice (natural speech via voice concatenation or computer generated text to speech), ASCII text for radio station applications, or XML (or similar formats) feeds for two and three-dimensional television applications, are accomplished without additional work on the part of the application. Additionally, an application does not need to create lists of data types or code to process these types to create the final rendition. The end application also does not need to be recompiled process additional data when new traffic data types are added or changed in the VGSTN 210 or when new forms and/or fields are added to the TIMS 220.

Those skilled in the art will recognize that additional text rendition formats to accommodate additional applications may be added to the REC 240 without substantial effort. The power of the REC 240 is that, once traffic data is rendered into a text string, that traffic data is available to any application in the rendered form. Additionally, an application may choose, in real-time, which rendition(s) of the traffic data is most desirable for output at any given point in time.

Referring to FIGS. 40-43, the Traffic Pulse Broadcaster 360 is an example of a traffic reporting application which integrates digital travel and delay times with other traffic data, such as congestion data, for display to consumers. The TPB 360 is a consumer application which is currently used for the radio market, so that radio traffic reporters can easily read, understand and report current, real-time traffic conditions. Using the REC 240, the TPB 360 groups traffic items 230 by roadway and direction for displaying the current roadway views. The TPB 360 then displays the traffic data into a single application that provides an integrated view of the traffic data within the VGSTN 210. As shown in FIGS. 40 and 41, the TPB 360 utilizes text strings that allow the user (such as a traffic reporter) to identify the impact of traffic events and congestion on traffic flow on the road system, particularly speeds and drive-times on a point-to-point basis. For example, congestion caused by both volume and/or an incident can calculated by the VGSTN 210 and then rendered in a format and priority chosen by the user for simultaneous display by the TPB 360. The TPB 360 is also able to display detailed information on a lane-by-lane basis.

Referring to FIGS. 44-49, another aspect of the present invention is the ability to automatically render traffic data into a two-dimensional TV graphics engine 370 for graphical display via an NTSC or HDTV or similar signal. The VGSTN 210 includes a "view" or graphical network layer 316 (see FIG. 18) which is oriented toward displaying traffic data from the VGSTN 210 on a video system. The graphical layer 316 allows the traffic data to be presented on the TV2D 370, and can be driven by any of the traffic data managed by the VGSTN 210 (incidents, events, flow, etc). A TVFeed application updates the status of the roadway links in the graphical layer 316 based on the current conditions on the road system and how those conditions are to be represented, based on the traffic data in the VGSTN 210. In the preferred embodiment, the main driver for updating the roadway conditions is the congestion items from the TIMS Java model (see FIG. 30). Using a combination of a point, the offset for that point and the congestion type, the corresponding links in the graphical layer 316 are selected to represent the current conditions on the road system by some form of visual representation (this may include color, pattern, animation, width, gradients, or other visual effects). One example of mapping this information is shown in the embodiment for the TV2D 370 of FIG. 48. The integrated view provided by TV2D 370 also shows the proximity of other traffic events and traffic related information (i.e., individual points or specific landmarks) to incidents.

Figure 1:
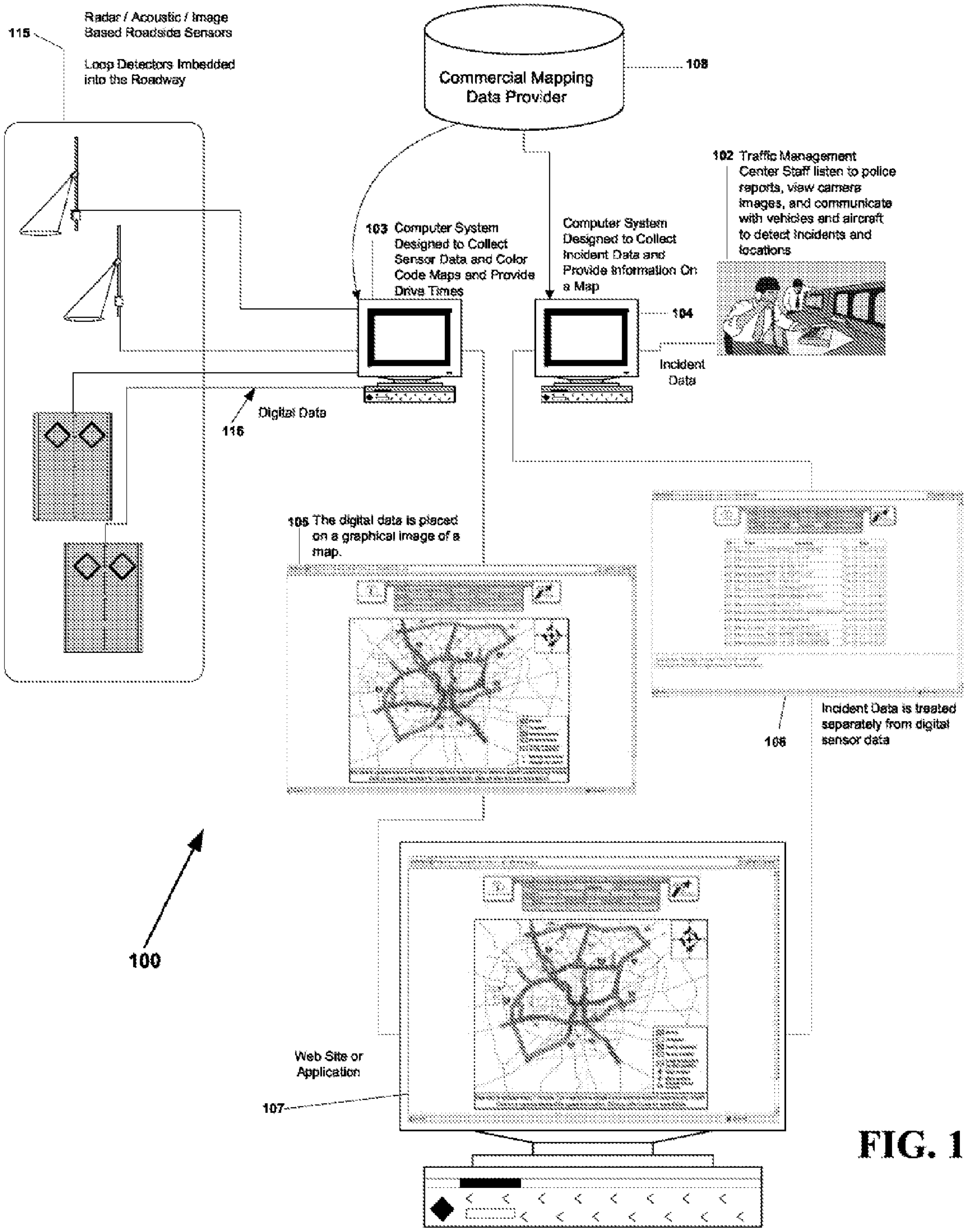
Figure 3:
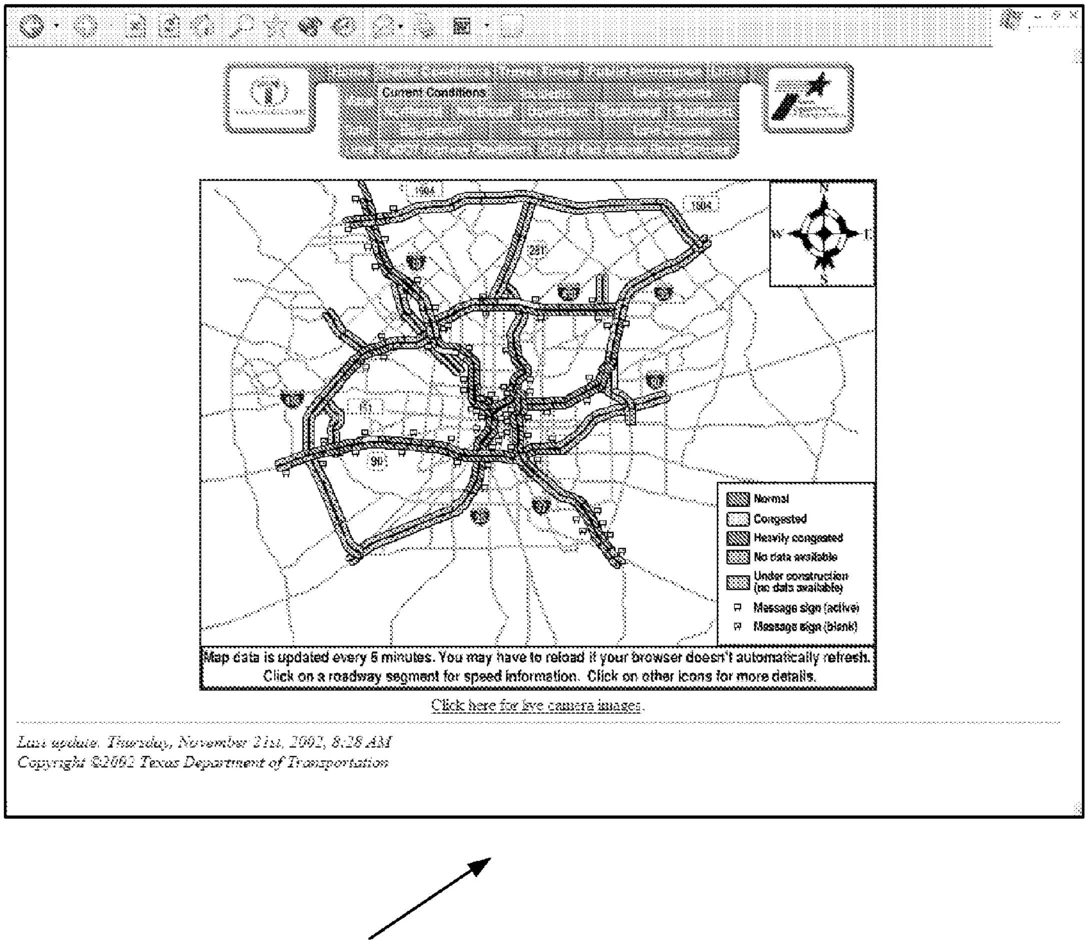
Figure 4:
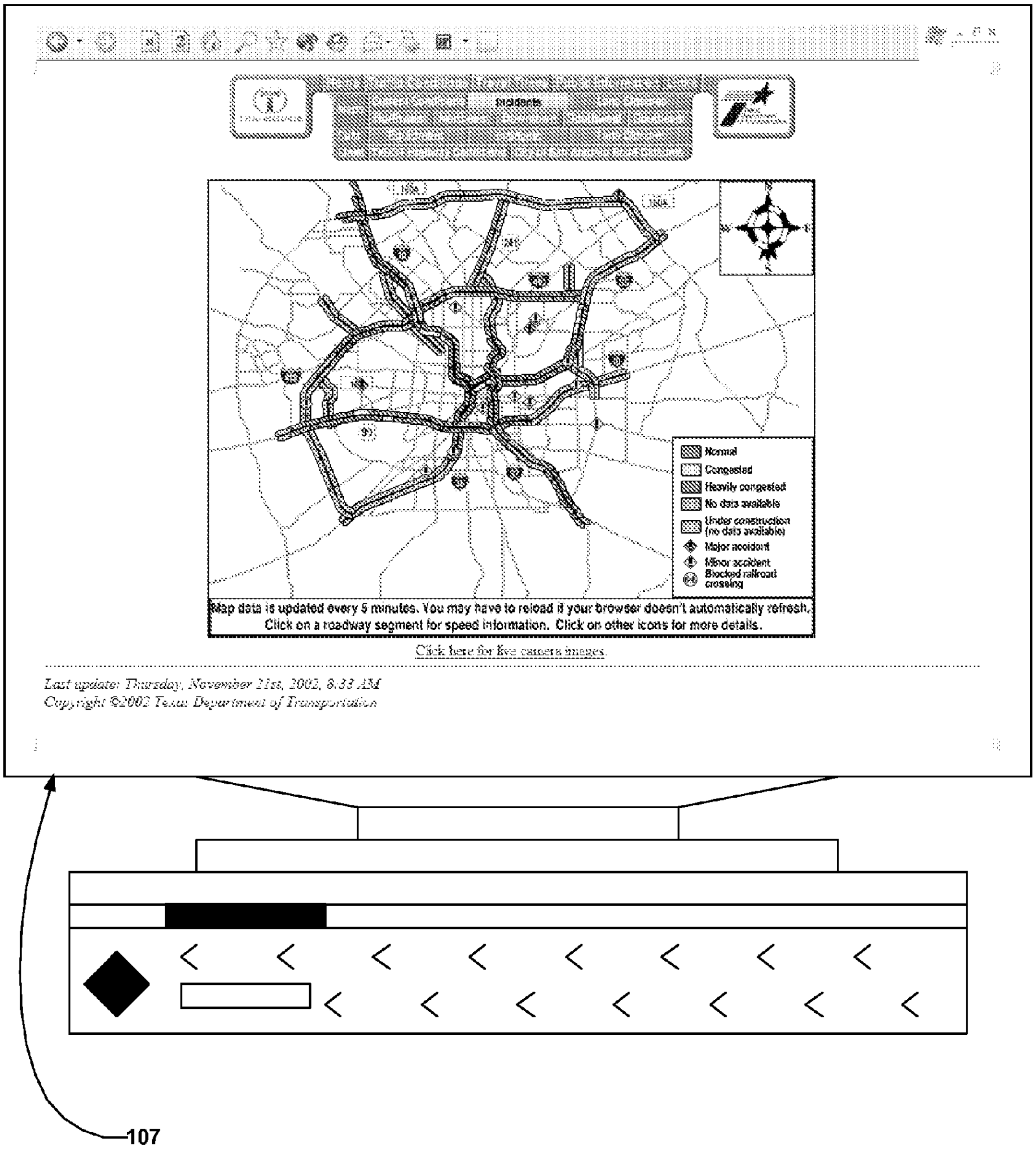

The traffic system 200 of the present invention thus comprises software code and applications that continuously retrieve real-time digital flow data 216 and traffic information 225, integrate and manage the traffic data on the traffic layer, respond to queries regarding the road system, and continuously monitor the relationships between all the data. Thus, the VGSTN 210 provides significant advantages over the presently used traffic maps that include un-integrated flow data and event information, such as the web application 107 of FIG. 1.

Example

The operation and overall flow of calculating and reporting traffic data using the traffic system 200 according to the present invention is further described through the following example. The example describes the evolution of traffic data within the VGSTN 210 during the course of an incident (in this case an accident) on a roadway. Since the following example demonstrates only one implementation of the traffic system 200, it should not be considered limiting.

FIGS. 50-67 illustrate a typical road system having a roadway 1000 intersecting another roadway 2000. Both roadways 1000, 2000 are electronically monitored at predetermined locations by digital sensors, generally designated 215, which produce traffic flow data 216. The roadways 1000, 2000 may also be covered by traffic operations staff. FIGS. 50-52, 56-58, and 62-64 show tables of flow data 216 for each digital sensor 215 (each identified by an individual label in FIGS. 55, 61 and 67) along each of the roadways 1000, 2000 for each of three time periods, $T_0$-$T_2$. FIGS. 53, 59 and 65 show the TIMS screen 222 corresponding to the traffic data for each of the respective time periods, $T_0$-$T_2$. Similarly, FIGS. 54, 55, 60, 61, 66 and 67 show the TPB 360 display and a 2D display screen corresponding to the traffic data for each of the respective time periods, $T_0$-$T_2$. Data highlighted in red in the tables of sensor data indicates a significant change over the data set for the previous time period.

Referring to FIGS. 50-55, the sample traffic flow data 216 indicates that at $T_0$ the incident has not occurred and traffic is flowing at a normal, high-volume rate. Accordingly, the TIMS screen 222 (FIG. 53) shows no reported problems, as no traffic items 230 are listed, and the TPB screen 360 (FIG.

54) shows that all of the selected roadways (including 1000 and 2000) have “no reported problems”. Additionally, the 2D display screen (FIG. 55) shows all portions of the roadways 1000, 2000 in green, indicating negligible traffic delays.

Referring to FIGS. 56-61, at $T_1$ an incident has occurred between sensor 1002 and 1003, on the northbound side of roadway 1000. The traffic flow data 216 for sensor 1002 (see FIG. 56) thus shows a drop in volume for the northbound lanes 1-3, compared to the same sensor and lanes for $T_0$. Additionally, the flow data for sensor 1003 indicates a decrease in speed and increase in density for the same lanes 1-3. Since the incident has just occurred at $T_1$, the remaining other links on the roadways 1000, 2000 (and thus the corresponding sensors 215) are unaffected. For $T_1$, a traffic item 230 has appeared on the TIMS screen 222 as an accident northbound on I-95 (see FIG. 59). In the TPB 360 (FIG. 60), the display screen now indicates an accident for the I-95 entry (i.e., roadway 1000). The 2D display screen for $T_1$ (FIG. 61) has turned link 102 (the link where the incident occurred) yellow, indicating that traffic flow in that link is beginning to slow.

Referring to FIGS. 62-67, at $T_2$ the accident has significantly impacted the roadway 1000 in the northbound direction (indicated by the traffic data for sensors 1003, 1004, and 1005 in FIG. 62), created a gaper delay in the southbound direction (speed data for sensor 1002), and slowed the intersecting roadway 2000 (sensor 2011 in FIG. 63). Note that for sensor 2011 for the southbound roadway 2000, only lanes 4 and 5 show affected flow data 216, since these are the lanes which feed into the northbound lanes of roadway 1000. At $T_2$ there are thus multiple congestion items caused by the accident. The VGSTN 210 automatically calculates drive times and delay times as a result of the incident and congestion, as shown in the table of FIG. 64.

The TIMS screen 222 (FIG. 65) reflects the accident, congestion and resulting traffic data by displaying the active traffic items 230. A total of three traffic items 230 are displayed for I-95 (roadway 1000): an incident item and congestion item linked together for the northbound direction, and a congestion item for the southbound direction. A separate traffic item 230 is shown in the TIMS for the interesting roadway 2000. Note that traffic data (in this example, drive time, delay and speed) is displayed for each traffic item 230. The traffic data shown in bold on the TIMS screen 222 of FIG. 65 represents data which was updated using variable substitution in the text renditions of the REC 240.

For $T_2$, the TPB 360 display screen (FIG. 66), shows a rolled-up rendition of the traffic data for the two affected roadways 1000, 2000, as opposed to the text rendition that is shown on the TIMS screen 222 for $T_2$. The TPB 360 is directed toward radio and TV reporting, and therefore warrants a simplified traffic data description and view as shown in FIG. 66. The rolled-up text rendition is possible using the REC 240, and includes the variable substitution feature (also shown in bold). Additionally, the 2D display screen for $T_2$ (FIG. 67) now reflects the full impact of the accident, by coloring the various links on the roadways 1000, 2000 yellow and red, depending on the severity of the congestion in each particular link.

The individual components of the traffic data processing system 200 according to the present invention will now be described in further detail.

VGSTN

The VGSTN 210 according to the present invention includes a computer architecture 205 ranging from personal computers with single CPUs, hard disks, memory, monitors and keyboards to mid-range servers with multiple CPUs, terabyte storage systems from Oracle and EMC, large volumes of memory and caching which operate in a stand-alone and networked model. In the networked model, individual or groups of servers provide specific functions (such as loading raw map data or collecting the digital sensor data) that process the data and make it available to other computers in the network in a layered architecture. The middleware servers combine the map data 212, traffic flow data 216 and traffic information 225 and process that data to create the VGSTN 210.

Referring to FIGS. 10-19, the VGSTN 210 is represented as a network set, with each network representing a different layer in the VGSTN 210. The VGSTN 210 includes three primary layers: base, traffic and graphical. The base layer 312 is the core layer where each roadway connection point is represented by nodes and links connect between the nodes (see FIG. 15). The traffic layer 314 and the graphical layer 316 of the VGSTN 210 are derived from the base layer 312.

As discussed, commercially available map data 212 of an area of any size, typically a metropolitan area, is input to the traffic system 200 to form the basis for the VGSTN 210 in accordance with the present invention. The VGSTN 210 uses the map data 212 to create a spatial base layer 312 of geo-located roadways using a series of links and nodes, as is generally known in the art. Once the commercial map data 212 is input to the VGSTN 210, two views of the road system are available in the core dataset. The primary view is through a set of defined roadways, representing the significant traffic arteries, primarily highways, on the road system. A second, more detailed view, contains each highway and street throughout a metropolitan area. The detailed view is used by the VGSTN 210, but travel times only act on the defined roadways.

The VGSTN 210 includes a traffic layer 314 above the base layer 312. The flow data 216 and traffic information 225 which the VGSTN 210 collects from other sources are added to the traffic layer 314, such that all of the traffic data within the VGSTN 210 is synaptically related. As discussed above, the traffic layer 314 modifies the traditional map data 212 representation of a road system using links and nodes. The traffic layer 314 is defined in terms of logical locations or decision points 252 for a commuter, where the initial set of base links maintain references to each logical point 252 in the traffic layer 314.

The traffic layer 314 is further modified by the TURKI 207, which redefines and customizes features of the traffic layer 314 by utilizing location information from the location section 260 of the VGSTN 210. The table shown in FIG. 11 defines the various procedures which the TURKI 207 is capable of executing with respect to the data comprising the traffic layer 314 and the graphic layer 316. The software code implementing the stored procedures listed in the table of FIG. 11 is shown in Appendix A. When different portions of the TURKI code are called, the data which comprises the traffic and graphical layers 314, 316 is modified by changing the data stored in the location, roadway and line feature sections 260, 270 and 280.

The location section 260 (see FIG. 12) details the interchange and offset information in the VGSTN 210. The point table 266 contains interchange information, such that a point 252 (see FIG. 16) is a logical location representing an entire interchange 254 for a roadway 320 in both directions. For a highway-highway interchange 254 there are typically two points 252 (one for each highway) which represent the entire interchange 254. A point 252 may also be designated to represent a landmark or a specific location on a highway (for example, one which a commuter would recognize). There is one row in the point table 266 for each defined point 252.

The offset table 268 contains offsets, or proximities, to the points 252 in the point table 266. The offsets are physical, geographic locations that are determined based on proximity to a point and direction with respect to that point (see FIG. 17). The offset_code field in the offset table 268 sets the proximity type, which may be at, app, aft or mid:

"At" refers to an offset at the center of the corresponding point 252;

"App", or approaching, refers to an offset before point 252 in the direction of travel along the roadway 320 and is mapped to the first node of the interchange 254 described by the point 252;

"Aft", or after, refers to an offset located at the end of the point 252 in the direction of travel along the roadway 320; and "Mid", or midway-between, refers to an offset between the point 252 and the next point 252 in the direction (+/−) of the roadway 320. Mid points are mapped to the center of the line geometry from the ending node of the current point 252 and the first node of the next point 252.

The offset code table 259 defines the valid offset codes for an offset, i.e., at, app, aft, mid in the preferred embodiment.

The location section 260 also includes various support tables. The point type table 263 specifies the type of point. For example, the preferred embodiment defines two types of points 252: standard and custom. Standard points are those which originate from the commercial map data 212. Custom points are those that are created through the TURKI 207. Custom points may be created from a relative position of existing standard points. For example, if there is a distinct exit as part of an existing interchange 254, a custom point may be added at that exit by referencing a standard point and an offset.

The point alias code table 261 defines valid alias codes for a point alias (i.e., local, standard, signage, abbreviated). For example, a local alias in Philadelphia would be the "Blue Route", but the abbreviated name would be "I476". The point alias table 262 defines the current aliases for each point 252 as defined in the point alias code table 261.

The roadway point cross reference table 269 cross references roadways to points 252 and offsets. The roadway point cross reference table 269 allows a point 252 to exist on more then one roadway, so that a roadway can have multiple points 252. Therefore, the VGSTN 210 may have roadways that merge together but have continuous traffic flow to share point definitions. This type of information is used primarily when a back-up is long enough that it "spans" across several points 252 in a roadway merge area.

The point visibility table 264 determines which types of applications have a reference, or visibility, available to a particular point 252. This is useful for allowing different users of the VGSTN 210 to maintain different views of the traffic network. In the preferred embodiment, the visibility types are consumer, producer, and graphics. The roadway point type table 265 defines the valid types for a roadway point (standard, custom, shared, etc.). The visibility code table 267 defines the set of visibility codes that are valid for point visibility (graphics, consumer, producer, etc.).

FIG. 13 shows the roadway section 270 of the VGSTN 210. The roadway section 270 maintains information regarding the roadways, which are comprised of points 252. The roadway table 276 contains information about each of the defined roadways. Defined roadways are those highways and major arteries of a metropolitan area where the majority of traffic events occur. Defined roadways are associated with a list of points via the roadway point cross reference table 269. The points 252 associated with a defined roadway are ordered on the roadway in a positive direction. The opposite direction is referred to as the negative direction. Entries in the roadway point cross reference table 269 include a point_sequence field which orders the points on a given roadway in the positive direction. For example, if the positive direction for a roadway is northbound, and exit 20 is north of exit 19, then exit 19 will have a lower point_sequence value then exit 20.

The roadway direction alias table 274 maintains the positive and negative direction mappings for the points 252 on the roadway. The direction table 271 maintains the list of direction types (eastbound, westbound, inbound, outbound, etc). The direction alias code table 272 is an alias list for additional names for directions. For example, a roadway may be a north-south roadway, but it may also be considered by locals as an inbound-outbound roadway. The roadway alias code table 273 defines the valid alias codes for a roadway alias (local, standard, etc.). The roadway alias table 275 maintains alias names for roadways, including local, signage, standard, and abbreviated. This allows the TURKI 207 to provide alternative names for each roadway according to different user needs. The roadway type table 277 defines the valid roadway types (standard, custom, etc.). Standard roadways are those initially created from the commercial map data 212, while custom roadways are those created by the TURKI 207, either by splitting/joining an existing roadway, or by using intersection data to create points and add them to the roadway.

FIG. 14 shows the line feature ("LIFE") data section 280 of the VGSTN 210, which represents the geometric aspects of the VGSTN 210. The LIFE section 280 is the lowest level of information regarding the VGSTN 210 and is highly abstracted by the applications into the traffic layer 314 and graphical layer 316. The LIFE table 284 contains each LIFE that comprises the road system in the VGSTN 210. The column GeoLoc in the LIFE table 284 is an Oracle spatial column that contains the latitude and longitude coordinates that define each LIFE using earth coordinates.

Each LIFE contains two nodes, an upstream and a downstream node. A node defines a geographical point on the earth where two or more LIFEs meet. The nodes are maintained in the node table 287. The LIFEs are connected to each other through the nodes via the LIFE-node cross reference table 286. LIFEs that are part of an interchange 254 are associated with points 252 via the point-LIFE cross reference table 281, which maps points 252 to LIFEs. The sensor-LIFE cross reference table 282 maps a digital sensor 215 to a LIFE.

The exclude-LIFE data table 283 maintains a list of LIFEs that are excluded from customization or redefinition by the TURKI 207 since they are not properly defined in the commercial map data 212. The LIFE direction table 285 contains a direction reference for each LIFE. The street intersection table 288 contains the cross street definitions for a metropolitan area, and allows a user to define a location by a street intersection, rather then by a currently defined point 252. Utilizing the street intersection table 288 enables custom points to be created via the TURKI 207 and for traffic items 230 to be located via intersections. The LIFE-location cross reference table 289 references RDS-TMC location codes (standardized European location codes) as provided by the commercial map data 212. The LIFE name table 279 provides alternate names for the LIFEs as provided by the commercial mapping data provider.

FIG. 15 represents an example of the base layer 312 showing the lowest level of link definitions. A roadway 320 (in this case I-91) is defined as a set of links and nodes. Each link represents a distinct stretch of the roadway 320 between two nodes. A node is where a commuter either needs to make a decision along the roadway 320 or where two or more roadways merge together. In the example of FIG. 15, the link 1201 ends at node 322 where the on-ramp link 321 from roadway 330 (route 121) joins roadway 320. The links 1201 and 321 are connected through node 322 to downstream link 1202. Link 1202 ends at node 324, where there is an off-ramp link 323 from roadway 320 to roadway 340 (I-90) and a through link 1203. Each roadway throughout the base layer 312 comprises links and nodes similar to this scenario, including the links and nodes representing traffic in the opposite direction on a split highway or intersections on tertiary roadways.

Each link contains two nodes, upstream and downstream. The upstream node is an endpoint at the beginning of the link relative to traffic flow. The downstream node is an endpoint at the end of the link relative to traffic flow. The nodes are typically connected to one or more additional links, either as upstream or downstream nodes. Beginning at any given node, the VGSTN 210 can traverse upstream or downstream through the other links and nodes as desired. Digital sensors 215 are associated with the VGSTN 210 through an abstraction called PointObject (see FIG. 10), which allows for additional geometric objects to integrated into the VGSTN 210. Traffic data for each link is integrated into the base network through an abstraction called LinkInfo. The concrete calculator is DriveTimeInfo, which is described in the drive time section below.

Referring to FIG. 16, the traffic layer 314 is an interchange-to-interchange based layer and is used to compute travel times (traffic data) based on the traffic events along a route. The traffic layer 314 is based on the set of roadways in the roadway table 276, where the base links and nodes are aggregated at the interchanges 254 to represent a commuter's view of the primary roadways and interchanges. An interchange 254 is made up of two links, one in each direction, with the beginning of the interchange 254 defined as the upstream node and the end of the interchange 254 defined as the downstream node for each link. This is called a point 252. Between each pair of points 252, is another pair of links, one in each direction. These are the in-between links that represent the stretch of roadway that the commuter cannot get on or off and must travel to the next defined point. The traffic layer 314 thus provides a context in which is recognizable by the commuter in both specifying routes as well as providing information back to the end user regarding routes. Some defined points 252 represent locations that are landmarks, rather then specific exit points. For example, in Philadelphia, there is a location on I-76 that is widely known as the Conshohocken Curve. Through the TURKI application, this point can be added to the network between the exits I-476 and Belmont Ave. This adds an additional reference point 252 such that an incident may begin from the Conshohocken Curve to Belmont Ave and it would get proper reference points defined for it.

FIG. 16 illustrates an example of the traffic layer 314. The first node 324 in the direction of traffic from the base layer 312 that is the start of the logical point 252 on one side of the highway 320 becomes the first node of the traffic point 252. The links 1203 and 1204 (from the base layer 312) are combined into a single representative link 1304, or compound link, which represents the logical point 252, or span of the interchange 254, in a single direction of the interchange 254. Each of these links is referenced with a positive or negative location code. In this example, the link 1304 has a negative location code reference of N00101, which means it is at the location "00101" in the roadway's negative direction. The roadway direction mapping is determined through the roadway direction alias table 274. The link at a point 252 contains a positive location reference as does the link in the opposite direction. The logical locations are additionally grouped into the point table 266 as well. The physical relationship between a point 252 and a logical location is defined through the LIFE location table 279.

Additionally, items that are mapped into the traffic layer are done using an Offset relative to the point table 266. The offset provides a specific geo-location using traffic terms relative to a logical location (see FIG. 17). This is used to determine more precise information. The offset types are at, approaching, midway between and past where:

"At" maps to the center of the link 1408 on the interchange 254;

"Approaching", maps to the upstream node 1410 on the link 1408 on the interchange 254;

"Midway between" maps to the mid point on the approaching link 1412 between two interchanges 254 and 256; and "Past" maps to the downstream node 1404 on the link 1408 on the interchange 254.

Although the traffic layer 314 is very conducive to a traveler, it is not as sufficient for visual representation of the traffic conditions. To facilitate the visual requirements, a graphical layer 316 is defined. The graphical layer 316 takes a more visual approach towards representing the traffic conditions on the road system. Referring to FIG. 18, the graphical network layer 316 is built on defined points 252, but creates four links for every defined point 252: two links approaching the defined point and two links receding from the defined point, approaching links 322 and receding links 324, respectively. The approaching links start at the midpoint of the approaching traffic link where that link is split at a split point 325. This link then ends at the mid-point of the traffic location, or split point 326. The receding link 324 starts at the split point 326 and traverses to the next Split Point 327. Thus, in the graphical network layer 316 there are no links defined between points 252, such that each link is either approaching or receding from a defined point. The purpose for splitting the links is to enable the traffic data from the VGSTN 210 to be visualized through colored or animated links. This visualization preferably occurs through a TV video NTSC or digital signal, but other formats such as a raster image (gif, jpeg, bitmap, tiff, etc), vector graphics (Macromedia Flash®, Scalable Vector Graphics ("SVG"), etc), or other feeds that transition the traffic data into a viewable form may be used.

Travel Times

Once traffic data for individual traffic items 230 is available to the VGSTN 210, point-to-point travel times may be calculated. Point-to-point travel times are dynamic travel time calculations that allow the end user to define a from point and a to point within the VGSTN 210 and receive the estimated travel time for that route. The travel time for a particular route is available to all applications through the travel time component 350 (see FIG. 19). The travel time component 350 is preferably an XML or EJB interface, and preferably includes the following parameters:

"metroid" identifies the metropolitan area;

"definedStartPt" defines the starting point from which the travel time will be calculated, and references a point in the database;

"definedEndPt" defines the end point from which the travel time will be calculated and references a point in the database; and "type" is an enumeration which is one of realTime, freeFlowConditions, or historicalConditions, where realTime calculates the current travel time based on the current flow data 216, freeflowConditions calculates the travel time based on the speed limit of the links which traverse the desired route, and historicalConditions calculates the travel time based on the historical data for the corresponding sensor 215, if available.

The travel time component 350 returns TravelTimeStruct, which contains the following members: travelTimeMin, linkDistanceMiles, avgSpeedMPH, and estimated. TravelTimeMin is the number of minutes for the calculated travel time. LinkDistanceMiles is the total number of miles for all links in the route. AvgSpeedMPH is the average speed across the links in the route. Estimated is a flag that is set to true if there is any floor cap on the minimum speed of a sensor. For example, the flag may be set true if a sensor is returning less then 2 MPH at a location.

When the travel time component 350 receives a request to calculate the travel time between a given set of points, it accesses the VGSTN 210 for the specified metroid. The travel time component 350 then traverses the VGSTN 210 for that metropolitan area to find the definedStartPt in the VGSTN 210. The travel time component 350 continues to traverse the VGSTN 210 to find the definedEndPt, keeping track of each link traversed. Once the end point is found, the links traversed are examined for their respective traffic data. Each link has a reference to one DriveTimeInfo calculator. As the links are traversed the drivetimeinfo determines the drive time for the associated link by finding the sensors 215 associated with that link.

There are three cases that may occur. First, if there is one sensor 215 associated with the link, then the associated sensor's current average speed is used to determine the average speed of the associated link. Second, if there are multiple sensors 215 associated with the link, the average of the current average speed of the sensors is used to determine the average speed of the link. Finally, if there are no associated sensors 215, the travel time service moves upstream and downstream in the VGSTN 210 until an available sensor 215 in either direction is found. If five links in one direction are traversed, three possibilities occur. First, if there no sensor 215 is found in either direction, the link is put in a pool of links where the average speed of the entire route is applied to that link. Second, if only one sensor 215 is found in either the upstream or downstream directions, but not the opposite direction, then the average speed for that sensor 215 is applied to the link. Finally, if both an upstream and a downstream sensor 215 are found, the travel time service weighs the average speed of each sensor 215 into a total average speed based on the distance of the nearest node to that sensor 215 as follows:

Dup=distance in miles from the upstream node to the nearest sensor on the an upstream link;

Ddown=distance in miles from the downstream node to the nearest sensor on a downstream link;

Dsum=Dup+Ddown;

Vup=speed of the chosen upstream sensor;

Vdown=speed of the chosen downstream sensor; and

AvgSpeed=Vup*(1−(Dup/Dsum))+Vdown*(1−(Ddown/Dsum)).

Once the average speed of the link is determined, the travel time is determined using the following equation:

Dlink=Distance, in miles, of the current link; and

TravelTimeminutes=(Dlink/AvgSpeed)*60.0.

The total distance for the all the links is summed, as well as the travel times for each link. Once all of the links have been traversed, the travel time service returns travel time for the specified route.

TIMS

Referring to FIGS. 20-32, the TIMS 220 manages details of traffic items 230 using an object oriented approach. The traffic item table of FIG. 27 contains details for the traffic items 230, including their location in the VGSTN 210 and fields for all subtypes. Referring to FIG. 28, the TIMS schema contains the following additional tables:

incident_item_objtype stores data for all incident types;

accident_item_objtype stores accident specific details;

congestion_item_objtype stores congestion specific details;

disab_veh_item_objtype stores disabled vehicle specific details;

fire_item_objtype stores fire specific details;

miscellaneous_item_objtype stores details of incidents that do not have a specific type;

road_hazard_item_objtype stores road hazard specific details;

event_item_objtype stores event details for event items (scheduled construction, planned event);

sched_cons_item_objtype stores scheduled construction specific details;

planned_event_item_objtype stores planned event specific details;

news_item_objtype stores news item specific details;

mass_transit_item_objtype stores mass transit specific details, including rail and bus lines;

other_news_item_objtype stores other news specific details; and weather_item_objtype stores weather specific details.

FIG. 29 shows other tables in the TIMS schema for managing other types of traffic events.

Creating a traffic item 230 begins by choosing a traffic item type. The TIMS edit screen 226 presents the traffic operator 202 with a form having specific fields representing the data to be collected for the specific traffic item 230 (see FIG. 22). For example, in the case of an accident, the user is presented with details pertaining to active time 233, criticality 234, verified status 235, location data 227, linking traffic items 237, lane blockage data 238, vehicle types 239, details 231, and comments 232.

The TIMS edit screens 226 contain location details 227 defined in the VGSTN 210 necessary to display road, point, and direction names to the traffic operator 202. These location details 227 are presented to the traffic operator 202 in the form of dropdown menus, as shown in FIGS. 21-25. The roadway dropdown 228 contains the defined roadways 276 available to the traffic operator 202. The contents of the roadway dropdown 228 are determined by querying the location section 260 of the VGSTN 210 and building an XML representation of the roadways and points for a metropolitan area, as shown in FIG. 31. FIG. 31 is simply a snippet of the XML document defining the roadway dropdown menu 228, and only contains an example of one roadway and one point. The actual XML document utilized by the TIMS 220 contains all roadways and points for an entire metropolitan area. The roadway XML document is then used to populate the location dropdowns 228. FIG. 32 is a reference table indicating which tables and columns within the location and roadway sections 260, 270 contain the information for the XML nodes shown in FIG. 31.

Choosing a defined roadway 276 from the roadway dropdown 228 causes the dropdown menus for the direction 229, from point 223, and to point 224 to fill with the specific details for the defined roadway 276 selected. The direction values 229 are based on positive and negative directions 274. The direction type 236 is used to define a "UNI" (a single direction), "BI" (both sides of the roadway), or "UNKNOWN"

(the direction is not know at this time). The TIMS 220 manages two individual traffic items 230 when the direction type 236 is "BI" or "UNKNOWN" to ensure that consumer applications view the traffic event. Proximities are used to further define locations relative to the point selected (e.g. approaching, at, midway between, past) which map to offset codes 261. A geo-location (latitude and longitude) is mapped to each roadway, point, and proximity combination called an offset. Offsets define the specific location on the VGSTN 210. The other options for locating a traffic item 230 include by intersection, address, or municipality. These location types also map to a geo-location for mapping or relating to other traffic items 230 by distance, but do not have an offset because these locations are not considered to be on major roadways or their granularity is too high.

Once data for a traffic item 230 is entered and submitted using the TIMS 220, the TIMS 220 calls the traffic item service 219 (see FIG. 36). The traffic item service 219 processes the traffic information 225, including calling the REC 240 to generate a text renditions for the traffic item 230. The traffic item 230 and text renditions associated therewith are then stored in the VGSTN database 218.

Traffic items 230 can also be linked to one another in a parent-child relationship, such that when a parent traffic item 230 is displayed or manipulated, the corresponding child traffic item 230 is similarly displayed. The child traffic item 230 references the parent traffic item 230 using the original identification for the traffic item 230 in both the Java Object schema of FIG. 30 and the TIMS database schema of FIGS. 27-29. The linked-to panel 248 (see FIG. 25) enables the traffic operator 202 to choose an active traffic item 230 based on roadway and point for linking. One example is linking congestion to an accident, as shown in FIG. 25. FIG. 26 shows the TIMS main screen 222 displaying the linked parent-child pair, with the accident data followed by the congestion data.

Renditioning Engine

Referring to FIGS. 33-38, the REC 240 creates multiple text renditions of each traffic item 230. When the REC 240 receives a request for traffic data from an application, it retrieves the relevant traffic data from the VGSTN 210 and renders the traffic data in a format that matches the request from the application or end user. The request to the REC 240 passes an input map of name value pairs, thereby decoupling the REC 240 from the remainder of the traffic system 200. The REC 240 processes rule sets leveraging the traffic data (road, point, proximity, item type, lanes blocked, etc.) and travel times in the VGSTN 210. The result is a string representation of the traffic item's 230 data. Variables may be placed in the text string for further processing before presentation (i.e., travel times, road names, presentation specific text), such that the most current, real-time traffic data is presented to the application. Text rendition strings may be used for display (i.e., by an application) or further system processing. The unique aspects of the REC 240 include the ability to build consistent representations of traffic data based on rule sets and integrating travel times based on the locations defined in the traffic item 230 with the VGSTN 210.

Referring to the REC flow diagram of FIG. 33, the creation of text renditions begins with loading the list of rendition types. This list is looped through and, for each rendition type found, a reference to the corresponding rule set is retrieved. The rule sets are defined in an XML document, with an example shown in FIG. 35. The XML rules map directly to Java objects for implementation. At the start of rule set processing, a default rendering type is set based on the defined the target output. The preferred current implementations include "text" and "voice". The rules are processed until no rules are found. The two rule types are "set" and "block". A set contains a condition statement, and if the condition is met, the processing of the rule continues within the set. If the condition fails, the processing skips the rules contained within the set. A block adds text to the current state of the text rendition. The block determines the rendering type and calls the "text" method or "voice" method. The rules are processed until the rules are exhausted. The resulting text rendition is added to a map with the text rendition type as the key. When all rendition types are processed the final result is a map containing pairs of text rendition types and text renditions.

The REC 240 preferably post process text renditions by replacing travel time variables and location variables with the current value of the corresponding traffic data. For example, if the traffic item 230 is of type congestion, a service is called to retrieve the travel time data based on the from and to points 223, 224. The traffic data is then inserted into the text rendition to complete the current, real-time text string for presentation to the application. As discussed, the traffic system 200 manages location aliases for roadways and points which are used to describe locations to a specific audience. Examples of alias types are signage, local, and abbreviation. A road name example is I-476, Blue Route, and 476 corresponding to the signage, local, and abbreviation aliases, respectively. The REC 240 will thus also account for the aliases in the text rendition.

Text rendition post processing (see FIGS. 34 and 36) begins with a map of the text rendition types and text renditions, a list of alias types, and a reference to a variable replacement implementation. The variable replacement implementation contains the business logic for replacing a variable. The outer loop processing is alias type. For each alias type the code loops through each rendition type. A variable starts with the characters "$[" and ends with the "]" character. Each variable is passed to the variable replacement implementation, where business processing occurs. An example of business processing is replacing the variable "$[ROAD_NAME]" with the road name based on the alias type in the outer loop. The variable is the replaced with data from the business process. If no implementation is found for the variable, the variable can be removed or left alone based on a parameter passed into the post processing code, thus allowing further processing at a later time.

The TIMS 220 also uses the text renditions of traffic items 230 for display on the main screen 222 of the TIMS 220 as shown in FIG. 37. The traffic operator 202 uses a Web browser to enter a congestion traffic item 230 which includes travel times based on the selection of two points 223, 224. The traffic operator 202 submits a server request to create the traffic item 230 using the TIMS 220. The TIMS 220 calls the traffic item management services 219 to create the new traffic item 230.

The TIMS main screen 222 refreshes at 1 minute intervals, displaying the latest traffic data for the corresponding traffic item(s) 230 in the VGSTN 210. The Web browser calls the TIMS 220 to rebuild the TIMS main screen 222. The TIMS 220 calls the traffic item management services layer 219 to retrieve the current traffic items 230. The traffic item management services 219 calls into the VGSTN 210 to retrieve the current traffic items 230. Each traffic item 230 contains a reference to a set of text renditions. The text rendition types each contain a text string. The traffic items 230 are returned to the traffic item 230 management services. The traffic item management services 219 then calls the REC 240, which processes each traffic item 230 and does variable substitution on each text rendition as shown in FIG. 34. A call into the VGSTN 210 from the REC 240 retrieves roadway and point names for location variable substitution based on the alias code defining the location types (signage, local, abbreviation). A call into the VGSTN 210 from the REC 240 retrieves travel times for replacing travel time variables in the text renditions. The traffic item 230 now contains a reference to an alias code containing the set of text renditions with the variables replaced. The traffic items 230 are returned to the traffic item management services 219 containing the final renditions. The traffic items 230 are then returned to the TIMS 220 and processed to create the HTML display. In creating the HTML display the "desc" rendition is selected and added to the HTML. An example of a congestion item containing location variables and travel time variables might look like the following: "8 min (+1) Chesterbrook Blvd to RT-30, avg speed 53 mph (generally jammed)."

Referring to FIG. 38, the TPB application 360 uses text renditions of traffic items 230 to display a view of the traffic data based on a roadway and direction combination. The TPB browser interface refreshes every 30 seconds, so that the most current traffic data in the VGSTN 210 is displayed. The browser calls the TPB 360, which in turn calls the traffic item management services 219. The traffic item management services 219 calls into the VGSTN 210 to retrieve the current traffic items 230. Each traffic item 230 contains a reference to a set of text renditions. The traffic items 230 are returned to the traffic item management services 219. The traffic item management services 219 calls the REC 240, which processes each traffic item 230 and completes variable substitution on each text rendition as shown in FIG. 34. A call to the VGSTN 210 retrieves roadway and point names for location variable substitution based on the alias code defining the location types (signage, local, abbreviation). Additionally, the VGSTN 210 supplies travel times for replacing travel time variables in the text renditions. The traffic item 230 contains a reference to an alias code containing the set of text renditions with the variables replaced. The traffic items 230 are returned to the traffic item management services layer. A call to the REC 240 groups traffic items 230 by roadway and direction, combines text renditions for the roadway and direction combination, and creates a rolled-up traffic item 230 with one text rendition containing a concatenation of text renditions. The rolled-up traffic items 230 are returned to the traffic item management services layer. The rolled-up items are returned to the TPB application 360, which groups the rolled-up traffic items 230 and builds the display. The combined text renditions appear as one text string based on a combination of roadway and direction.

When a traffic item 230 is created or changed, a new database row is created. The traffic item 230 stored in the database contains the roadway_id, point_id, proximity, and geo-location are used to place the traffic item 230 in the VGSTN 210. Each version of the traffic item 230 contains the original id, which does not change during the life of the traffic item 230, and a traffic item id uniquely identifying this item. The original id is used to link the history of the traffic item 230.

Traffic Pulse Broadcaster

Radio station traffic announcers retrieve traffic items 230 containing traffic data through the TPB 360 (see FIGS. 40-41). The TPB 360 groups traffic items 230 by zones (i.e., by roadway and direction) for displaying the current roadway views. Zones contain groups of roadways that an announcer can group together in a traffic report. The rolling-up of traffic items 230 and insertion of travel times in a congestion item gives announcers a view of the roadway based on its direction. If a congestion traffic item 230 is linked to another traffic item 230 the items will be concatenated with the words "due to" as seen in FIG. 41.

FIG. 39 shows a flow diagram of how the TPB 360 retrieves and processes traffic items. The TPB 360 calls a service to retrieve traffic items 230 for a metropolitan area. The list of traffic items 230 is processed into two groups, defined locations and undefined locations. Defined locations reference traffic items 230 on the road system (roadway, direction, point, and proximity) and undefined locations reference traffic items 230 not defined by a roadway and point but by a latitude and longitude or geo-location. The defined location group of traffic items 230 is processed and text renditions are created. Travel times are added to congestion items during the post process of the text rendition. A roadway/direction view is created by concatenating the text renditions for traffic items 230 in the order the exits appear in the current direction of the roadway. The traffic item 230 data is put into a display only object containing criticality, zone, roadway, direction, incident time, and text describing traffic items 230 on that roadway and direction. The congestion items will contain digital travel times for digital roadways. The display only object is added to a zone bucket. The undefined group of traffic items 230 is processed and text renditions are created. The traffic item 230 data is put into a display only object containing criticality, zone, municipality, direction, incident time, and text describing the traffic item 230. The display only object is added to a zone bucket. Traffic items 230 with an undefined location are grouped together by the municipality of the geo-location. Each traffic item 230 with an undefined location is displayed on a separate line on the TPB screen, as shown in FIG. 40.

The process of building the TPB screen involves multiple service calls as outlined in FIG. 42. The process starts by calling the AnnouncerZoneView service to return the traffic items 230 for the user based on the metropolitan area. The AnnouncerItemRollup service is responsible for combining the traffic items 230 into text for displaying a roadway and direction view. The ConsumerTrafficItem service is responsible for retrieving the traffic items 230 based on metropolitan area, and optionally integrates travel times into the congestion items. The RawTrafficItem service retrieves the traffic items 230 from the VGSTN 210.

Referring to FIG. 43, the presentation of traffic items 230 in the TPB 360 is accomplished by using the REC 240 to group traffic items 230 on the same roadway and direction. The text rendition generated describes the view of the roadway and current roadway conditions. Concatenating text renditions from multiple traffic items 230 generates text describing the view of the roadway and direction. The TIMS 220 creates traffic items 230 and displays each item individually on the TIMS main screen 222. The TPB 360 calls the REC 240 to group traffic items by roadway and direction. The traffic items 230 are sorted into exit order based on the roadway's direction. Each group is processed, thus building a text string representing the a roadway view of the traffic items for that roadway. As each traffic item 230 is processed, the text rendition "desc" is appended to a temporary string. If the traffic item 230 is linked to another traffic item 230, the text rendition "noexitdesc" is appended to the temporary string. After the traffic item is processed (with or without a parent), the "|" symbol is appended to the temporary string. After all traffic items are processed for the group, the temporary string is complete. The TPB 360 then displays the traffic items for each roadway and direction grouped as one line of text, as shown in FIGS. 40 and 41.

2-Dimensional TV Graphics System

Referring to FIGS. 44-49, the TV2D 370 geo-spatially represents the real-time traffic conditions on the road system, reflecting traffic events including incidents, congestion, point speeds and travel times from the VGSTN 210. The TV2D 370 includes a graphics workstation installed with a Java application, TVGen. In the preferred embodiment of the present invention, the preferred workstation for the TV2D 370 is Silicon Graphics, Inc. O2 server running the Weather Central Protean application.

TVGen runs in two modes, the first being to configure the road network graphics representation files on the graphics workstation at least once a day. This is requested from the TVFeed component server through a GetMap request with parameters for the metro_id and latitude-longitude bounding box. Each latitude-longitude bounding box definitions are stored locally on the TV2D file system for each map desired by the client. There are no constraints on this bounding box, which typically has included approximately a five square mile region. When the TVFeed receives a GetMap request, it traverses the graphical layer 316 for that metropolitan area to determine which links are contained within the bounding box.

As discussed above, the graphical layer 316 is an additional layer in the VGSTN 210 above the traffic layer 314. The graphical layer 316 contains the same underlying details in the VGSTN 210, but organizes it in a way to properly display the traffic data for graphical systems. FIG. 18 depicts a representation of the graphical layer 316, illustrating the differences with respect to the traffic layer 316. Note that links 1304 and 1306 from the traffic layer 314 (see FIG. 16) are split in half and then recombined to form link 322 to properly segment the graphical layer 316. This creates an approaching link 322 and a receding link 324, providing an accurate graphical depiction of the roadway conditions. These links are traversed through the graphical layer 316 to determine which links are geographically bound by the latitude-longitude bounding box. The resulting links are stored in a collection and returned to the calling program via an XML interface. The response from the GetMap request from the TVFeed is processed by the TVGen application, thereby converting the XML into Java objects and storing the graphical layer 316 as serialized Java objects in a local file in the TV2D file system.

An example of the GetMap response XML file is shown in FIG. 46. Each roadway contains a ROADWAY tag. The ROADWAY is separated by direction, and each SEGMENT, or Link, contains the ID of the link that is referenced later, as well as the latitude/longitude coordinates, GEOLOCATIONs. The GEOLOCATIONs represent the physical makeup of an individual link in geo-spatial terms. This geo-spatial information changes only when the map data 212 for the road system itself is updated.

The second mode of the local Java application is run on request by the end user or application, reads the serialized Java objects and requests the state of the links for the associated links from the TVFeed component server (see FIG. 45). This is a GetStatus request with parameters for the metro_id and the latitude-longitude bounding box. The TVFeed component again traverses the graphical layer 316, and using the bounding box parameters, determines which of the links are contained within the bounding box. The TVFeed then requests the corresponding group of congestion items from the ConsumerTrafficItemInterface through method findCongestionItemsAll. This method returns all of the active congestion items for a metro area in a collection object. The congestion items are traversed to determine how each congestion item relates to the sub-set of the graphical layer 316 as constrained by the latitude-longitude bounding box. For congestion items that are within the latitude-longitude bounding box, each affects the sub-set of links in the graphical layer 316. Referring to FIG. 18, the start point of the congestion item is found on the sub-set of the graphical layer 316. If the proximity of that point is 'approaching', then the approaching link 322 is assigned a state that matches the current status of the congestion item. Regardless, the receding link 324 is assigned the state that matches the current status of the congestion item. The following table describes the status of a congestion item and the associated state:

| Item Status | Link State |
|---|---|
| Generally slow | Yellow |
| Slow | Yellow |
| Sluggish | Yellow |
| Generally Jammed | Red |
| Jammed | Red |
| Stopped | Red |

Links associated with the points between the from and to points 223, 224 are set to the state as defined above. For links associated with the from point 223, if the proximity of the end point 223 is one of 'approaching', 'at', 'on ramp' or 'off ramp', only the approaching link is assigned a state based on the status of the congestion item. The receding link 324 is only assigned a state based on the congestion item status when the proximity of the end point is other then those defined above. From this, the links that contain a state of either 'yellow' or 'red' are returned with its link_id to the calling application in an XML structure (see FIG. 47).

The results of the feed request, combined with the configuration of the graphics layer 316 as defined in the serialized Java objects are then written into a file to be read by the Weather Central Protean system, also installed on the workstation. This file defines Protean Jet Streams as a method to represent traffic flow information. It sets the color (red, yellow, green) and the speed (slow, moderate, fast) and separation (close, medium, far) of the animated graphics based on the state of the individual link (see FIG. 48). The look of the graphics, animation and the definition of the above parameters are configurable by client installation. Once complete, the Protean application is automatically started with the file path to this new Protean file passed in as a parameter to the Protean application. When Protean starts, it loads this file upon initialization. The user then utilizes the movie rendering capabilities of the Protean system to convert this information into a playable movie, preferably in an AVI file format. FIG. 48 depicts an example of the output of the generated AVI file.

Weather Central Inc., of Madison, Wis., is a broadcast weather services company. The Genesis weather graphics production system, commercially available from Weather Central, includes a series of software components. Protean is one of the software components.

An example of the TV2D system 370 is illustrated in FIGS. 47-49. FIG. 49 depicts a TIMS main screen 222 showing several traffic items 230. The first traffic item 372 generates XML data 373 for a single segment as shown in FIG. 47, and displays on the video of FIG. 48 as a yellow segment 374. The next TIMS item 375 generates XML data 376 and displays on the video of FIG. 48 as red segment 377. Finally, the third traffic item 378 on the TIMS screen 222 stretches across three graphical segments, is represented by the XML data 379 and is presented in the video of FIG. 48 as a red segment 380.

The current invention provides numerous advantages over the prior art. The invention is a cohesive traffic system made up of multiple applications that are built on a layered architecture such that highly granular data from disparate sources (multiple feeds from DOTs, different types of sensors) can be collected in one system, processed, disseminated and displayed with a high degree of accuracy and flexibility. Each layer has high cohesion and low coupling with respect to the other layers in the architecture. This allows data from multiple input sources to be collected and normalized. This normalized data is both archived and distributed in real-time. In both cases the data is normalized onto a geo-spatial traffic network such that all information either manually entered in to the system or collected by digital means (such as roadway sensors) is available to any application.

All of the data is stored in the smallest possible granularity with very minute detail. The applications themselves make requests of the data through a component layer. The unique value of the invention is that this highly granular and diverse data is integrated onto a common, virtual, geo-spatial traffic network. The VGSTN 210 is an advanced layer above a common road network from commercial mapping providers. The VGSTN 210 provides a virtual view (or world) across a metropolitan area or regionally or nationally. This VGSTN 210 allows all traffic event information to have a synaptic relationship to all other data within the roadway network.

Another aspect of the invention is the ability to integrate digital traffic flow data 216 into the VGSTN 210. The digital flow data 216 that is captured by roadway sensors 215 collects very specific information in a very structured format. The sensors 215 themselves do not know their own location and hence the information cannot make any determination regarding their location or what their data's impact is within the road network. The sensors 215 themselves also have knowledge of their relationship to any other sensor, either in proximity or in information, or how another sensor's readings impact traffic flow on the road system. Although, the placement of sensors 215 on a graphical, color-coded map 107 has been accomplished in the prior art, under the present invention the Java based traffic collection system 200 integrates various sensor systems across metropolitan areas directly into the VGSTN 210 in a consistent format that traffic data can be obtained, in real-time, in a standard format.

Another unique aspect of the present invention is that the sensor locations are incorporated into the VGSTN 210 in such a manner that sensors 215 not only know about their location and traffic flow data on a lane by lane basis, but also have knowledge of the sensors 215 immediately upstream and down stream along the roadway. The VGSTN 210 incorporates the flow data 216 that comes from the sensors 215 in real-time. In this respect, the sensors 215 in essence form a self-healing network, such that if any sensor 215 is inactivated, it is removed from the network automatically, and the nearest sensor upstream and downstream divides the responsibility of covering the area of roadway originally covered by the now inactive sensor. Similarly, if a sensor 215 is added between two existing sensors 215, then the space between the two existing sensors 215 is managed such that the additional sensor 215 will be incorporated into the roadway network seamlessly.

Another unique aspect is that the VGSTN 210 allows all data within the network to be aware of all other data, its relative proximity to other data, direction of traffic events relative to the flow of traffic, and impact of traffic events on traffic flow, including details of any congestion that is caused as a result of the traffic event.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A computer-implemented method of creating a virtual traffic network representing traffic conditions on a road system, the method comprising:

(a) inputting into a processor a base layer comprising map data representing a road system, the road system being defined by a plurality of links and nodes;

(b) the processor creating a traffic layer by combining multiple links and nodes of the base layer into a single link with an upstream node and a downstream node;

(c) inputting into the processor flow data related to traffic flow on the road system and information about traffic events on the road system; and (d) the processor integrating the base layer, the traffic layer, the flow data and the traffic event information to produce a virtual traffic network representing traffic conditions on the road system, wherein the virtual traffic network indicates both the flow data and the traffic event information.

2. The method of claim 1 wherein the flow data is real-time flow data, the virtual traffic network representing real-time traffic conditions on the road system.

3. The method of claim 1 wherein the flow data is input from a plurality of road sensors.

4. The method of claim 1 wherein step (a) further comprises customizing the map data to define locally known features of the road system.

5. The method of claim 1 wherein one of the traffic events are incidents and the information includes information related to incidents on the road system.

6. The method of claim 1 wherein the map data, the flow data and the information have a synaptic relationship with each other.

7. The method of claim 1 wherein the virtual traffic network is spatially oriented.

8. The method of claim 1 wherein each link represents a distinct stretch of the road system between two nodes, each node being a decision point on the road system.

9. The method of claim 1 wherein each link represents a distinct stretch of the road system between two nodes, each node being where two or more roadways merge together.

10. The method of claim 1 wherein inputting information about traffic events on the road system is performed by a human operator.

11. The method of claim 1 further comprising:

(e) graphically displaying the virtual traffic network, including the map data, the flow data and the traffic event information, the graphical display showing at least one of an animated flow display using the flow data and an icon corresponding to the traffic event using the traffic event information.

12. An article of manufacture for creating a virtual traffic network representing traffic conditions on a road system, the article of manufacture comprising a computer-readable medium encoded with computer-executable instructions for performing a method comprising:

(a) inputting into a processor a base layer comprising map data representing a road system, the road system being defined by a plurality of links and nodes;

(b) the processor creating a traffic layer by combining multiple links and nodes of the base layer into a single link with an upstream node and a downstream node;

(c) inputting into the processor flow data related to traffic flow on the road system and information about traffic events on the road system; and (d) the processor integrating the base layer, the traffic layer, the flow data and the traffic event information to produce a virtual traffic network representing traffic conditions on the road system, wherein the virtual traffic network indicates both the flow data and the traffic event information.

13. The article of manufacture of claim 12 wherein the flow data is real-time flow data, the virtual traffic network representing real-time traffic conditions on the road system.

14. The article of manufacture of claim 12 wherein the flow data is input from a plurality of road sensors.

15. The article of manufacture of claim 12 wherein step (a) further comprises customizing the map data to define locally known features of the road system.

16. The article of manufacture of claim 12 wherein one of the traffic events are incidents and the information includes information related to incidents on the road system.

17. The article of manufacture of claim 12 wherein the map data, the flow data and the information have a synaptic relationship with each other.

18. The article of manufacture of claim 12 wherein the virtual traffic network is spatially oriented.

19. The article of manufacture of claim 12 wherein each link represents a distinct stretch of the road system between two nodes, each node being a decision point on the road system.

20. The article of manufacture of claim 12 wherein each link represents a distinct stretch of the road system between two nodes, each node being where two or more roadways merge together.

21. The article of manufacture of claim 12 wherein inputting information about traffic events on the road system is performed by a human operator inputting the traffic event information into a user interface display screen.

22. The article of manufacture of claim 12 wherein the computer-readable medium is encoded with computer-executable instructions for performing a method further comprising:

(e) graphically displaying the virtual traffic network, including the map data, the flow data and the traffic event information, the graphical display showing at least one of an animated flow display using the flow data and an icon corresponding to the traffic event using the traffic event information.

23. A computer-implemented apparatus for creating a virtual traffic network representing traffic conditions on a road system, the apparatus comprising:

(a) means for inputting into a processor a base layer comprising map data representing a road system, the road system being defined by a plurality of links and nodes;

(b) means for creating a traffic layer by combining multiple links and nodes of the base layer into a single link with an upstream node and a downstream node;

(c) means for inputting into the processor flow data related to traffic flow on the road system and information about traffic events on the road system; and (d) means for integrating the base layer, the traffic layer, the flow data and the traffic event information to produce a virtual traffic network representing traffic conditions on the road system, wherein the virtual traffic network indicates both the flow data and the traffic event information.

24. The apparatus of claim 23 wherein the flow data is real-time flow data, the virtual traffic network representing real-time traffic conditions on the road system.

25. The apparatus of claim 23 wherein the flow data is input from a plurality of road sensors.

26. The apparatus of claim 23 wherein the means for inputting into a processor a base layer comprising map data representing a road system further comprises means for customizing the map data to define locally known features of the road system.

27. The apparatus of claim 23 wherein one of the traffic events are incidents and the information includes information related to incidents on the road system.

28. The apparatus of claim 23 wherein the map data, the flow data and the information have a synaptic relationship with each other.

29. The apparatus of claim 23 wherein the virtual traffic network is spatially oriented.

30. The apparatus of claim 23 wherein each link represents a distinct stretch of the road system between two nodes, each node being a decision point on the road system.

31. The apparatus of claim 23 wherein each link represents a distinct stretch of the road system between two nodes, each node being where two or more roadways merge together.

32. The apparatus of claim 23 wherein the means for inputting information about traffic events is a user interface display screen that receives the traffic event information from a human operator.

33. The apparatus of claim 23 further comprising:

(e) means for graphically displaying the virtual traffic network, including the map data, the flow data and the traffic event information, the graphical display showing at least one of an animated flow display using the flow data and an icon corresponding to the traffic event using the traffic event information.

* * * * *